United States Patent [19]
Itoh et al.

[11] Patent Number: 6,021,020
[45] Date of Patent: Feb. 1, 2000

[54] HEAD SLIDER AND READ/WRITE APPARATUS USING SAME

[75] Inventors: Jun Itoh; Keiko Higashi, both of Yokohama, Japan

[73] Assignee: Kabushiki Kaisha Toshiba, Kawasaki, Japan

[21] Appl. No.: 08/959,324

[22] Filed: Oct. 28, 1997

[30] Foreign Application Priority Data

| Oct. 28, 1996 | [JP] | Japan | 8-285061 |
| Feb. 10, 1997 | [JP] | Japan | 9-026871 |
| Feb. 10, 1997 | [JP] | Japan | 9-026872 |

[51] Int. Cl.$^7$ ................................................. G11B 21/21
[52] U.S. Cl. .......................................................... 360/103
[58] Field of Search ............................................. 360/103

[56] References Cited

U.S. PATENT DOCUMENTS

| 4,802,042 | 1/1989 | Strom | 360/103 |
| 5,021,906 | 6/1991 | Chang et al. | 360/103 |
| 5,218,495 | 6/1993 | Chapin et al. | 360/103 |
| 5,220,470 | 6/1993 | Anath et al. | 360/103 |
| 5,317,465 | 5/1994 | Chapin et al. | 360/103 |
| 5,327,311 | 7/1994 | Ananth et al. | 360/103 |
| 5,404,256 | 4/1995 | White | 360/103 |
| 5,418,667 | 5/1995 | Best et al. | 360/103 |
| 5,420,735 | 5/1995 | Haines | 360/103 |
| 5,424,888 | 6/1995 | Hendriks et al. | 360/103 |
| 5,499,149 | 3/1996 | Dovek | 360/103 |
| 5,508,861 | 4/1996 | Ananth et al. | 360/103 |
| 5,513,056 | 4/1996 | Kawasaki et al. | 360/103 |
| 5,537,273 | 7/1996 | Hendriks et al. | 360/103 |
| 5,550,693 | 8/1996 | Hendriks et al. | 360/103 |
| 5,654,853 | 8/1997 | Hagen | 360/106 |

*Primary Examiner*—William J. Klimowicz
*Attorney, Agent, or Firm*—Foley & Lardner

[57] ABSTRACT

On a head slider 203a, a read/write head 20 for reading and/or writing information on a disk being a rotatable recording medium is mounted. The head slider 203a comprises: a head slider body; a dynamic-pressure generating part 2a (2b) for generating a dynamic pressure, the dynamic-pressure generating part being formed on a surface of the head slider body facing the disk; and a negative-pressure generating part 81a (81b) for generating a negative pressure, the negative-pressure generating part being provided on a plane of the head slider body facing the disk and in the rear of a central portion of the head slider body in a rotating direction of the disk. Thus, it is possible to provide a head slider having a small yaw-angle dependence, and a read/write apparatus, which has the head slider and which is capable of improving the recording density thereof.

32 Claims, 35 Drawing Sheets

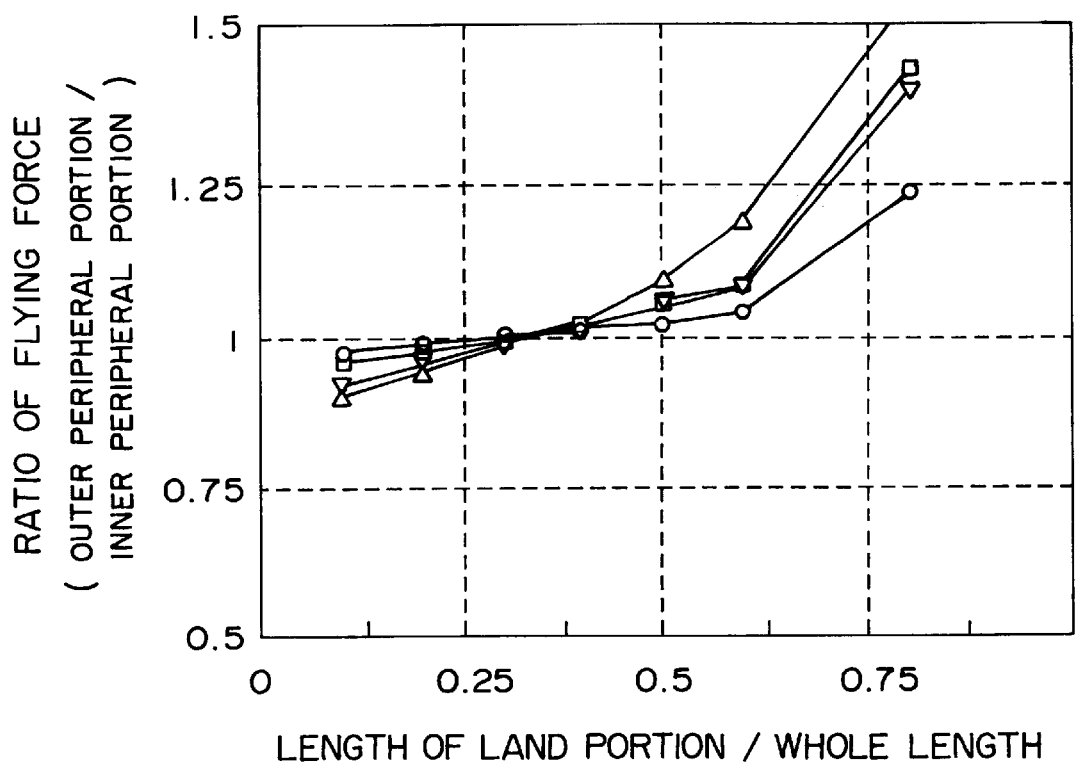
F I G. 5

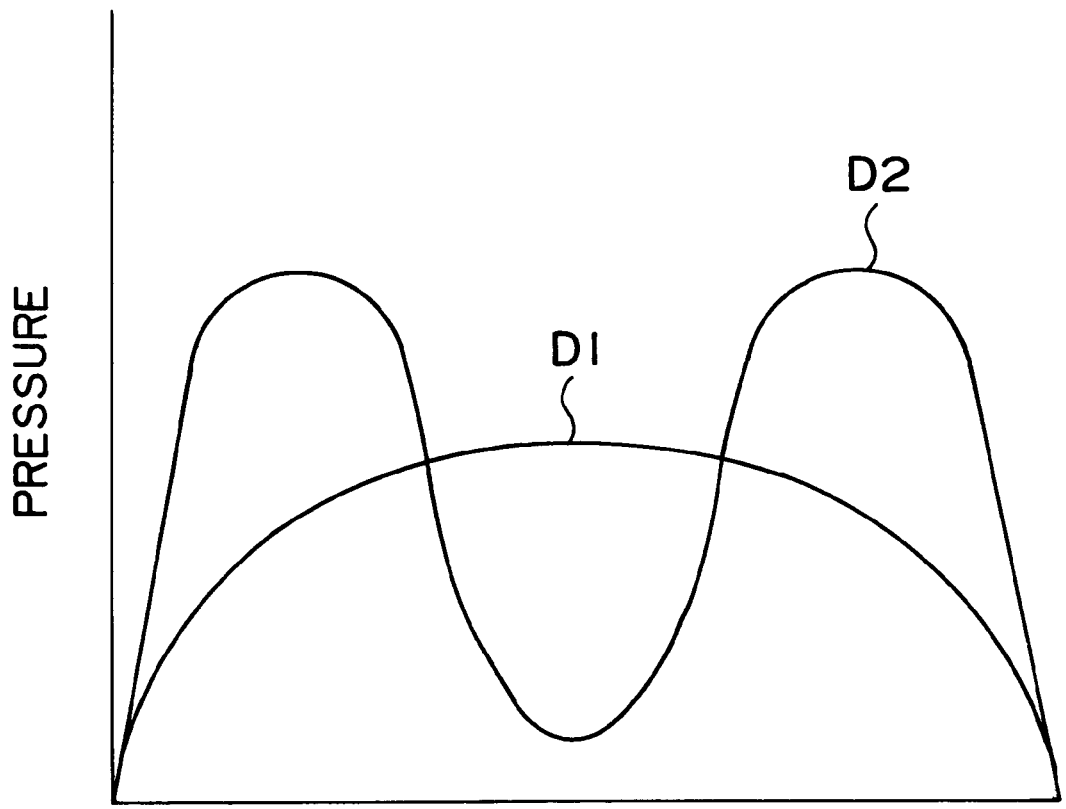
F I G. 13

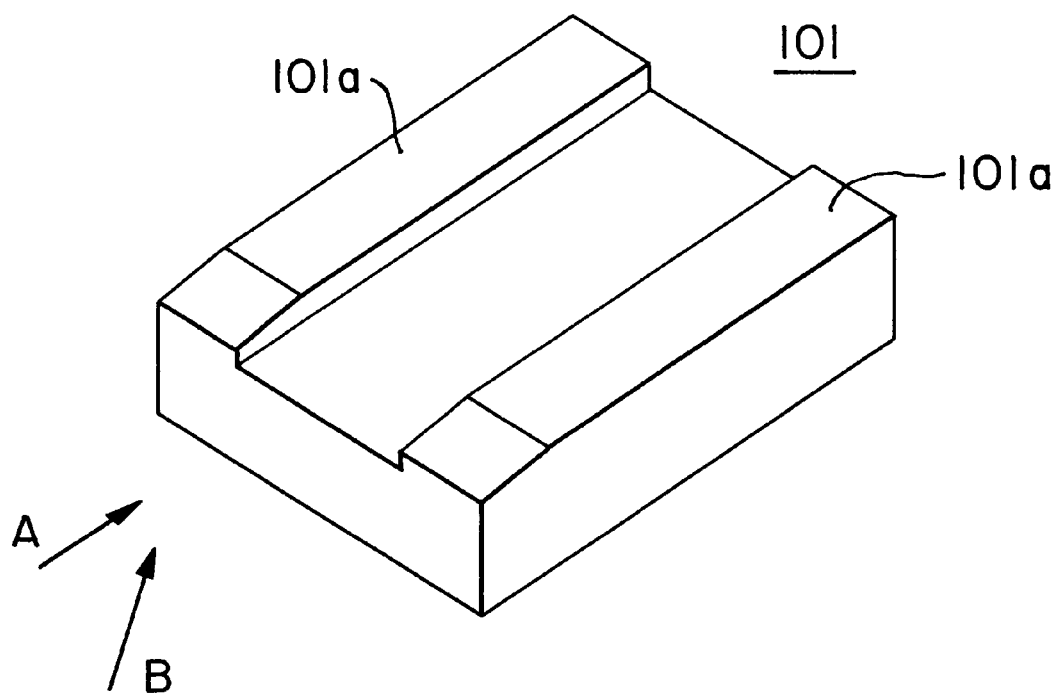
F I G. 35
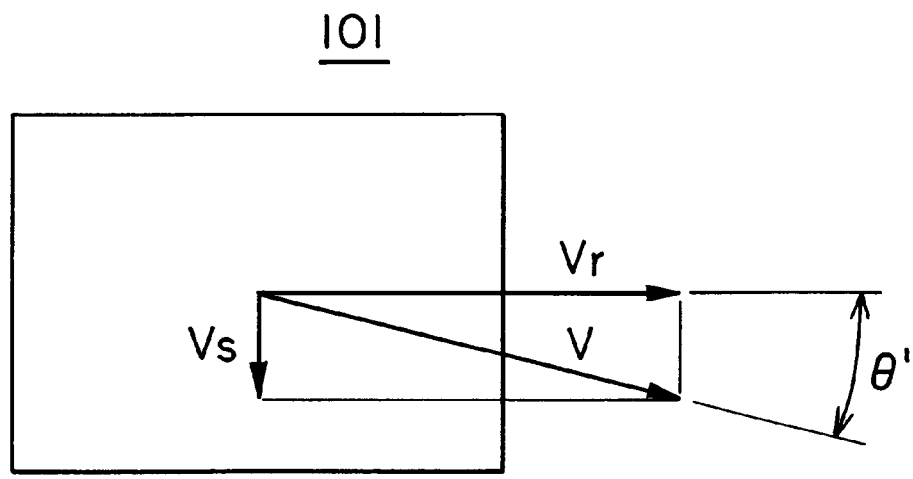
F I G. 36

HEAD SLIDER AND READ/WRITE APPARATUS USING SAME

BACKGROUND OF THE INVENTION

1. Field of the Invention

The present invention relates to a head slider capable of suppressing the variation and irregularity of flying height, or the variation of contact pressure, and a read/write apparatus provided with such a head slider for supporting a read/write head at a low flying height or supporting a read/write head in small-force, stable contact with a recording medium to enable recording in a high recording density.

2. Description of the Prior Art

In recent years, read/write apparatuses have been actively developed to enhance the recording density thereof. In particular, the recording density of a magnetic disk drive is enhanced by both of the increase of bit density (the recording density in circumferential directions of a disk) and the increase of track density (the recording density in radial directions of the disk). In order to increase the bit density, it is required to decrease the flying height of a head slider (which will be hereinafter referred to as a "slider"), on which a read/write head (which will be hereinafter referred to as a "head") is mounted. However, in conventional sliders, the dynamic variation in flying height during a seek operation (e.g., to scan a head to move the head to a position at which designated information is stored) prevents the flying height of the head from decreasing. The factors thereof will be described in detail below.

FIG. 34 schematically illustrates a magnetic disk drive using a conventional slider. In most of conventional sliders 101 represented by a so-called taper flat slider, the difference in flying height is inhibited from occurring due to the difference between the inner and outer peripheral velocities of a disk 102 serving as a recording medium, using the yaw angle dependence. The yaw angle means an angle (θ in the drawing) defined between the rotating direction of the disk and the longitudinal direction of the slider 101.

As shown in FIG. 34, in a magnetic disk drive using a so-called rotary actuator 103, the slider 101 and the disk 102 are arranged so that the yaw angle on the side of the inner peripheral portion X of the disk is smaller than the yaw angle on the outer peripheral portion Y of the disk.

FIG. 35 is a perspective view schematically illustrating a conventional taper flat slider. As shown in FIG. 35, the slider 101 has elongated dynamic pressure generating parts 101a, which extend in a disk rotating direction A, and serves to fly a head using the dynamic pressure generated between the power generating portions 101a and the rotating disk (not shown). The pressure generating efficiency of the dynamic-pressure generating parts 101a extending in the disk rotating direction A decreases when the yaw angle is formed to change the disk rotating angle from A to B in FIG. 35. Because, when the yaw angle is small, air flowing onto the slider from the slider front end flows along the whole length of the slider by a relatively long distance to generate a dynamic pressure, whereas when the yaw angle increases, it is difficult to ensure the flowing distance required to effectively increase the dynamic pressure due to a so-called transverse leakage of air flow that a part of the air flows out of the side edge before completely flowing the whole length of the slider or air flows into the side edge to flow out of the rear end. Therefore, in the conventional taper flat slider 101, when the yaw angle increases as the slider approaches the outer peripheral portion Y of the disk, the dynamic-pressure generating efficiency on the slider 101 decreases due to the transverse leakage of air flow. Therefore, even if the peripheral velocity increases as the slider approaches the outer peripheral portion Y of the disk, the flying force exerting on the slider 101 does not vary, so that it is possible to decrease the difference in flying height between the inner and outer peripheral portions of the disk 102.

As shown in FIG. 36, when the seek of the slider 101 is carried out, a seek velocity component Vs (about 1 m/s at a maximum) substantially perpendicular to a disk rotation velocity component Vr (5 to 10 m/s) exists in addition to the disk rotation velocity component Vr. Therefore, the composite vector V of these two velocity components has an angle of about 5° to 10° to the longitudinal directions of the slider 101. That is, an equivalent yaw-angle variation (θ in FIG. 36) occurs during a seek operation.

Therefore, in accordance with the same principle as the aforementioned yaw angle dependence, the dynamic-pressure generating efficiency decreases due to the transverse leakage of air flow during the seek operation, so that the flying height decreases transiently. It is experimentally verified that the decreasing flying height usually exceeds 10 nm. Therefore, in order to prevent the disk from colliding with the slider during the seek operation, a spacing (a flying gap) allowing for a margin of decreasing flying height must be set. This causes to prevent the flying height of the slider from decreasing.

At the present time, in order to further improve the recording density, the contact recording technique for bringing a head into contact with a disk to carry out the reading and/or writing at a flying height of substantially zero has been studied. The most important problem to be solved in this contact recording technique is to reduce the abrasion of the head. In order to eliminate this problem, it is required to maintain weak and stable contact force exerting between the head and the disk. However, as described above, the conventional slider can not maintain weak and stable contact force exerting between the head and the disk since the contact force varies by the equivalent yaw-angle variation during the seek operation. In addition, when the abrasion of the head is in progress, if the flying attitude varies above the inner and outer peripheral portions of the disk, the contact portion may fly to form a spacing.

Moreover, in a case where a so-called MR head using a magneto-resistance effect element, which has newly made fit for practical use and which will be the mainstream in future, is used, it is required to separately provide a reading head and a writing head, and the two heads are usually arranged in the track direction. With this construction, if the yaw angles of the inner and outer peripheral portions vary greatly, a deviation in the lateral direction of a track (a track deviation) occurs between the two heads. In order to eliminate this problem, a method for using a linear actuator and a method for optimizing the length of an actuator arm to decrease the variation in yaw angle (see Japanese Patent Laid-Open No. 5-298615) have been studied. Therefore, also in the case of a slider using the MR head, there is a great possibility that it is required to suppress the difference in flying height between the inner and outer peripheral portions of the disk without utilizing the yaw angle dependence.

As described above, since the conventional slider has a shape suitable for the suppression of the difference between the flying heights in the inner and outer peripheral portions of the disk utilizing the yaw angle dependence, the decrease of the flying height or the variation in contact force occurs due to the equivalent yaw-angle variation during a seek operation. Therefore, it is difficult to decrease the flying height of the head or to achieve the weak and stable contact between the head and the disk.

In addition, when the abrasion of the head is in progress in the contact recording, if the flying attitude above the inner and outer peripheral portions of the disk varies, the contact portion may fly to form a spacing.

Moreover, in a slider using a MR head, it is requested to provide the technique for suppressing the difference in flying height above the inner and outer peripheral portions of a disk without utilizing the yaw angle dependence.

SUMMARY OF THE INVENTION

It is therefore an object of the present invention to eliminate the aforementioned problems, to propose a shape of a slider capable of suppressing the difference in flying height above the inner and outer peripheral portions or the variation in contact force without utilizing the yaw angle dependence, and to provide a read/write apparatus capable of decreasing the flying height of a head or achieving a weak and stable contact between the head and a disk using the slider to improve the recording density.

In order to accomplish the aforementioned and other objects, according to one aspect of the present invention, there is provided a head slider, on which a read/write head for reading and/or writing information on a disk being a rotatable recording medium is mounted, the head slider comprising: a head slider body; a dynamic-pressure generating part for generating a dynamic pressure, the dynamic-pressure generating part being formed on a surface of the head slider body facing the disk; and a negative-pressure generating part for generating a negative pressure, the negative-pressure generating part being provided on a plane of the head slider body facing the disk and in the rear of a central portion of the head slider body in a rotating direction of the disk, and a read/write apparatus using the same.

According to another aspect of the present invention, there is provided a head slider, on which a read/write head for reading and/or writing information on a disk being a rotatable recording medium is mounted, the head slider comprising: a head slider body; at least two dynamic-pressure generating parts for generating a dynamic pressure, the dynamic-pressure generating parts being provided on a surface of the head slider body facing the disk so as to be arranged in a rotating direction of the disk; and a ground pad provided on a plane of the head slider body facing the disk and between a foremost one of the dynamic-pressure generating parts and a rearmost one of the dynamic-pressure generating parts in the rotating direction of the disk, the ground pad projecting so as to be closest to the disk, and a read/write apparatus using the same.

According to further aspect of the present invention, there is provided a head slider, on which a read/write head for reading and/or writing information on a disk being a rotatable recording medium is mounted, the head slider comprising: a head slider body; at least two dynamic-pressure generating parts for generating a dynamic pressure, the dynamic-pressure generating parts being provided on a surface of the head slider body facing the disk so as to be arranged on both sides of a slot in the rotating direction of the disk; and a recessed portion formed in a front edge of a rearmost one of the dynamic-pressure generating parts in the rotating direction of the disk, the front edge facing the slot, and a read/write apparatus.

The negative-pressure generating part may be provided by forming a cut-out in the dynamic-pressure generating part. The head slider body may be formed with at least two dynamic-pressure generating parts arranged in the rotating direction of the disk, each of the dynamic-pressure generating parts being the same as the dynamic-pressure generating part, and the negative-pressure generating part may be provided in a rearmost one of the dynamic-pressure generating parts in the rotating direction of the disk. The dynamic-pressure generating part may have a length in a direction substantially perpendicular to the rotating direction, which is greater than a length of the dynamic-pressure generating part in the rotating direction. The head slider may further comprise a negative-pressure generating part for generating a negative pressure, the negative-pressure generating part being provided in the rearmost one of the dynamic-pressure generating parts. The dynamic-pressure generating part may include a positive-pressure generating region and a negative-pressure generating region. The rearmost one of the dynamic-pressure generating parts may be provided with a first cut-out, which forms a first step extending substantially in the rotating direction and a second step extending in a direction substantially perpendicular to the rotating direction.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 5 is a graph showing the relationship between the ratio of the flying force in the inner peripheral portion to that in the outer peripheral portion when the spacing is constant at the rear end of the slider, and the ratio of the whole length L of a front dynamic-pressure generating part in the disk rotating direction to the length S of a land portion in the same direction;

FIG. 13 is a graph showing pressure distributions in a direction substantially perpendicular to a disk rotating direction (in a lateral direction of a slider) at a rear dynamic-pressure generating part;

FIG. 35 is a schematic perspective view of a conventional taper flat slider; and FIG. 36 is an explanatory drawing illustrating the equivalent yaw-angle variation during a seek operation.

DESCRIPTION OF THE PREFERRED EMBODIMENTS

Referring now to the accompanying drawings, the preferred embodiments of the present invention will be described below. In this specification, the preferred embodiments of a magnetic disk drive will be described as an example of a read/write apparatus. However, the present invention should not be limited thereto, and it may be applied to other read/write apparatuses wherein a head is supported on a slider. For example, the present invention may be applied to an optical disk drive wherein an optical (objective) lens is loaded on a slider for optical reading and/or writing. Alternatively, a solid immersion lens (SIL), a super-spherical SIL, an optical fiber probe and so forth, which are used for a near-field optical applied recording utilizing evanescent light which is expected as a generation optical recording, may be loaded on a slider of the present invention.

Before the preferred embodiments of the present invention are described, the schematic construction of a magnetic disk drive will be described.

Figure 1:
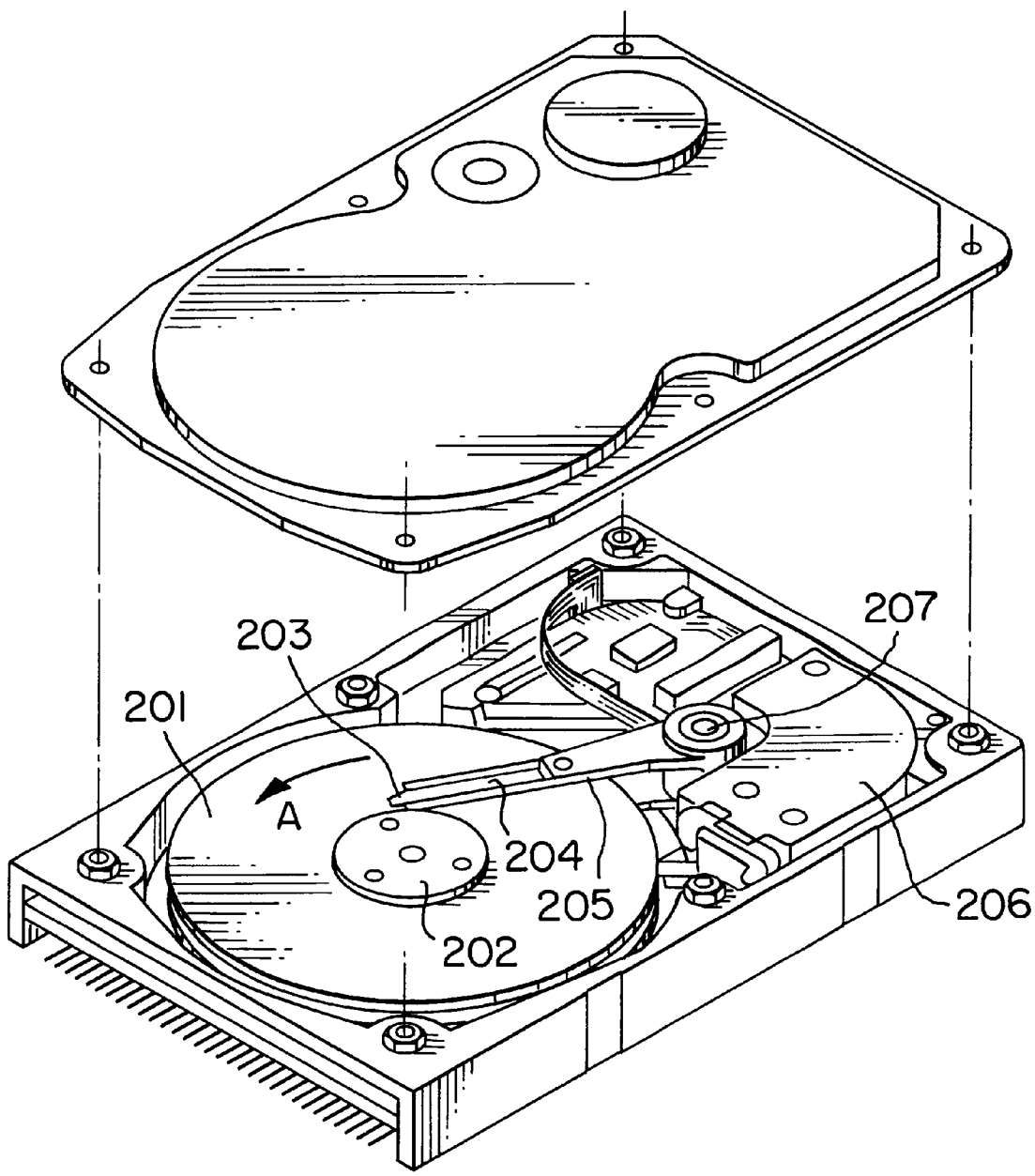
FIG. 1 is a schematic perspective view of a magnetic disk drive serving as an example of a read/write apparatus.

FIG. 1 schematically illustrates a magnetic disk drive using a rotary actuator. A disk 201 is loaded on a spindle 202 to be rotated at a predetermined speed of rotation. A magnetic pole for reading and/or writing information is loaded on a slider 203. The slider 203 is mounted on the tip of thin plate suspension 204 and the slider 203 [moves] in the state of either floating over the disk 201 or contacting therewith. The suspension 204 is connected to one end of an actuator arm 205, which has a bobbin portion or the like for holding a driving coil (not shown). On the other end of the actuator arm 205, a voice coil motor 206, which is a kind of linear motor, is provided. The voice coil motor 206 comprises the driving coil (not shown), which is wound onto the bobbin portion of the actuator arm 205, and a magnetic circuit, which comprises permanent magnets facing each other via the driving coil and opposed yokes. The actuator arm 205 is retained by two ball bearings (not shown), which are provided on a fixed shaft 207 at positions vertically apart from each other, so that the actuator arm 205 is pivotable and oscillatable by means of the voice coil motor 206.

Figure 2:
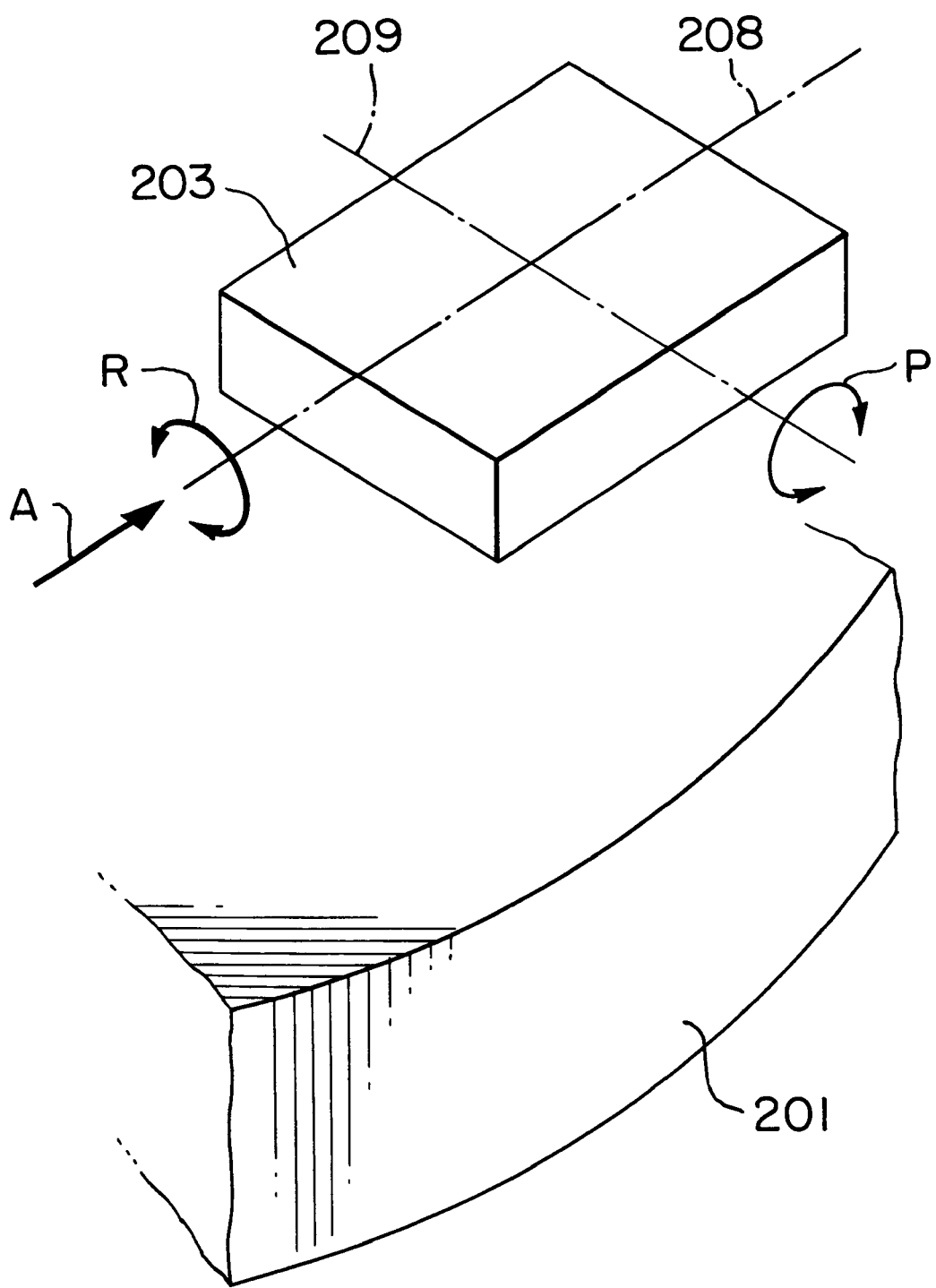
FIG. 2 is an explanatory drawing illustrating the flying attitude of a slider.

Referring to FIG. 2, the flying attitude of the slider will be simply described below.

The slider 203 is retained by the suspension via a flexible member (gimbal) (not shown) for causing the attitude of the slider 203 to correspond to that of the disk 201 during operation. All or a part of the slider 203 flies above the disk 201 by a dynamic pressure of air flow generated by the rotation of the disk 201. The attitude of the slider 203 may be delicately varied by some manufacturing errors or the fluctuation in dynamic pressure. This variation may be defined as rolling and pitching. As shown in FIG. 2, the rolling means rotation R of the slider 203 about an axis 208, which substantially corresponds to the disk rotating direction A, and the pitching means rotation P of the slider 203 about an axis 209 perpendicular to the longitudinal direction of the slider 203.

First Preferred Embodiment

Figure 3A:
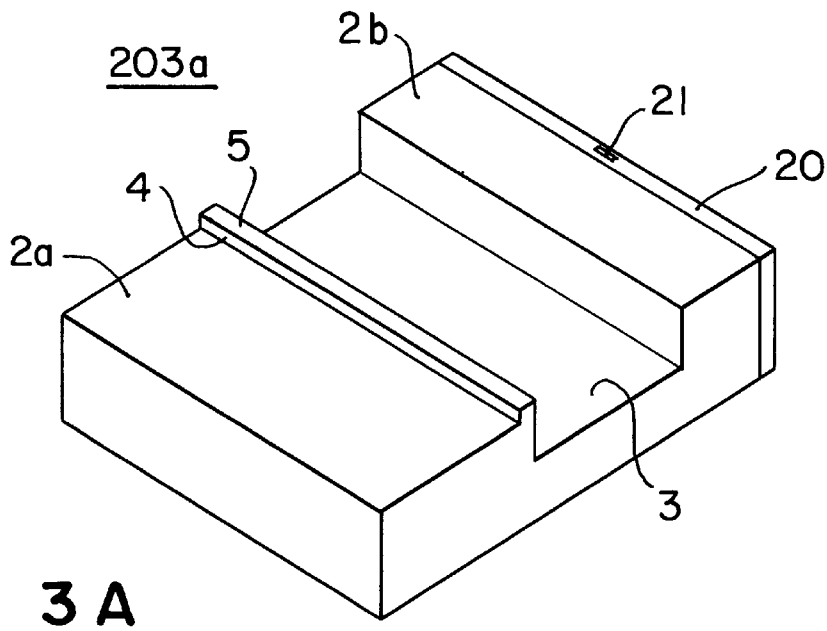
FIG. 3A is a perspective view of the first preferred embodiment of a head slider according to the present invention.
Figure 3B:
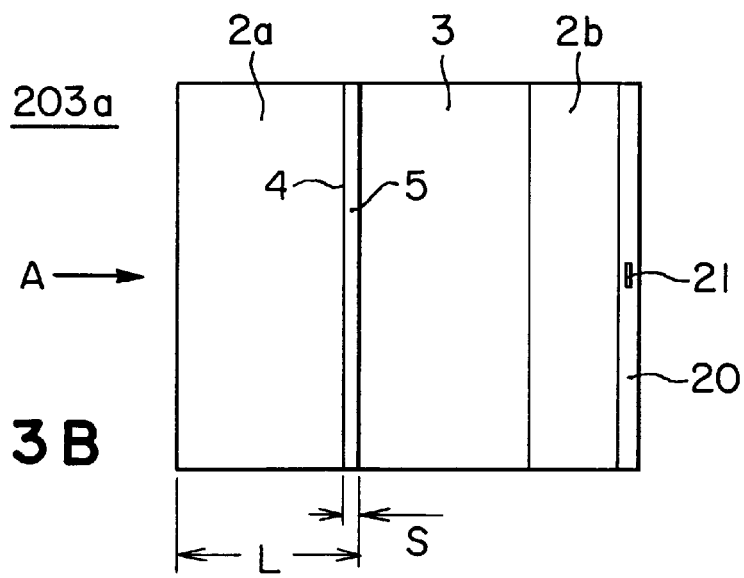
FIG. 3B is a plan view of the head slider of FIG. 3A.
Figure 3C:
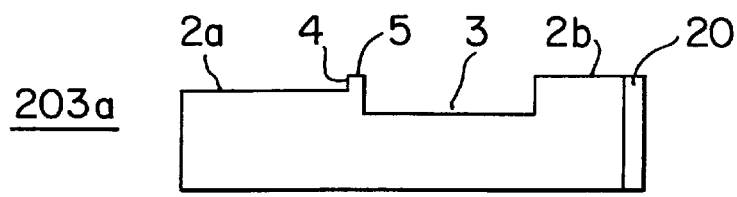
FIG. 3C is a side view of the head slider of FIG. 3A.

Referring to FIGS. 3A through 3C, the first preferred embodiment of a head slider, according to the present invention, will be described below.

FIG. 3A is a perspective view of the first preferred embodiment of a head slider according to the present invention, FIG. 3B is a plan view of the head slider of FIG. 3A, and FIG. 3C is a side view of the head slider of FIG. 3A. FIG. 3B shows a slider surface facing a disk (not shown). On the rear end face of a slider 203 in a disk rotating direction A, a read/write head 20 having a magnetic pole 21 is mounted.

As described above, the variation in flying height and so forth due to the equivalent variation in yaw angle is caused by the decrease of the dynamic-pressure generating efficiency due to the transverse leakage of air flow. This phenomenon conspicuously occurs in a slider having a long dynamic-pressure generating part in the disk rotating direction A, which is typically a so-called taper flat slider. In order to reduce the yaw angle dependence, the slider 203 preferably has laterally extending dynamic-pressure generating parts 2a and 2b so that the lengths of the dynamic-pressure generating parts 2a and 2b of the slider 203a in a direction perpendicular to the disk rotating direction A are longer than those in the disk rotating direction A as shown in FIGS. 3A and 3B. However, if the whole slider 203a has a laterally extending shape, there is a problem in that the pitching stiffness decreases. Therefore, in this preferred embodiment, two laterally extending dynamic-pressure generating parts 2a and 2b are arranged at the front and rear portions in the disk rotating direction A. The front and rear dynamic-pressure generating parts 2a and 2b are separated from each other by a deep slot 3 wherein little dynamic pressure is generated due to air flow. The deep slot 3 is formed by machining or etching.

On the other hand, if the slider 203a has only a plurality of laterally extending dynamic-pressure generating parts 2a and 2b, although it is possible to suppress the transient variation of flying height due to the decrease of the yaw angle dependence, the difference between the flying heights in the inner and outer peripheral portions of the disk is caused. Therefore, in this preferred embodiment, in order to suppress the difference between the flying heights in the inner and outer peripheral portions regardless of the yaw angle dependence, a land portion 5 is formed by providing a step 4, which extends in a direction perpendicular to the disk rotating direction A, in a part of the front dynamic-pressure generating part 2a. The step 4 is formed by etching while masking the land portion 5. The depth of the step 4 is preferably substantially equal to the flying height of the rear end portion of the front dynamic-pressure generating part 2a, and the step 4 may be very shallowly formed. Therefore, it is possible to form the step 4 in a short time, and it is possible to easily carry out the masking. In addition, if the land portion 5 and the rear dynamic-pressure generating part 2b are formed at the same plane (see FIG. 3C), the dynamic-pressure generating parts 2a and 2b can be formed in a single etching process, so that it is possible to improve the manufacturing efficiency and to provide a structure which is suitable for mass production.

The reasons why the difference between the flying heights in the inner and outer peripheral portions of the disk can be suppressed in this preferred embodiment will be described below.

The rear dynamic-pressure generating part 2b has a laterally extending flat surface, the width of which in the disk rotating direction A is shorter than the length of the flat surface substantially in a direction perpendicular to the disk rotating direction A. During operation, the rear dynamic-pressure generating part 2b flies at a predetermined pitching, as the front dynamic-pressure generating part 2a flies.

Figure 4:
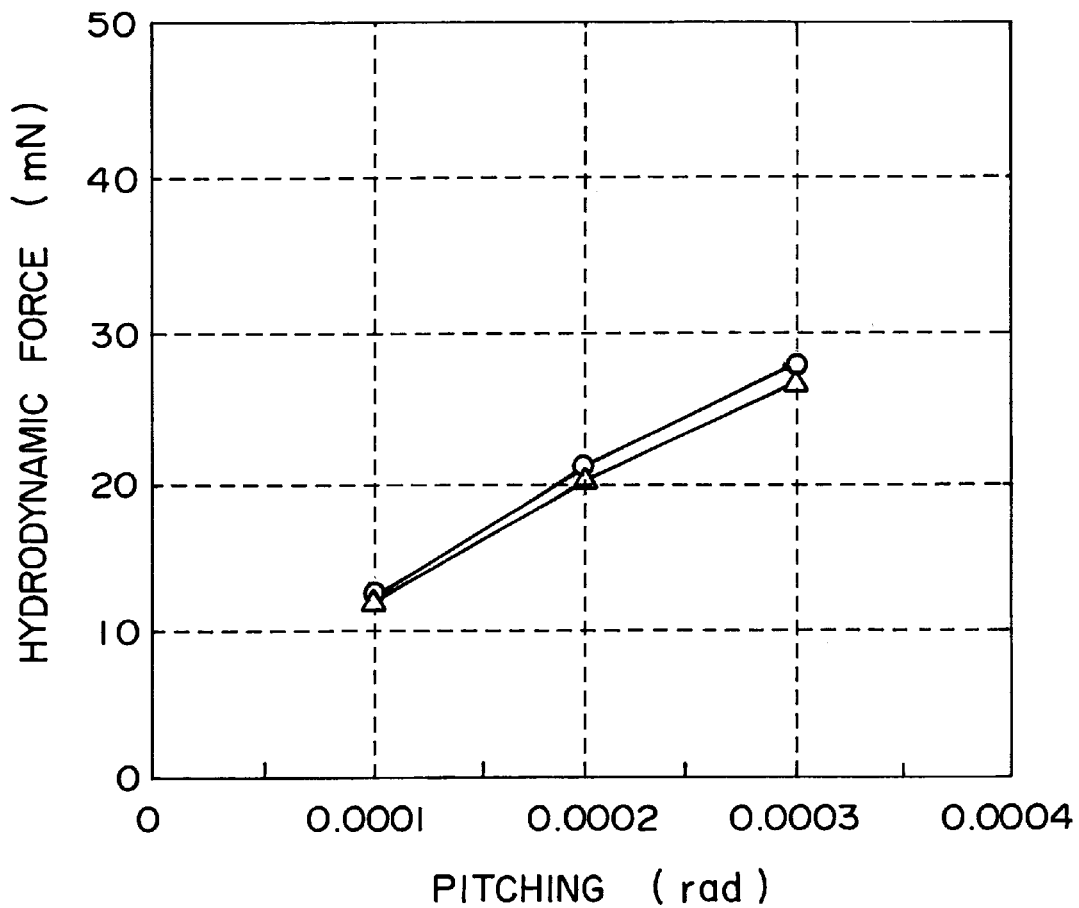
FIG. 4 is a graph showing the relationship between the flying force and the pitching at a rear dynamic-pressure generating part when the spacing is constant at the rear end of the dynamic-pressure generating part.

FIG. 4 shows the relationship between the flying force and the pitching in the rear dynamic-pressure generating part when the spacing (the flying gap) at the rear end of the rear dynamic-pressure generating part is constant. In FIG. 4, ○ shows the result when the slider 203a is positioned on the outer peripheral side of the disk, and Δ shows the result when the slider 203a is positioned on the inner peripheral side of the disk. As shown in FIG. 4, if the pitching is constant, there is no difference between the flying forces on the inner and outer peripheral sides. That is, it can be seen that the variation in flying force in the rear dynamic-pressure generating part 2b is under the influence of the variation in pitching, in comparison with the difference between the peripheral velocities of the inner and outer peripheral portions of the disk.

Therefore, in order to suppress the difference between the flying heights in the inner and outer peripheral portions regardless of the yaw angle dependence, the pitching of the rear dynamic-pressure generating part 2b should be substantially constant in the inner and outer peripheral portions of the disk. That is, if the shape of the front dynamic-pressure generating part 2a is set so that the pitching of the rear dynamic-pressure generating part 2b is not different in the inner and outer peripheral portions, the spacing at the rear end of the rear dynamic-pressure generating part 2b having the magnetic pole 21 can be maintained to be constant regardless of the difference between the peripheral velocities of the inner and outer peripheral portions of the disk.

FIG. 5 shows the ratios of the flying forces exerting on the inner and outer peripheral portions of the front dynamic-pressure generating part 2a, versus the ratios of the whole length L of the front dynamic-pressure generating part 2a of the slider 203a shown in FIG. 3 in the disk rotating direction A to the length S of the land portion 5 in the same direction, when the pitching and spacing of the slider 203a at the rear end thereof are constant. In FIG. 5, the analyzed results of four shapes obtained by varying the conditions such as the whole length L of the front dynamic-pressure generating part 2a and the depth of the step 4 are shown. The analyzing conditions for the four shapes are as follows.

|   | WHOLE LENGTH L | DEPTH OF STEP |
|---|---|---|
| □ | 0.2 mm | 0.1 μm |
| ○ | 0.3 mm | 0.1 μm |
| Δ | 0.4 mm | 0.2 μm |
| ▽ | 0.4 mm | 0.3 μm |

Furthermore, the spacing of the slider 203a is 50 nm, and the pitching thereof is 100 μrad.

As can be seen from the analyzed results, in a first region in which the ratio of the length S of the land portion 5 to the whole length L is 50% or more, the flying force on the outer peripheral side of the disk is greater than the flying force on the inner peripheral side of the disk. On the other hand, in a second region in which the ratio of the length S of the land portion 5 to the whole length L is greater than 10% and smaller than 50%, the variation in flying force in the inner and outer peripheral portions of the disk is relatively small. Moreover, in a third region in which the ratio of the length S of the land portion 5 to the whole length L is not greater than 10%, the flying force on the outer peripheral side of the disk is smaller than the flying force on the inner peripheral side of the disk.

Figure 6:
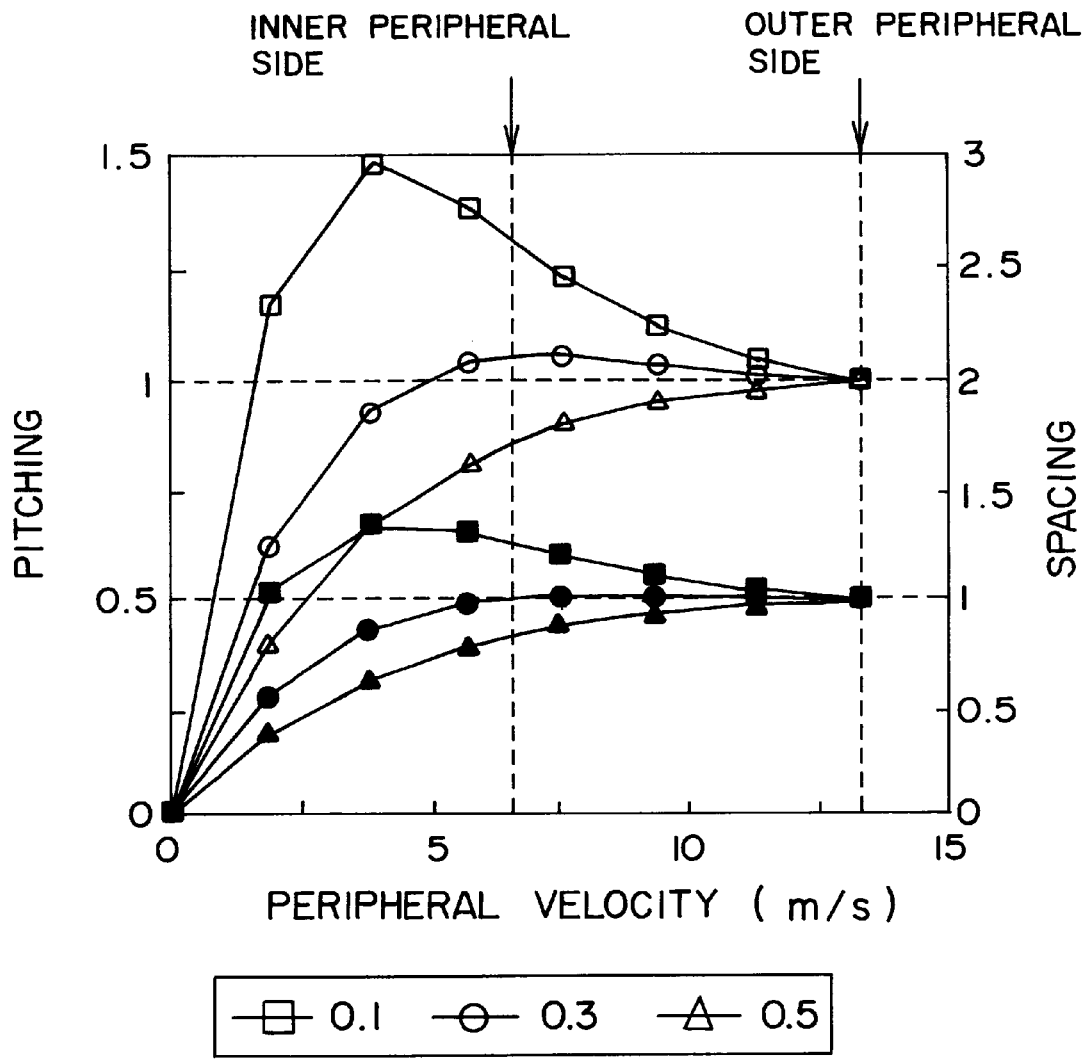
FIG. 6 is a graph showing the variations in pitching and spacing of a slider at a rear end of a rear dynamic-pressure generating part, at which a head is provided, versus the peripheral velocity of a disk.

FIG. 6 shows the variations in the pitching and spacing of the slider 203a at the rear end of the rear dynamic-pressure generating part 2b, at which the head is provided, versus the peripheral velocity of the disk when the front dynamic-pressure generating parts belonging to the aforementioned three regions are used. In FIG. 6, the axis of coordinates shows the ratios of pitching and spacing on the outer peripheral side of the disk.

First, in a case where a front dynamic-pressure generating part belonging to the first region (the ratio is 50%) is used, the pitching increases (Δ in FIG. 6) from the inner to the outer peripheral portions of the disk as the peripheral velocity of the disk increases (as the slider approaches the outer periphery of the disk). Therefore, the spacing also increases (▲ in FIG. 6), so that it is not possible to achieve a constant flying height above the inner and outer peripheral portions of the disk.

In addition, in a case where a front dynamic-pressure belonging to the third region (the ratio is 10%) is used, the pitching decreases (□ in FIG. 6) from the inner to the outer peripheral portions of the disk as the peripheral velocity of the disk increases (as the slider approaches the outer periphery of the disk). Therefore, the spacing also decreases (■ in FIG. 6), so that it is not possible to achieve a constant flying height above the inner and outer peripheral portions of the disk.

On the other hand, in a case where a front dynamic-pressure belonging to the second region (the ratio is 30%) is used, the pitching (○ in FIG. 6) and the spacing (● in FIG. 6) are substantially constant in the inner and outer peripheral portions of the disk regardless of the difference in peripheral velocity of the disk, so that it is possible to achieve a constant flying height above the inner and outer peripheral portions of the disk.

Therefore, if the length of the land portion 5 formed on the front dynamic-pressure generating part 2a in the disk rotating direction A is greater than 10% of the whole length of the front dynamic-pressure generating part 2a in the same direction A and smaller than 50% thereof, it is possible to achieve a constant flying height above the inner and outer peripheral portions of the disk (assuming that about ±10% of variation in flying height is allowable). Moreover, if the length of the land portion 5 is about 30% of the whole length of the dynamic-pressure generating part 2a, it is possible to achieve a substantially completely constant flying height above the inner and outer peripheral portions of the disk.

Furthermore, it is known that when the length of the land portion 5 is about 30% of the whole length of the dynamic-pressure generating part 2a, the dynamic-pressure generating efficiency is maximum at a so-called step bearing wherein the land portion is formed by providing the step. Therefore, in this case, it is possible to achieve a constant flying height above the inner and outer peripheral portions of the disk and to generate a sufficiently effective dynamic pressure in a limited slider area.

As described above, according to the first preferred embodiment of the present invention, it is possible to suppress the transient variation in flying height by decreasing the yaw angle dependence and to achieve a constant flying height above the inner and outer peripheral portions of the disk.

If moisture is condensed between the slider and the disk during stopping of the disk, the slider may sticked onto the disk, so that it may be difficult to smoothly fly the slider during starting of the disk. In order to eliminate this problem, fine irregularities called texture have been formed on the surface of the disk 31 to maintain a gap between the disk and the slider during stopping. However, this texture may cause to increase the risk of allowing the slider to collide with the disk by the dispersion in flying height during operation, so as to prevent the flying height of the slider from being decreased.

Figure 7:
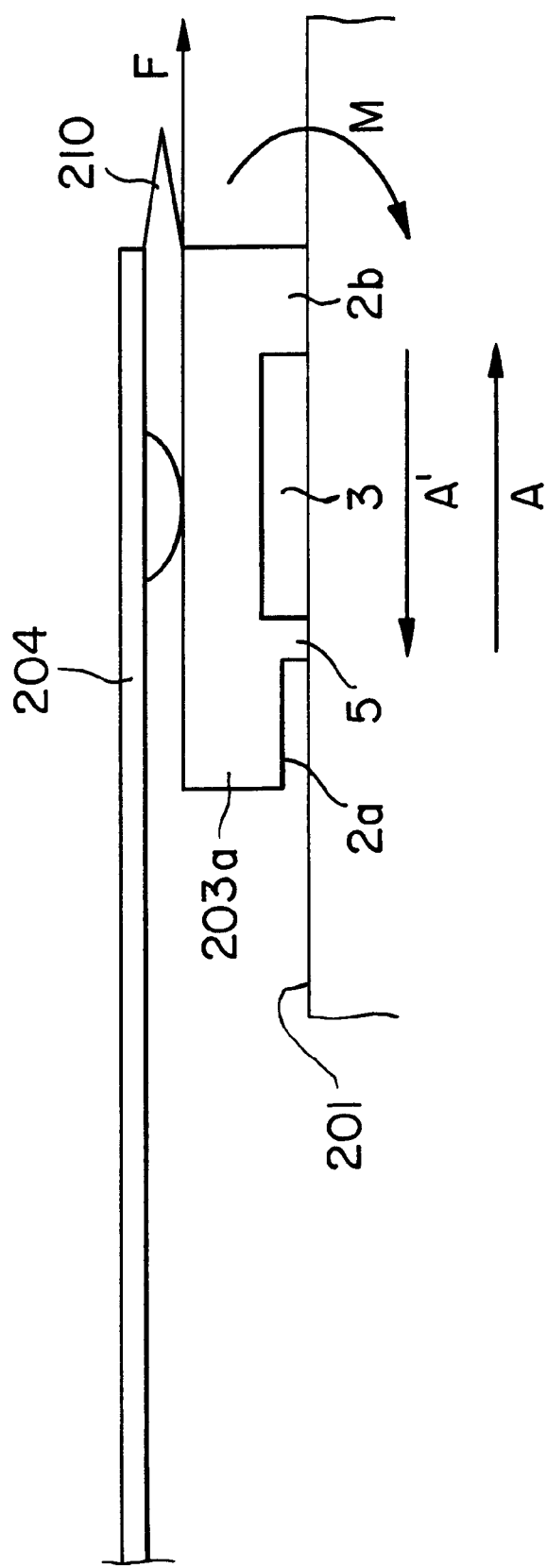
FIG. 7 is an explanatory drawing illustrating the state during starting of a disk.

On the other hand, during starting of a disk, the disk does not only move in a predetermined rotating direction, but it also starts to rotate while oscillating forwards and backwards. This state is shown in FIG. 7. The movement of the disk 201 oscillating forwards and backwards is caused by the exiting timing and the positional relationship between the magnetic pole of the motor and the coil during starting of the disk. Immediately after the disk 201 starts to move in the opposite direction A' to the rotating direction A, a reaction force F from the suspension 204 exerts on the slider 203a supported on the suspension 204 via the gimbal 210 as shown in FIG. 7. By this reaction force F, a moment M acts around the rear end of the slider 203a serving as a fulcrum so as to peel away the front dynamic-pressure generating part 2a. At this time, in the slider 203a, the ground contact area of the front dynamic-pressure generating part 2a to the disk 201 is smaller than that of the rear dynamic-pressure generating part 2b, so that the front dynamic-pressure generating part 2a is first easily peeled from the disk 201. Thereafter, when the disk 201 starts to move in the normal rotating direction A, the dynamic pressure of air flow easily causes pitching, so that the whole slider 203a is easily peeled from the disk 201. That is, according to this preferred embodiment, since only the land portion 5 contacts the disk 201 in the front dynamic-pressure generating part 2a, the ground contact area of the front dynamic-pressure generating part 2a can be smaller than the ground contact area of the rear dynamic-pressure area, so that it is possible to effectively prevent the aforementioned absorption phenomenon.

Figure 8A:
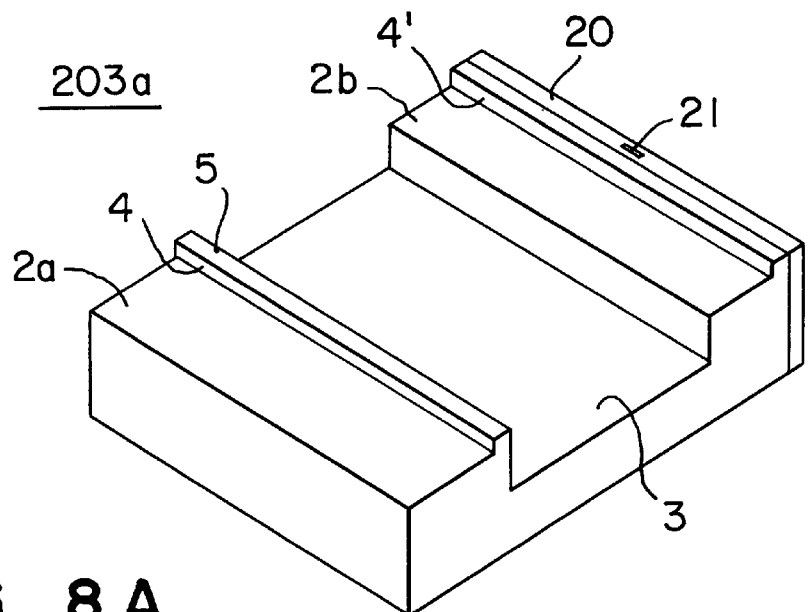
FIG. 8A is a perspective view of a modified example of the first preferred embodiment of a head slider according to the present invention.
Figure 8B:
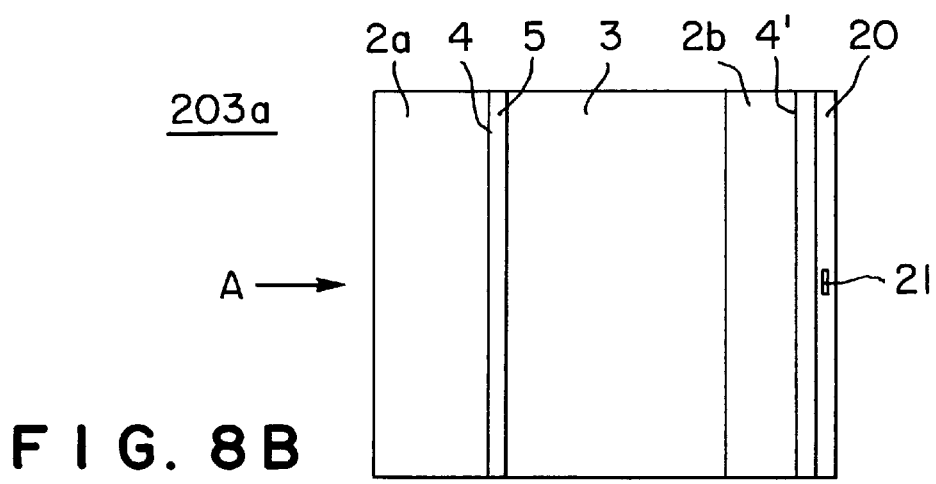
FIG. 8B is a plan view of the head slider of FIG. 8A.
Figure 8C:
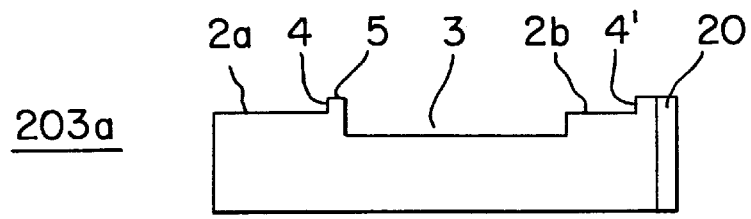
FIG. 8C is a side view of the head slider of FIG. 8A.

In the preferred embodiment as described above, while the step 4 has been provided only on the front dynamic-pressure generating part 2a, steps 4 and 4' may be provided on the front and rear dynamic-pressure generating parts 2a and 2b as shown in FIGS. 8A, 8B and 8C. In this case, it is possible to obtain the same functions and advantages as those in the first preferred embodiment described above. With this construction, since the rear dynamic-pressure generating part 2b can have the same flying force as that of the front dynamic-pressure generating part 2a, it is possible to decrease the whole area of the rear dynamic-pressure generating part 2b to decrease the size of the whole slider, so that it is possible to more efficiency reduce the stiction.

Second Preferred Embodiment

Referring to FIG. 9, the second preferred embodiment of the present invention will be described below.

Figure 9A:
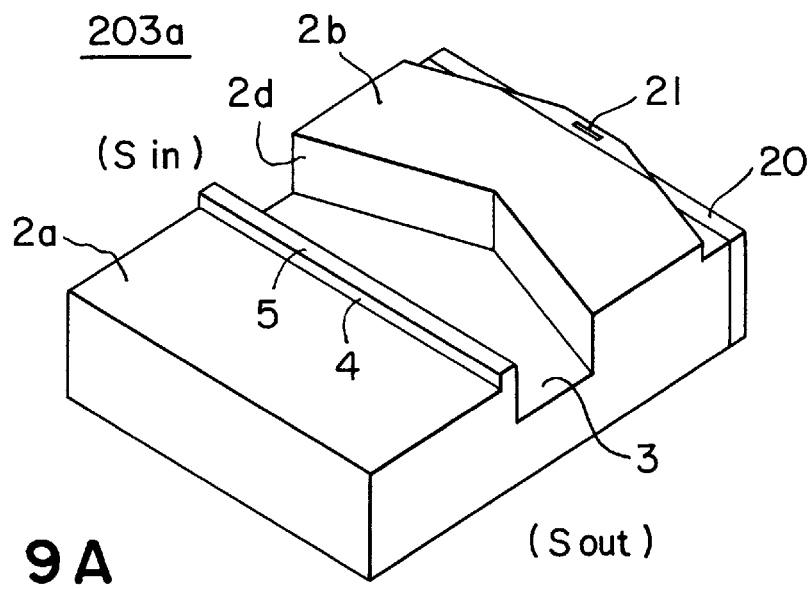
FIG. 9A is a perspective view of the second preferred embodiment of a head slider according to the present invention.
Figure 9B:
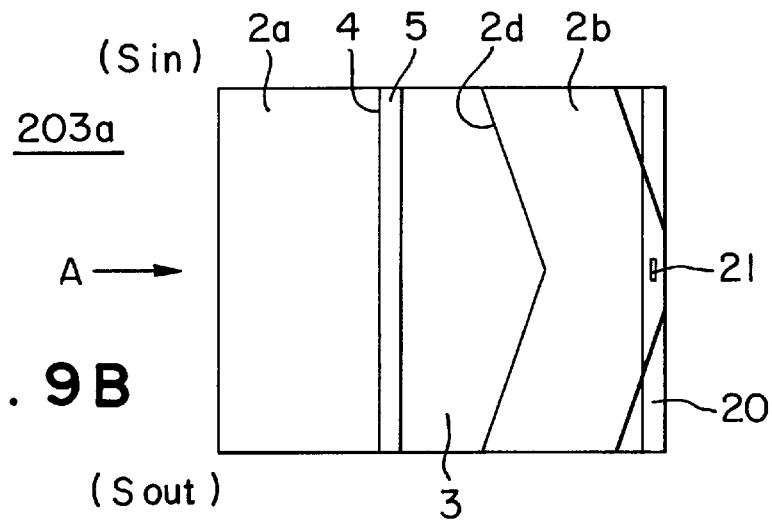
FIG. 9B is a plan view of the head slider of FIG. 9A.
Figure 9C:
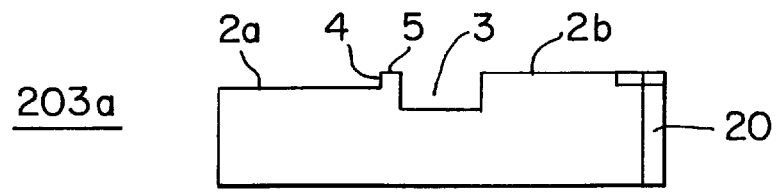
FIG. 9C is a side view of the head slider of FIG. 9A.

FIG. 9A is a perspective view of the second preferred embodiment of a head slider according to the present invention, FIG. 9B is a plan view of the head slider of FIG. 9A, and FIG. 9C is a side view of the head slider of FIG. 9A. In FIGS. 9A thorough 9C, the same reference numbers are used for the same parts or the parts having the same functions as those shown in FIGS. 2 and 3A through 3C to omit duplicate descriptions (the same in all the preferred embodiments thereafter).

In this preferred embodiment, a slider 203a has front and rear dynamic-pressure generating parts 2a and 2b, which are apart from each other in a disk rotating direction A. In order to suppress the difference between the flying heights in the inner and outer peripheral portions of the disk, the front dynamic-pressure generating part 2a has a land portion 5, which is formed by providing a step 4. The rear dynamic-pressure generating part 2b has a substantially V-shape as shown in FIGS. 9A and 9B.

In the slider 203a having laterally extending dynamic-pressure generating parts 2a and 2b as described in the first preferred embodiment, if a yaw angle exists on the outer peripheral side of the disk, the center of a dynamic pressure generated by an air flow is shifted toward the disk inner-peripheral side Sin of the slider 203a. Therefore, the slider 203 flies in a rolling attitude so that the disk inner-peripheral side Sin is higher and the disk outer-peripheral side Sout is lower. In addition, rolling of the slider 203a may occur under the influence of the installation error of a suspension (not shown) for supporting the slider 203a, the irregularities on the surface of the disk, the vibrations from the outside of the apparatus and so forth. In such a case, the side end portions on the disk inner and outer peripheral sides, at which the flying height is lowest, of the rear end of the slider 203a may collide with the disk. Therefore, the side end portions on the disk inner and outer peripheral sides of the rear dynamic-pressure generating part 2b are chamfered. In addition, in order to prevent the rolling stiffness of the slider 203a from decreasing, the area of the rear dynamic-pressure generating part 2b near the side of the slider is ensured by forming the substantially V-shaped rear dynamic-pressure generating part 2b as shown in FIGS. 9A and 9B.

According to this preferred embodiment, similar to the first preferred embodiment, it is possible to suppress the transient variation in flying height by decreasing the yaw angle dependence and to achieve a constant flying height above the inner and outer peripheral portions of a disk. In addition, even if rolling occurs in the slider 203a, there is no possibility that the side end portions of the rear dynamic-pressure generating part 2b collide with the disk.

Figure 10A:
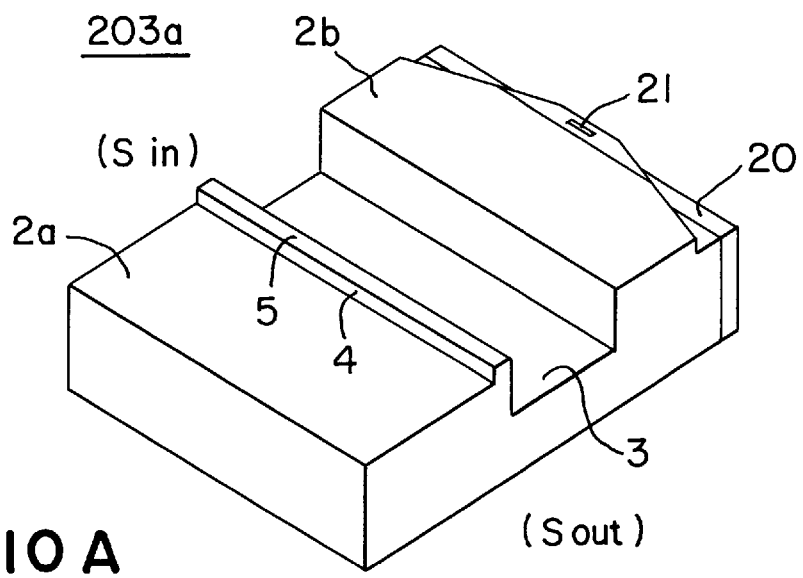
FIG. 10A is a perspective view of a modified example of the second preferred embodiment of a head slider according to the present invention.
Figure 10B:
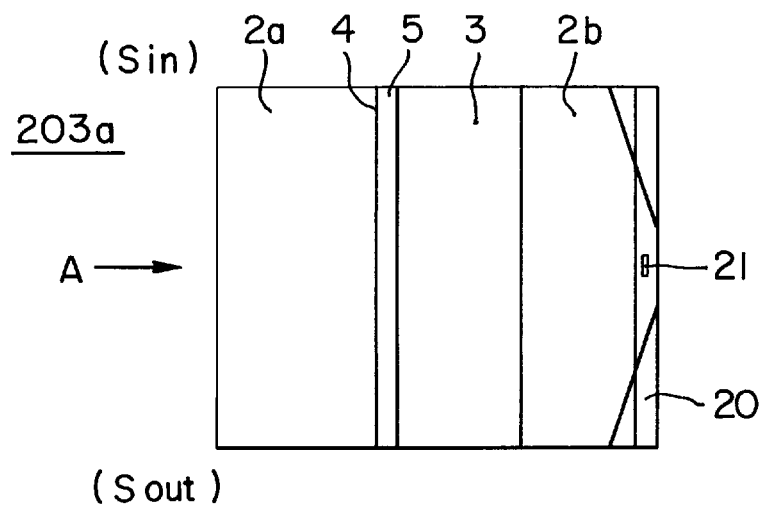
FIG. 10B is a plan view of the head slider of FIG. 10A.
Figure 10C:
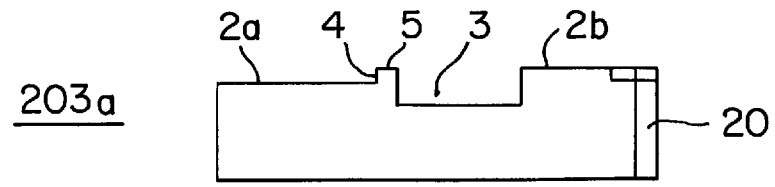
FIG. 10C is a side view of the head slider of FIG. 10A.

Furthermore, the shape of the rear dynamic-pressure generating part 2b should not be limited to the substantially V-shape. As long as the rolling stiffness can be ensured, the rear dynamic-pressure generating part 2b may have a shape obtained only by chamfering the disk inner peripheral side Sin and the disk outer peripheral side Sout thereof as shown in FIGS. 10A through 10C.

If the chamfered portion has the same depth as that of the step 4 of the front dynamic-pressure generating part 2a to be formed by a single etching process, it is possible to improve the manufacturing efficiency.

Third Preferred Embodiment

Figure 11A:
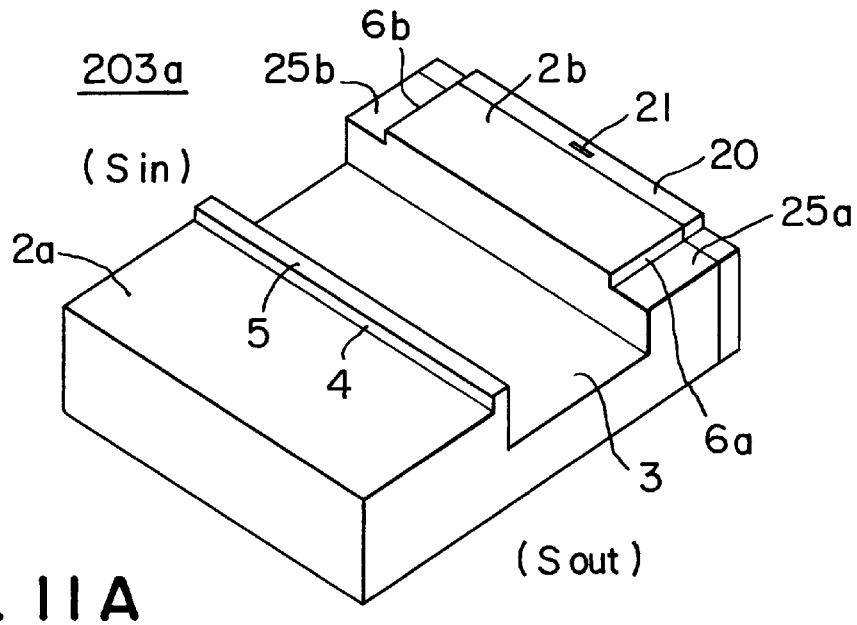
FIG. 11A is a perspective view of the third preferred embodiment of a head slider according to the present invention.
Figure 11B:
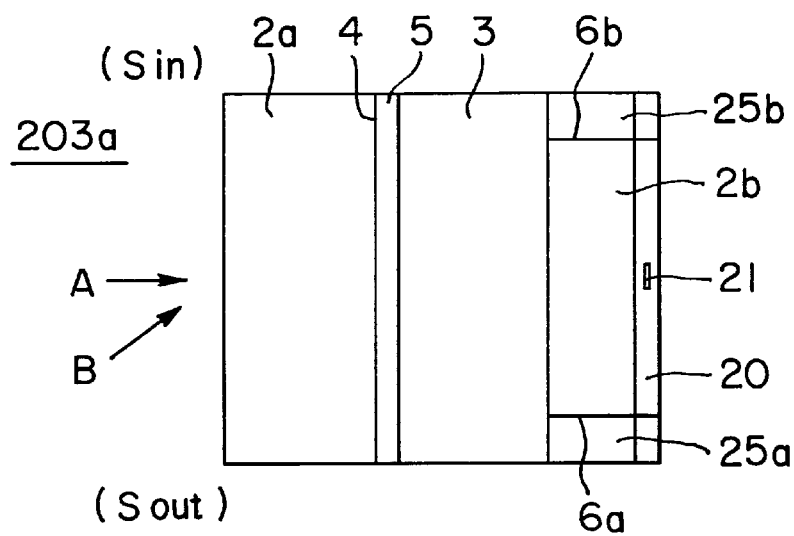
FIG. 11B is a plan view of the head slider of FIG. 11A.
Figure 11C:
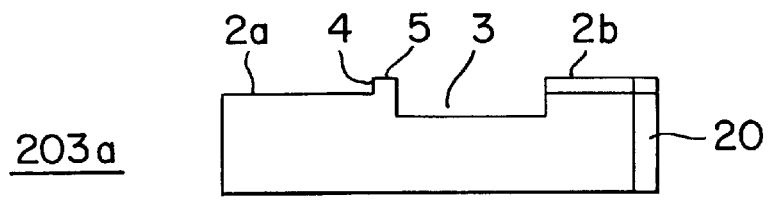
FIG. 11C is a side view of the head slider of FIG. 11A.

Referring to FIGS. 11A through 11C, the third preferred embodiment of the present invention will be described below.

FIG. 11A is a perspective view of the third preferred embodiment of a head slider according to the present invention, FIG. 11B is a plan view thereof, and FIG. 11C is a side view thereof.

In a slider 203a having laterally extending dynamic-pressure generating parts 2a and 2b as described in the first preferred embodiment, if a yaw angle exists on the outer peripheral side of the disk, the slider 203 flies in a rolling attitude so that the disk inner-peripheral side Sin is higher and the disk outer-peripheral side Sout is lower. Therefore, in this preferred embodiment, the slider 203a has two dynamic-pressure generating parts 2a and 2b, which are apart from each other in a disk rotating direction A. In order to suppress the difference between the flying heights in the disk inner and outer peripheral portions of the front dynamic-pressure generating parts 2a, the slider 203a has a land portion 5 formed by providing a step 4, cut-outs 25a and 25b formed on the side portions on the disk inner and outer peripheral sides of the rear dynamic-pressure generating part 2b, and steps 6a and 6b extending substantially in the disk rotating direction A.

Strictly speaking, the disk rotating direction in the disk inner peripheral portion is different from the disk rotating direction in the disk outer peripheral portion by a yaw angle. In FIG. 11B, the disk rotating direction is shown by arrow A when the slider 203a is positioned on the disk inner peripheral portion, and by arrow B when the slider 203a is positioned on the disk outer peripheral portion. In this case, a pressure (a positive pressure) in a direction, in which the slider 203a goes away from the disk, is generated at the step 6a on the disk outer peripheral side, and a pressure (a negative pressure) in the opposite direction is generated at the step 6b on the disk inner peripheral side. Therefore, the slider 203a tends to take a rolling attitude so that the disk inner peripheral side Sin is lower and the disk outer peripheral side Sout is higher. That is, since the center of a dynamic pressure generated by an air flow is shifted toward the disk inner peripheral portion if a yaw angle exists on the disk outer peripheral side, the steps 6a and 6b cause the opposite action to the action of the slider 203a tending to have a rolling attitude so that the disk inner peripheral side Sin is higher and the disk outer peripheral side Sout is lower. Therefore, both actions are canceled out, so that it is possible to prevent the rolling on the disk outer peripheral side.

Such a rolling preventing function is also effective when the equivalent yaw-angle variation occurs during seeking of the slider 203a. That is, even if the transient rolling occurs by the equivalent yaw-angle variation occurring during seeking of the slider 203a, it can be adjusted by the functions of the steps 6a and 6b, so that it is possible to prevent the risk of allowing the side end portion of the slider to collide with the disk.

According to this preferred embodiment, similar to the first preferred embodiment, it is possible to suppress the transient variation in flying height by decreasing the yaw angle dependence, and it is possible to achieve a constant flying height above the inner and outer peripheral portions of the disk. In addition, it is possible to prevent the transient variation in rolling during rolling and seeking. Therefore, there is no possibility that the rear dynamic-pressure generating part 2b collides with the disk.

Furthermore, if the depth of the step 4 of the front dynamic-pressure generating part 2a is the same as the depths of the steps 6a and 6b in this preferred embodiment to form the steps in a single etching process, it is possible to improve the manufacturing efficiency.

Fourth Preferred Embodiment

Figure 12A:
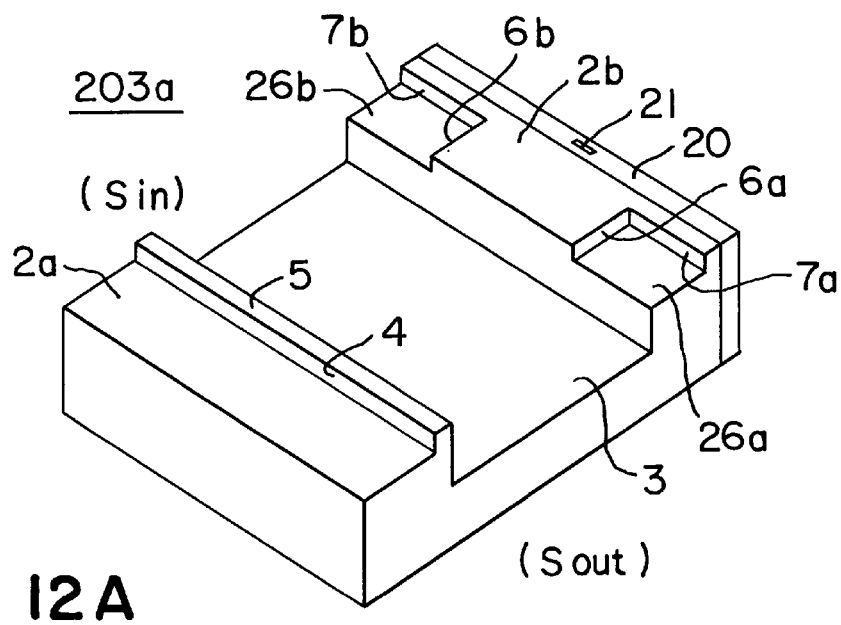
FIG. 12A is a perspective view of the fourth preferred embodiment of a head slider according to the present invention.
Figure 12B:
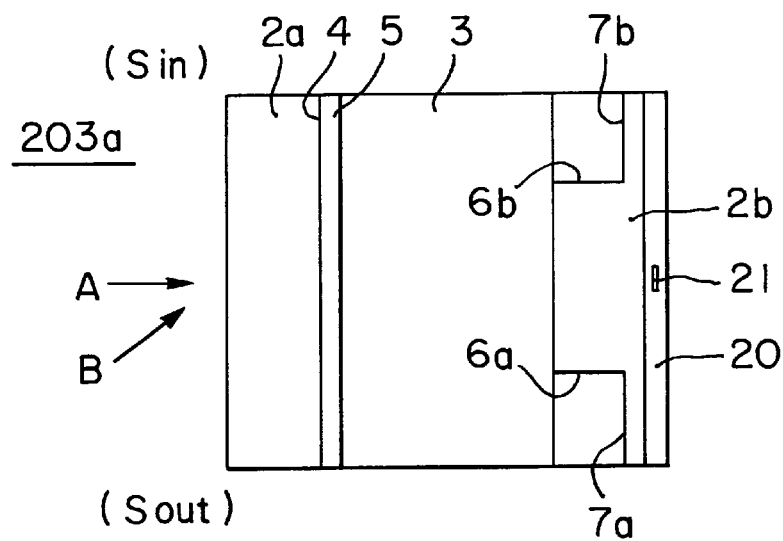
FIG. 12B is a plan view of the head slider of FIG. 12A.
Figure 12C:
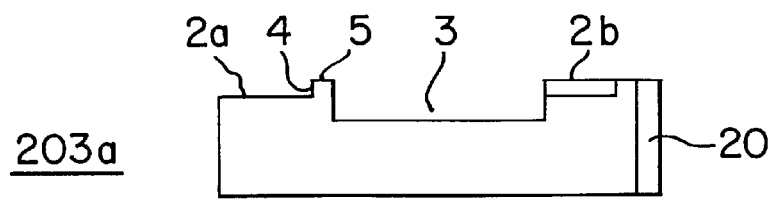
FIG. 12C is a side view of the head slider of FIG. 12A.

Referring to FIGS. 12A through 12C, the fourth preferred embodiment of the present invention will be described below.

FIG. 12A is a perspective view of the fourth preferred embodiment of a head slider according to the present invention, FIG. 12B is a plan view thereof, and FIG. 12C is a side view thereof.

According to the third preferred embodiment, it is possible to prevent the rolling of the slider 203a on the outer peripheral side of the disk. However, since the dynamic pressure in the cut-outs 25a and 25b provided in the side portion of the rear dynamic-pressure generating part 2b decreases, the rolling stiffness of the slider 203a slightly decreases. Therefore, in this preferred embodiment, the side portions of a rear dynamic-pressure generating part 2b have cut-outs 26a and 26b, which form steps 6a and 6b extending substantially in a disk rotating direction A and steps 7a and 7b extending in a direction perpendicular to the disk rotating direction A. With this construction, it is possible to obtain the same advantages as those in the third preferred embodiment. In addition, since a positive pressure is generated by the steps 7a and 7b, it is possible to enhance the pressure distribution near both ends while ensuring a predetermined dynamic pressure in the rear dynamic-pressure generating part 2b, so that it is possible to maintain a high rolling stiffness of the slider 203a.

FIG. 13 shows pressure distributions in a direction substantially perpendicular to the disk rotating direction (in the lateral direction of the slider) at the rear dynamic-pressure generating part 2b. In FIG. 13, D1 shows a pressure distribution when the dynamic-pressure generating part has a single flat surface as shown in the first preferred embodiment, and D2 shows a pressure distribution when the dynamic-pressure generating part in this preferred embodiment is used.

As shown in FIG. 13, in a case where the dynamic-pressure generating part has a single flat surface, there is provided a pressure distribution, in which pressure is maximum at the central portion in the lateral direction of the slider and approaches atmospheric pressure toward both ends. On the other hand, in a case where the dynamic-pressure generating part in this preferred embodiment is used, there is provided a pressure distribution, in which pressure is higher at the steps 7a and 7b and lower near the center in the slider lateral direction. Therefore, even if the flying force is the same at the rear dynamic-pressure generating part 2b, it is possible to obtain a higher rolling stiffness by the shape of the dynamic-pressure generating part in this preferred embodiment.

On the other hand, if the steps 7a and 7b are formed, it is possible to generate a greater positive pressure than that generated by the single flat surface as shown in the first preferred embodiment. Therefore, according to this preferred embodiment, it is possible to decrease the length of the rear dynamic-pressure generating part 2b in the disk rotating direction to decrease the size of the whole slider, and it is possible to decrease the ground contact area of the rear dynamic-pressure generating part during stopping of the disk, so that it is possible to prevent the stiction phenomenon of the slider.

According to this preferred embodiment, similar to the third preferred embodiment, it is possible to suppress the transient variation in flying height by decreasing the yaw-angle dependence and it is possible to achieve a constant flying height above the inner and outer peripheral portions of the disk. In addition, it is possible to prevent the rolling of the slider 203a on the outer peripheral side of the disk, and it is possible to maintain a high rolling stiffness, so that there is no possibility that the rear dynamic-pressure generating part 2b collides with the disk.

Furthermore, if the depths of the steps 6a, 6b, 7a and 7b provided in this preferred embodiment are the same as the depth of the step 4 in the front dynamic-pressure generating part 2a and if these steps are formed in a single etching process, it is possible to improve the manufacturing efficiency.

Fifth Preferred Embodiment

Figure 14A:
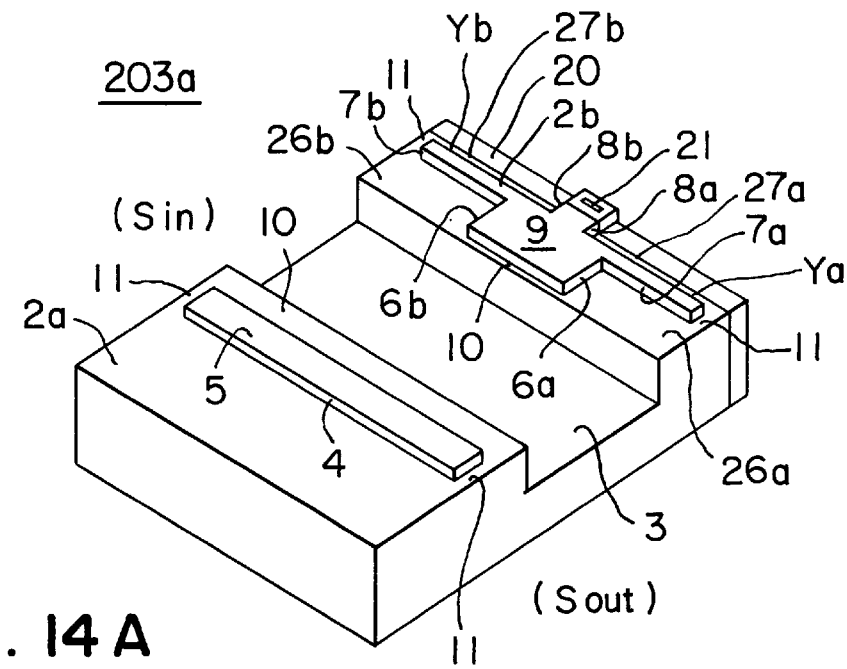
FIG. 14A is a perspective view of the fifth preferred embodiment of a head slider according to the present invention.
Figure 14B:
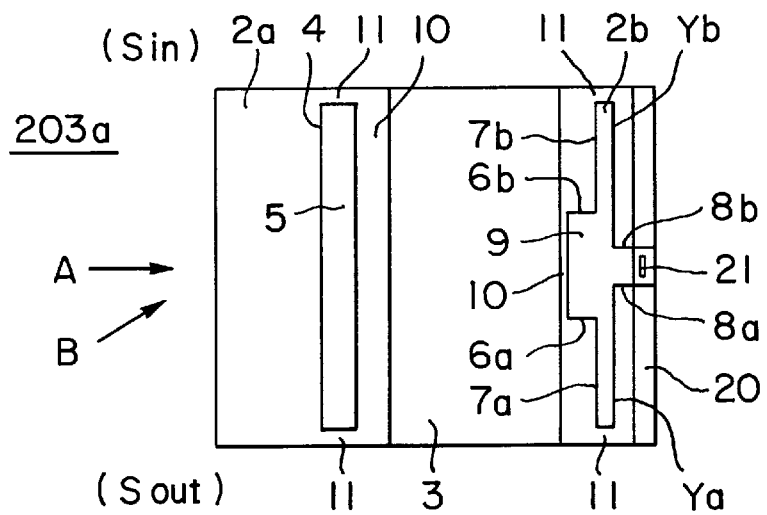
FIG. 14B is a plan view of the head slider of FIG. 14A.
Figure 14C:
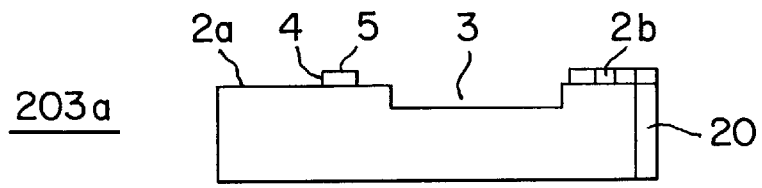
FIG. 14C is a side view of the head slider of FIG. 14A.

Referring to FIGS. 14A through 14C, the fifth preferred embodiment of the present invention will be described below.

FIG. 14A is a perspective view of the fifth preferred embodiment of a head slider according to the present invention, FIG. 14B is a plan view thereof, and FIG. 14C is a side view thereof.

In this preferred embodiment, the side end portions on the disk inner peripheral side Sin and the disk outer peripheral side Sout of the rear dynamic-pressure generating part 2b are chamfered so as to prevent the side end portions on the disk inner and outer peripheral sides of the rear dynamic-pressure generating part 2b of the slider 203a, at which the flying height is lowest, from colliding with the disk when rolling of the slider 203a occurs under the influence of the installation error of a suspension (not shown) for supporting the slider 203a, the irregularities on the surface of the disk, the vibrations from the outside of the apparatus and so forth. In this case, as shown in FIGS. 14A and 14B, cut-outs 27a and 27b, which form steps 8a and 8b and steps Ya and Yb facing steps 7a and 7b, are provided so as not to reduce the advantages of steps 6a and 6b provided in the side portions of the slider 203a. With this construction, even if rolling occurs in the slider 203a, there is no possibility that the side end portions of the rear dynamic-pressure generating part 2b collide with the disk.

Figure 15A:
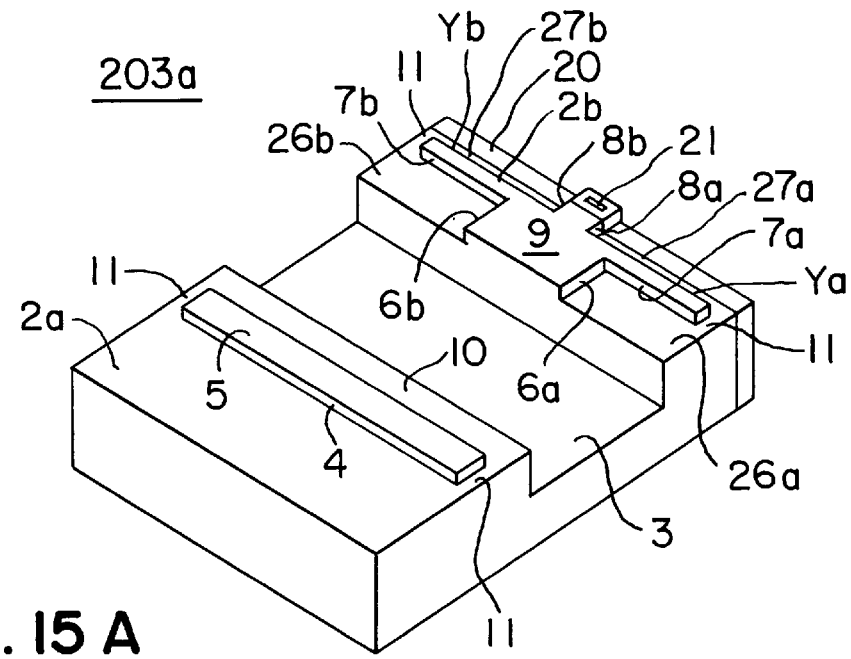
FIG. 15A is a perspective view of a modified example of the fifth preferred embodiment of a head slider according to the present invention.
Figure 15B:
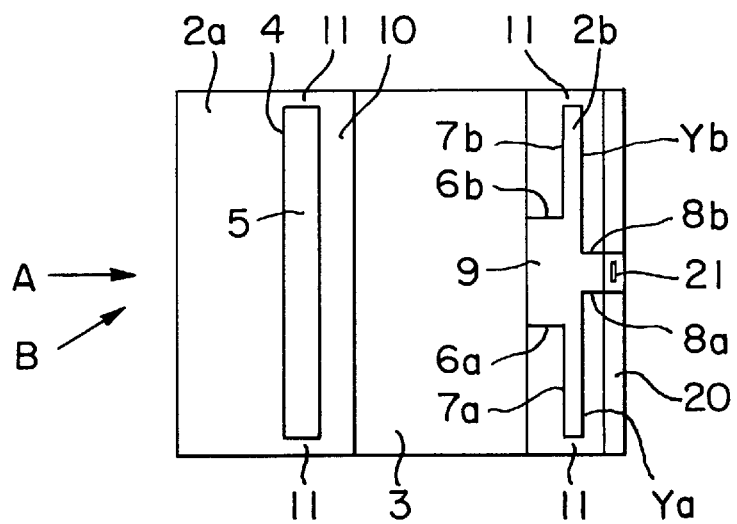
FIG. 15B is a plan view of the head slider of FIG. 15A.
Figure 15C:
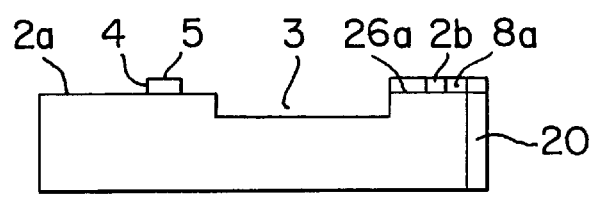
FIG. 15C is a side view of the head slider of FIG. 15A.

Moreover, in this preferred embodiment, margins 10 are set near a deep slot 3 of each of dynamic-pressure generating parts so as to prevent the sizes of land portions 5 and 9 formed in front and rear dynamic-pressure generating parts 2a and 2c from varying and to prevent defects, such as broken pieces, from being generated in the edge when the deep slot 3 is formed after the steps and so forth are formed. Furthermore, with this construction, it is assumed that the whole length of the front dynamic-pressure generating part 2a in the disk rotating direction A does not contain those of the margins 10. The dimensional errors caused when the deep slot 3 is formed are mainly caused by the thickness error of a blade, by which the working is carried out. On the other hand, since the influence of the variation in flying height due to the dimensional errors is small on the rear dynamic-pressure generating part 2b of the front and rear dynamic-pressure generating parts 2a and 2b, if the positioning of the front end of the rear dynamic-pressure generating part 2b and the end portion of the blade is accurately carried out, the margins 10 may be provided only on the rear end of the front dynamic-pressure generating part 2a. Such a head slider is shown in FIGS. 15A through 15C.

Usually, a plurality of sliders 203a are simultaneously formed while the sides thereof are connected to each other, and finally divided by cutting the sides. Therefore, in this preferred embodiment, margins 11 are also set near the side portions of each of the dynamic-pressure generating parts so as to prevent detects, such as broken pieces, from being generated in the edges of the land portions 5 and 9 during cutting.

Sixth Preferred Embodiment

Figure 16A:
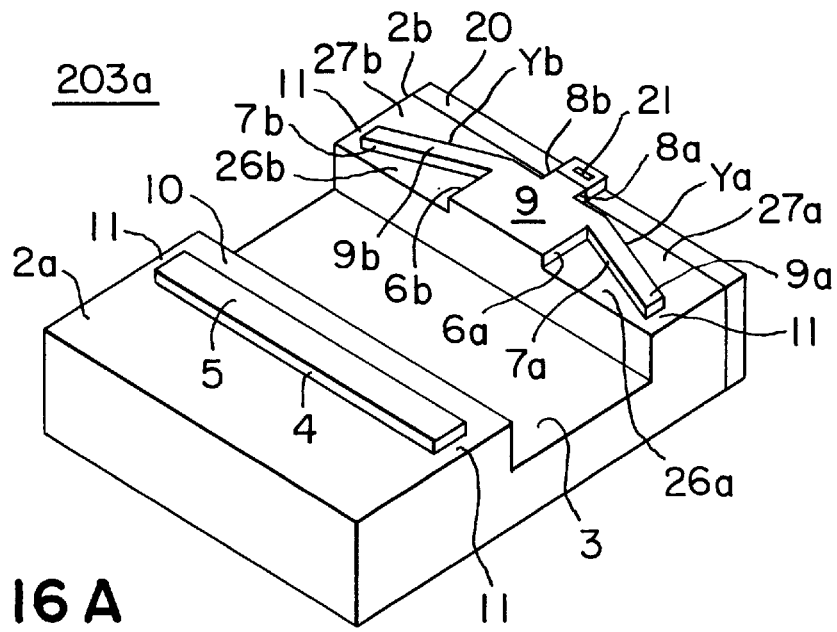
FIG. 16A is a perspective view of the sixth preferred embodiment of a head slider according to the present invention.
Figure 16B:
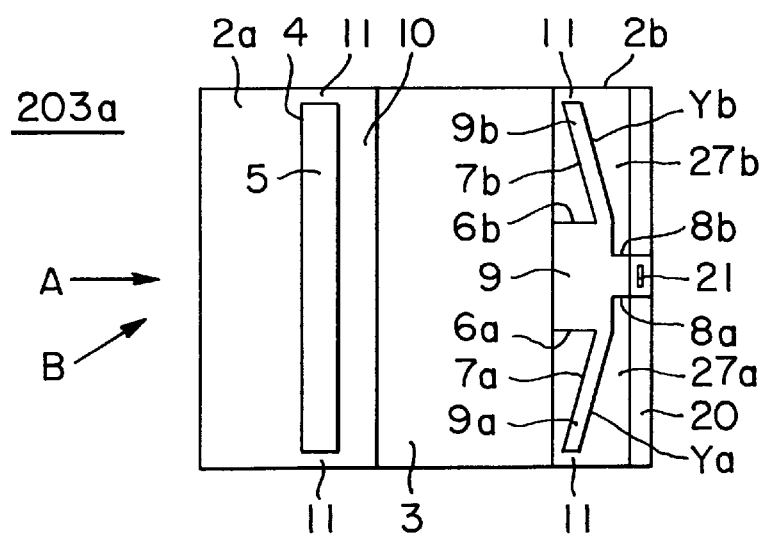
FIG. 16B is a plan view of the head slider of FIG. 16A.
Figure 16C:
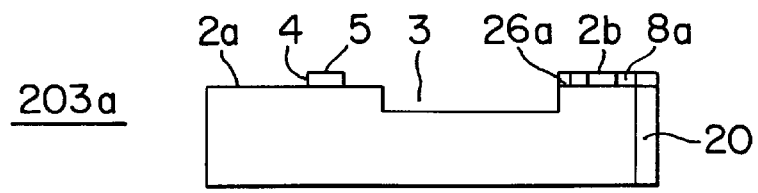
FIG. 16C is a side view of the head slider of FIG. 16A.

Referring to FIGS. 16A through 16C, the sixth preferred embodiment of the present invention will be described below.

FIG. 16A is a perspective view of the sixth preferred embodiment of a head slider according to the present invention, FIG. 16B is a plan view thereof, and FIG. 16C is a side view thereof.

This preferred embodiment is a modified embodiment of the fifth preferred embodiment of a head slider according to the present invention. In this preferred embodiment, land portions 9a and 9b, which are formed between steps 7a and 7b formed by cut-outs 26a and 26b and steps Ya and Yb formed by cut-outs 27a and 27b so as to face the steps 7a and 7b, are inclined so as to extend forwards in a disk rotating direction A while extending toward the side portions of the slider, so that the cut-outs 26a and 26b are formed so as to have a substantially V-shape. With this construction, since the side portions of the land portions 9a and 9b can be apart from the rear end portion of the slider, it is possible to more effectively prevent the side portions of the land portions 9a and 9b from colliding with the disk even if rolling is generated in the slider 203a under the influence of the installation errors of a suspension (not shown), the irregularities on the surface of the disk, the vibrations from the outside of the apparatus and so forth.

In this preferred embodiment, the shapes of the cut-outs 26a and 26b formed in the rear dynamic-pressure generating part 2b serves as means for providing both of these two characteristics. In the fifth preferred embodiment as described above, since the steps 7a and 7b for generating a positive pressure are formed so as to be open to the sides of the slider 203a, a part of air flow colliding with the steps 7a and 7b escapes from the sides of the slider 203a to decrease the generated positive pressure. On the other hand, in this preferred embodiment, the cut-outs 26a and 26b have a substantially V-shape so as to surround the slider side end portions of the steps 7a and 7b, and pocket portions for generating a positive pressure are formed by the cut-outs 26a and 26b.

With this construction, since it is possible to suppress the amount of air escaping from the positive pressure generating area of the rear dynamic-pressure generating part 2b via the side of the slider, it is possible to effectively generate a positive pressure in a low peripheral velocity area during starting of the disk, so that it is possible to maintain the rise characteristic and to achieve a sufficient rolling stiffness.

While the cut-outs 26a and 26b have had a substantially U-shape, they may have other shapes, such as a U-shape and a J-shape. In the case of these shapes, it is possible to optimize the rolling preventing function by adjusting the lengths of the steps 6a and 6b in the disk rotating direction.

Seventh Preferred Embodiment

Figure 17A:
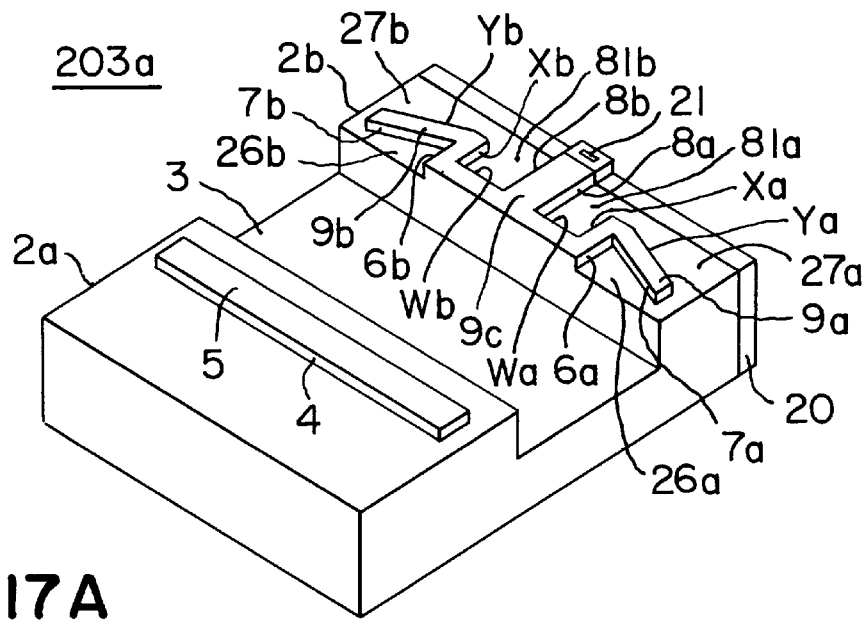
FIG. 17A is a perspective view of the seventh preferred embodiment of a head slider according to the present invention.
Figure 17B:
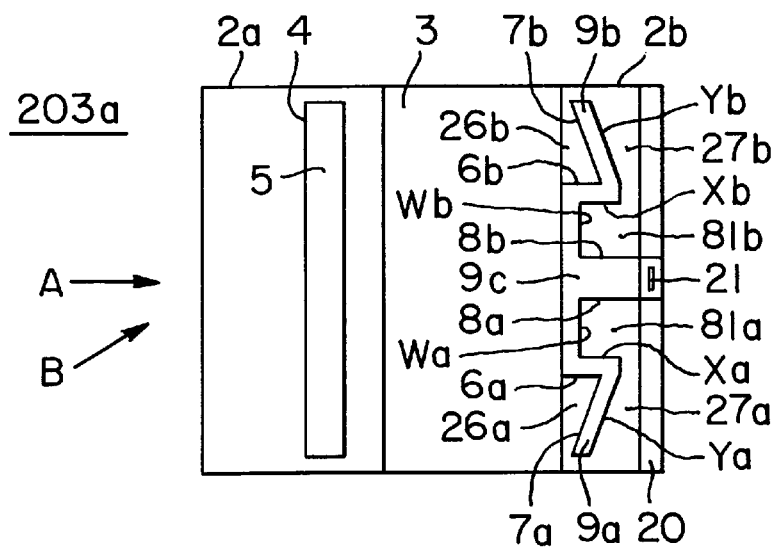
FIG. 17B is a plan view of the head slider of FIG. 17A.
Figure 17C:
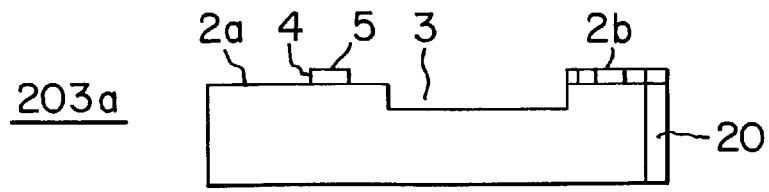
FIG. 17C is a side view of the head slider of FIG. 17A.

Referring to FIGS. 17A through 17C, the seventh preferred embodiment of the present invention will be described below.

FIG. 17A is a perspective view of the seventh preferred embodiment of a head slider according to the present invention, FIG. 17B is a plan view thereof, and FIG. 17C is a side view thereof.

The constructional feature of the seventh preferred embodiment shown in FIGS. 17A through 17C is that cut-outs 81a and 81b for forming steps Xa and Xb facing steps 6a and 6b are provided between the steps 6a and 6b. By providing the cut-outs 81a and 81b, steps Wa and Wb are formed so as to face the frond edge of a rear dynamic-pressure generating part 2b. As a result, a negative pressure is generated in the area surrounded by the steps 8a, Wa and Xa and in the area surrounded by the steps 8b, Wb and Xb.

Thus, in the seventh preferred embodiment, the negative pressure generating areas are provided in the rear dynamic-pressure generating part 2b, so that it is possible to obtain various functions and advantages, which will be described below.

Furthermore, the cut-outs 81a and 81b are formed by, e.g., etching or the like. In addition, the land portions 9a and 9b arranged between the steps 7a and 7b formed by the cut-outs 26a and 26b and the steps Ya and Yb formed by the cut-outs 27a and 27b so as to face the steps 7a and 7b are inclined so as to extend forwards in the disk rotating direction A while extending toward the side portions of the slider. Thus, if the land portions 9a and 9b are inclined, the side portions of the land portions 9a and 9b can be apart from the rear end portion of the slider, so that it is possible to effectively prevent the side edge portions of the land portions 9a and 9b from colliding with the disk even if rolling is generated in the slider 203a under the influence of the installation errors of a suspension (not shown), the irregularities on the surface of the disk, the vibrations from the outside of the apparatus and so forth.

First, referring to FIGS. 18A, 18B, 19 and 20, a head slider for generating a negative pressure on the rear side, according to the present invention, is compared with a conventional head slider for generating a negative pressure on the front side.

Figure 18A:
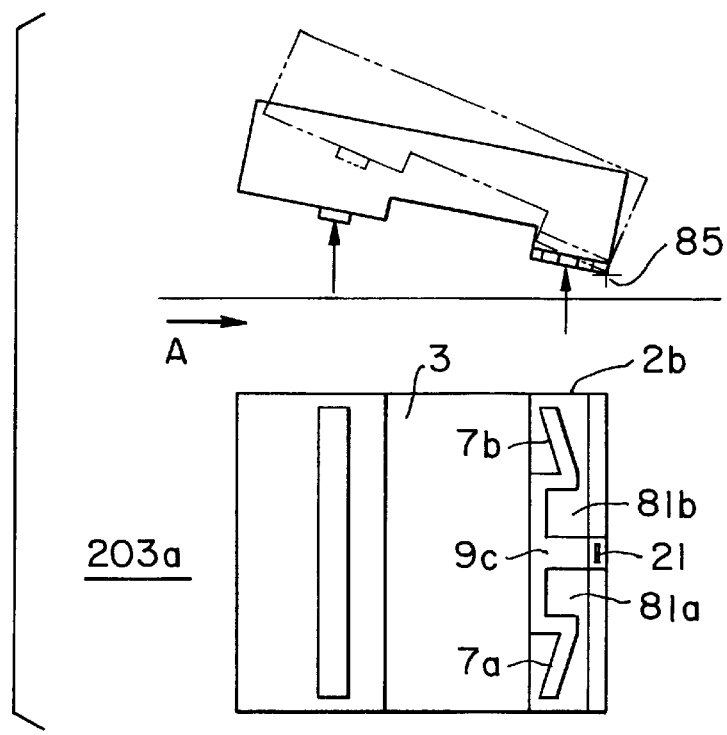
FIGS. 18A and 18B are explanatory drawings illustrating the variations in flying height in the seventh preferred embodiment of a head slider according to the present invention and a conventional slider.
Figure 18B:
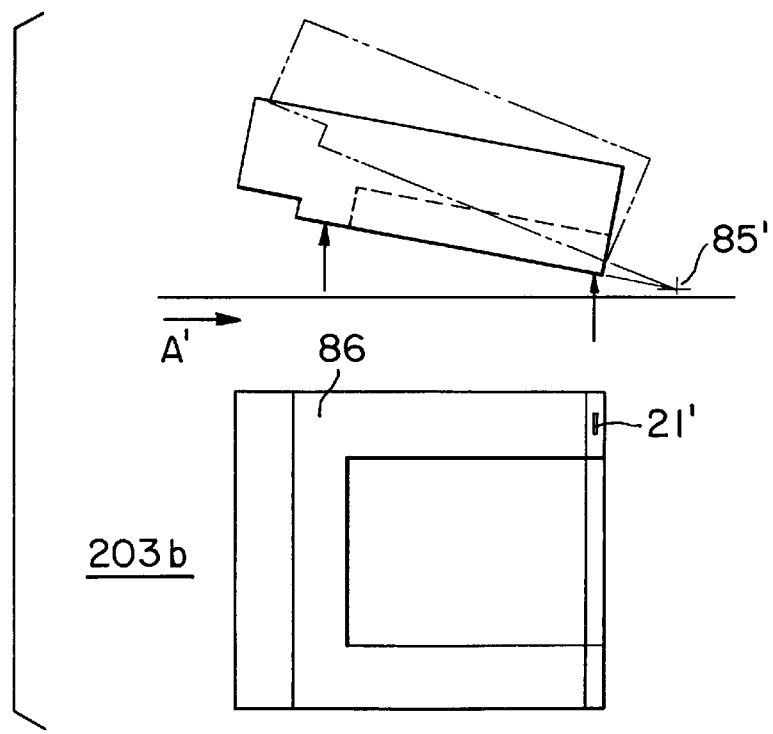
Figure 19:
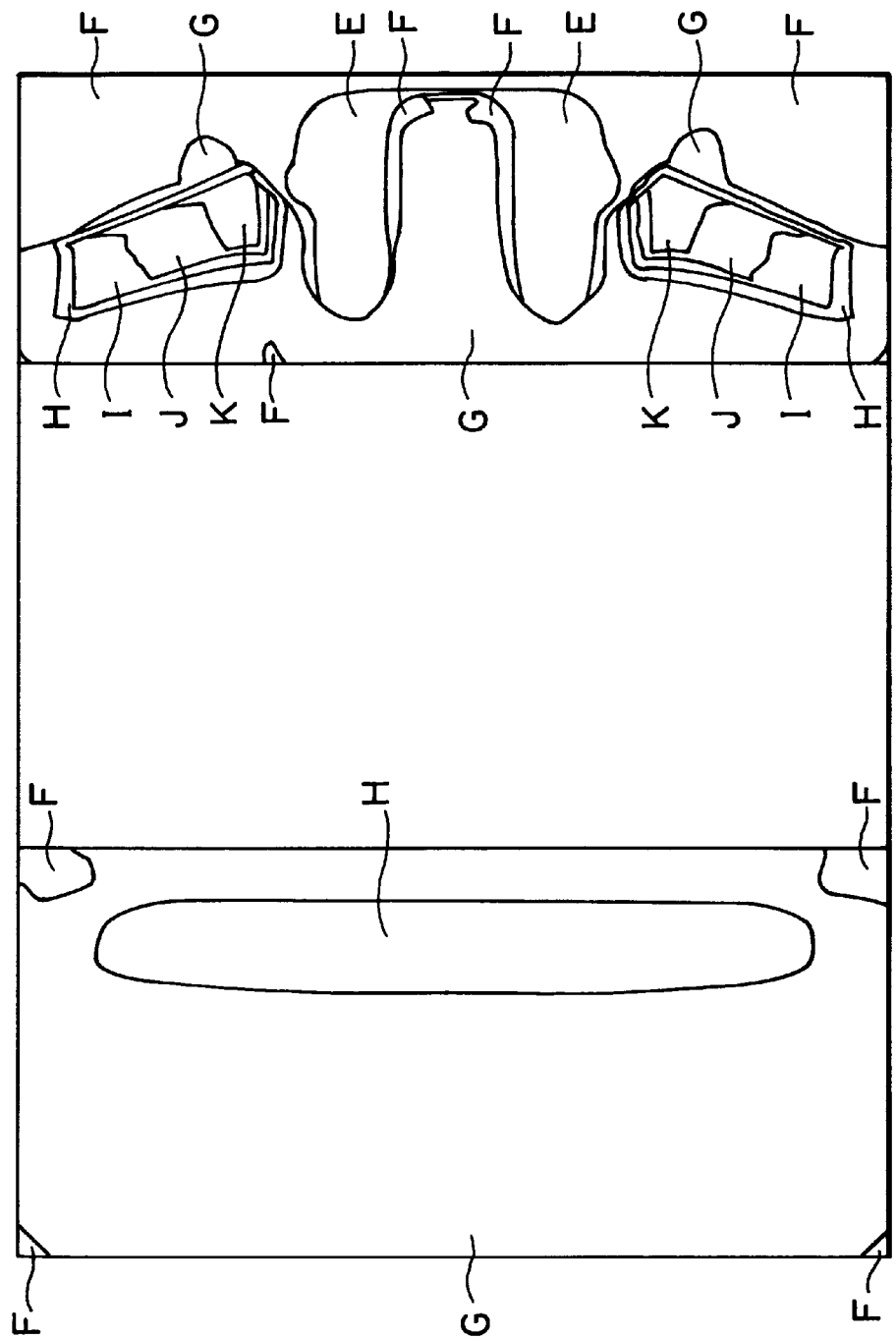
FIG. 19 is a schematic view illustrating pressure distribution characteristics in the seventh preferred embodiment of a head slider according to the present invention.

FIG. 18A shows the flying attitude of this preferred embodiment of a slider (a rear negative-pressure slider) according to the present invention, and FIG. 18B shows the flying attitude of a conventional slider (a front negative-pressure slider). FIG. 19 illustrates a pressure distribution on a slider surface in this preferred embodiment of a head slider (a rear negative-pressure slider) according to the present invention, and FIG. 20 illustrates a pressure distribution on a slider surface in a conventional head slider (a front negative-pressure slider).

Figure 20:
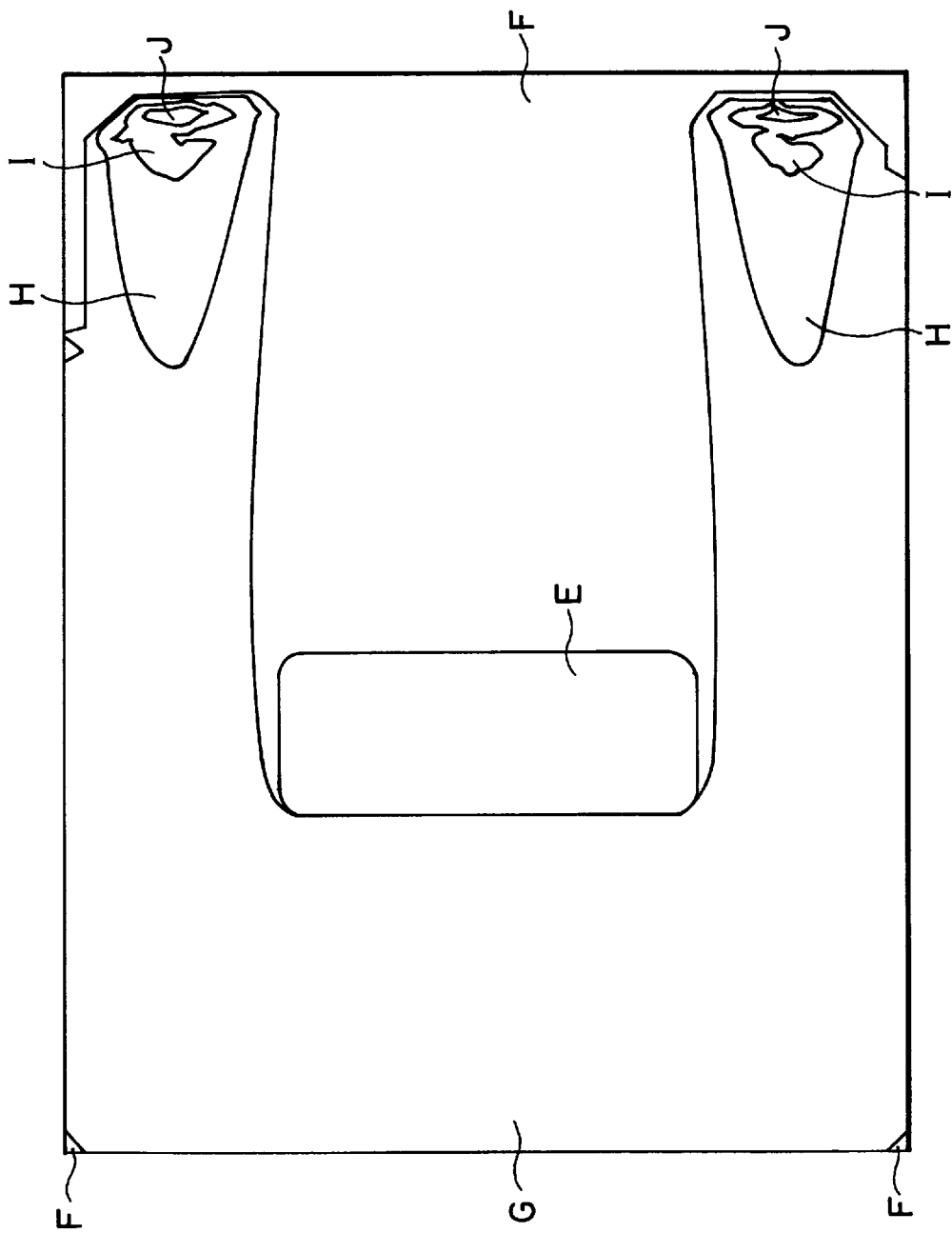
FIG. 20 is a schematic view illustrating pressure distribution characteristics in a conventional head slider.

Furthermore, in FIGS. 19 and 20, the pressure distributions are shown by a gauge pressure based on atmosphere. In addition, a lower pressure than atmosphere is defined as a negative (minus) pressure and a higher pressure than atmosphere is defined as a positive (plus) pressure. Sign E shows the range of from −0.5 to −1 atm, F shows the range of from 0 to −0.5 atm, G shows the range of from 0 to +1 atm, H shows the range of from +1 to +2 atm, I shows the range of from +2 to +3 atm, J shows the range of from +3 to +4 atm, and K shows +4 atm or higher.

As can be clearly seen from FIG. 20, the conventional slider 203b is designed so that a relatively great positive pressure is generated near the rear end of the slider 203b for supporting a magnetic pole 21' thereon and a negative pressure peak is positioned in front of the central portion of the whole length of the slider, i.e., near the rear edge of a front positive-pressure generating part 86.

On the other hand, in this preferred embodiment, as shown in FIG. 19, the pressure distribution of the slider is formed so as to generate both of a positive pressure peak and a negative pressure peak in the rear of the slider to enhance only the stiffness of an air film in the rear and to provide a suitable flexibility on the front side of the slider.

By such differences between the conventional slider and the slider in this preferred embodiment, the slider in this preferred embodiment has the following features.

The first feature of the slider in this preferred embodiment, which has a negative-pressure generating part in the rear of the slider, is that it is possible to suppress the stiction problem caused by the lubricant raising phenomenon of the disk. That is, in the slider having the negative-pressure generating part, the raising of lubricant existing on the surface of the disk is caused by the negative pressure during the seek operation (the lubricant is sucked to be accumulated on the negative-pressure generating part of the slider). As a result, during parking of the slider, the lubricant accumulated on the slider may seep out so that the slider causes the stiction phenomenon of the disk.

The conventional slider 203b has a large area of negative-pressure generating region in the whole inside region of the substantially U-shaped positive-pressure generating part 86 from near the center of the slider to the rear portion thereof, so that a great amount of lubricant is raised by the large area of negative-pressure generating region. In addition, there is a problem in that lubricant seeps out onto the whole ground plane having a substantially U-shaped large area to conspicuously cause the aforementioned stiction phenomenon during parking of the slider. On the other hand, in this preferred embodiment, since the negative-pressure generating region is provided in the rear of the slider, the total negative pressure obtained by integrating the negative pressure by the area of the slider can be smaller than the total negative pressure of the conventional slider, so that it is possible to suppress the raising of lubricant. In addition, lubricant seeps out only onto the rear ground plane during parking, so that the absorption phenomenon may be relatively small.

The second feature of the slider in this preferred embodiment, which has a negative-pressure generating part in the rear of the slider, is that it is possible to suppress the problem of the variation in spacing by the variation in flying attitude.

As shown in FIG. 18B, the conventional negative-pressure slider has a substantially U-shaped ground plane on the flying surface, and the inside of the ground plane is recessed by micrometers. On the basis of near the rear edge of the front positive-pressure generating part of the substantially U-shaped ground plane, a negative pressure is generated inside the substantially U-shaped ground plane, and a great positive pressure balanced with the negative pressure is generated mainly on the ground plane. Since this great positive pressure can enhance the stiffness of an air film, the conventional negative-pressure slider can decrease the dispersion in flying height caused by the manufacturing errors, in comparison with the conventional slider which generates no negative pressure.

However, in the case of the conventional negative-pressure slider, since the maximum negative pressure is generated near the rear edge of the front positive-pressure generating part, the stiffness of the air film on the whole slider is high, and the variation in pitching caused by the suspension load error, the variation in atmosphere and so forth are small, so that the whole slider tends to move up and down in parallel. Therefore, in the conventional negative-pressure slider, there is a problem in that the flying height sensitively varies due to the flying height varying factors such as the variation in atmosphere.

On the other hand, in this preferred embodiment, as shown in FIG. 18A, the positive-pressure generating part 2b provided in the rear portion of the slider is arranged upstream of the magnetic pole 21 serving as a reading and/or writing part, and the negative-pressure generating parts are localized in the cut-outs 81a and 81b formed in the rear of the slider. Therefore, the stiffness of the air film only in the rear of the slider is increased, and only a positive pressure or the combination of a positive pressure with a low negative pressure is applied to the front side of the slider, so that it is possible to stick the suspension load error, the variation in atmosphere and so forth by the variation in flying height on the front side of the slider to suppress the variation in flying height of the magnetic pole 21 on the rear side.

Comparing FIG. 18A illustrating the flying attitude of the slider in this preferred embodiment with FIG. 18B illustrating the flying attitude of the conventional slider, the foregoing will be described in more detail.

The conventional slider 203b is designed so that a relatively high pressure is generated even near the rear end of the slider 203b which supports the magnetic pole 21' thereon. For that reason, when pitching occurs to vary the flying attitude, the point (focal point) 85', at which the spacing does not vary, is arranged outside the rear end of the slider 2023b. Therefore, if the pitching varies in accordance with the load variation or the atmosphere variation, the spacing also varies near the magnetic pole 21'.

On the other hand, in this preferred embodiment, the focal point 85 can be arranged near the magnetic pole 21. The reasons thereof are as follows. On both sides of the flat surface 9c of the land portion of the rear dynamic-pressure generating part 2b, in which the magnetic pole 21 is provided, the cut-outs 81a and 81b serving as negative-pressure generating regions are provided. Each of the cut-outs 81a and 81b is formed so as to continuously extend to the deep slot 3, so that there is no step for generating a positive pressure. In addition, since the dynamic-pressure generating part 2b itself extends laterally, it is short in the disk rotating direction A. Therefore, the spring stiffness due to the positive pressure generated on the flat surface 9c is relatively weak.

On the other hand, in the rear dynamic-pressure generating part 2b, a positive pressure is generated mainly near the steps 7a and 7b, which are arranged upstream of the magnetic pole 21 in the disk rotating direction A. Therefore, the pressure applied to the slider 203a is generated mainly on the dynamic-pressure generating part 2a and near the steps 7a and 7b, so that the focal point 85 can be arranged near the magnetic pole 21 as shown in FIG. 18A. Accordingly, even if the pitching varies in accordance with the load variation or the atmosphere variation, the spacing near the magnetic pole 21 hardly varies.

Furthermore, in the conventional negative-pressure slider 203b, since a negative pressure is generated in the region from the rear edge of the positive-pressure generating part 86 far ahead the magnetic pole 21' in the disk rotating direction A' to a location near the center of the slider, a positive pressure having a high spring stiffness is generated near the magnetic pole, so that it is difficult to obtain the advantages in this preferred embodiment.

The third feature of the slider in this preferred embodiment, which has a negative-pressure generating part in the rear of the slider, is that it is possible to enhance the spring stiffness by a negative pressure.

In this preferred embodiment, the cut-outs 81a and 81b are provided to generate a negative pressure in a region surrounded by the steps 8a, Wa and Xa and in a region surrounded by the steps 8b, Wb and Xb. Since the rear dynamic-pressure generating part 2b has a small flying height, it can effectively generate a negative pressure even if the steps Wa and Wb are shallow.

The following advantages can be obtained by such a negative pressure function. First, it is possible to increase the positive pressure generated by the steps 7a and 7b without varying the spacing near the magnetic pole 21, so that it is possible to enhance the rolling stiffness.

If the positive pressure can be enhanced as described above, the spring stiffness (the stiffness for supporting the slider in a direction perpendicular to the disk) can be necessarily enhanced. Thus, if the spring stiffness can be enhanced in the rear dynamic-pressure generating part 2b, in which the magnetic pole 21 is provided, there are following advantages. First, if the dispersion in load applied to the slider 203a from the suspension occurs due to the manufacturing error of the suspension and so forth, the flying height of the slider 203a varies. However, if the spring stiffness is high, it is possible to suppress the variation in flying height. In addition, if atmosphere varies due to the variation in working environment, the flying height of the slider 203a also varies. However, if the spring stiffness is high, it is possible to suppress the variation in flaying height.

The fourth feature of the slider in this preferred embodiment, which has a negative-pressure generating part in the rear of the slider, is that it is possible to adjust the rolling preventing function when a yaw angle exists.

As one of methods for achieving a desired spacing or contact force between the head and the disk in the shapes of the sliders in the fourth through sixth preferred embodiments, there is a method for adjusting the widths (the lengths in a direction substantially perpendicular to the disk rotating direction) of the positive-pressure generating steps 7a and 7b provided near both side portions of the rear dynamic-pressure generating part 2b. That is, if the widths of the steps 7a and 7b are decreased, the spacing decreases and the contact force increases. On the other hand, if the widths of the steps 7a and 7b are increased, the spacing increases and the contact force decreases.

However, if the widths of the steps 7a and 7b are adjusted, the distance between the central axis (the slider central axis) in the longitudinal direction of the slider and the steps 6a and 6b extending substantially in the disk rotating direction A is necessarily changed to vary the rolling preventing function (see the descriptions in the third and fourth preferred embodiments) of the steps 6a and 6b. Therefore, if the widths of the steps 7a and 7b are set so as to obtain desired spacing and contact force, the rolling preventing effect is too conspicuous. As a result, on the outer peripheral side of the disk, on which the yaw angle is increased, the rolling of the slider 203a may occur so that the disk inner peripheral side Sin of the slider 203a approaches the disk and the disk outer peripheral side Sout of the slider 203a goes away from the disk.

In order to eliminate such problems, in this preferred embodiment, the cut-outs 81a and 81b are newly provided in the rear dynamic-pressure generating part 2b in order to form the steps Xa and Xb between the steps 6a and 6b so as to face the steps 6a and 6b.

As described above, when the yaw angle exists on the disk outer peripheral side, the air flow generates a positive pressure at the step 6a and a negative pressure at the step 6b. By a rolling moment determined by a product of these pressures and a distance between the central axis of the slider and the positions at which the steps 6a and 6b are provided, rolling occurs so that the disk outer peripheral side Sout of the slider 203a goes away from the disk and the disk inner peripheral side Sin thereof approaches the disk.

On the other hand, the steps Xa and Xb have the opposite effects. That is, a negative pressure is generated at the step Xa, and a positive pressure is generated at the step Xb. As a result, rolling occurs so that the disk outer peripheral side Sout of the slider 203a approaches the disk and the disk inner peripheral side Sin thereof goes away from the disk.

Therefore, if the distance between the central axis of the slider and the positions, at which the steps Xa and Xb are provided, is suitably selected, it is possible to generate a suitable rolling moment, so that it is possible to adjust the rolling preventing function.

The fifth feature of the slider in this preferred embodiment, which has a negative-pressure generating part in the rear of the slider, is that it is possible to reduce the pitching dependence.

Referring to FIGS. 17A through 17C, this point will be described. In this preferred embodiment, the surface (flat surface) 9c of the land portion formed so as to continuously extend from the front edge of the rear dynamic-pressure generating part 2b is smaller than those in the preceding preferred embodiments. The flat surface 9c has a small dependence on peripheral velocity (the property that the flying force exerting on the slider depends on the difference between the peripheral velocities in the inner and outer peripheral portions), and a large dependence on pitching (the property that the flying force exerting on the slider depends on the difference in pitching) (see FIG. 4).

Therefore, in a case where the area of the flat surface 9c is large, if the load for pushing the slider 203a toward the disk varies (load variation) or if atmosphere varies (atmosphere variation) due to the variation in working environment, the flying height of the front dynamic-pressure generating part 2a decreases, and the pitching of the whole slider 203a varies, so that the flying height or contact force is easy to vary near the magnetic pole 21.

On the other hand, in this preferred embodiment, since the area of the flat surface 9c is decreased by forming the cut-outs 81a and 81b in the rear dynamic-pressure generating part 2b, the aforementioned problems can be eliminated, and the flying height or contact force near the magnetic pole 21 can be stable with respect to the load variation and the atmosphere variation.

According to this preferred embodiment described above, similar to the fourth preferred embodiment, it is possible to suppress the transient variation in flying height by decreasing the yaw-angle dependence, and it is possible to achieve a constant flying height above the inner and outer peripheral portions of the disk. In addition, it is possible to prevent the stiction phenomenon by inhibiting lubricant from being raised, and it is possible to effectively prevent the rolling of the slider 203a on the outer peripheral side of the disk. Moreover, it is possible to maintain a high rolling stiffness, and it is possible to stabilize the spacing or contact forth between the slider and the disk.

In addition, if the depths of the steps Xa and Xb are set to be the same as those of the steps 6a, 6b, 7a, 7b, 8a and 8b, the cut-outs 81a and 81b can be formed in a single process at the same time that the cut-outs 26a, 26b and so forth are formed, so that it is possible to improve the manufacturing efficiency.

Figure 21A:
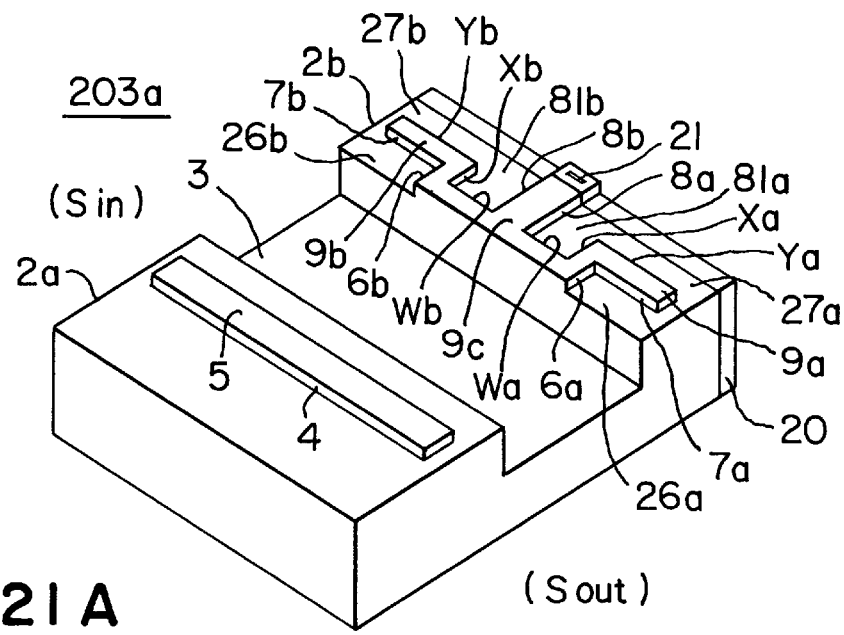
FIG. 21A is a perspective view of a modified example of the seventh preferred embodiment of a head slider according to the present invention.
Figure 21B:
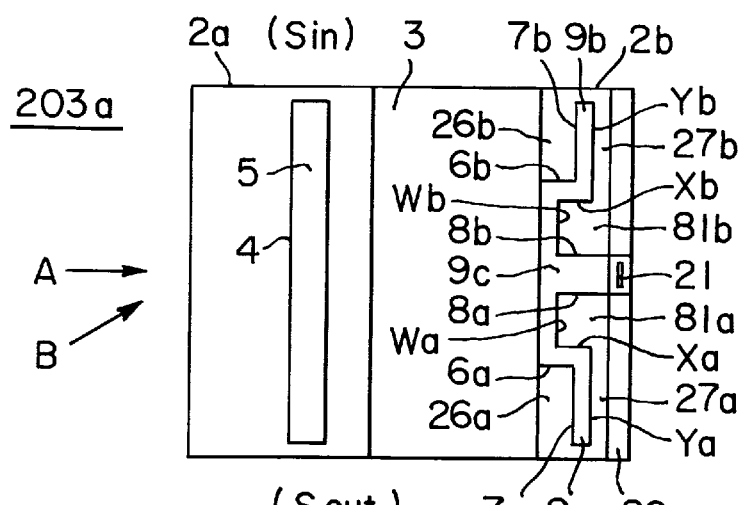
FIG. 21B is a plan view of the head slider of FIG. 21A.
Figure 21C:
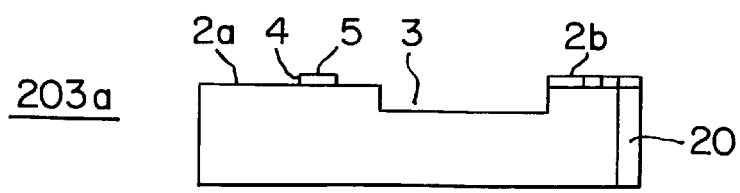
FIG. 21C is a side view of the head slider of FIG. 21A.

FIGS. 21A through 21C show a modified example of the seventh preferred embodiment of the present invention. As shown in FIGS. 21A through 21C, land portions 9a and 9b arranged between steps 7a and 7b formed by cut-outs 26a and 26b and steps Ya and Yb formed by cut-outs 27a and 27b so as to face the steps 7a and 7b may be formed so as to extend substantially on the straight in a direction substantially perpendicular to a disk rotating direction A.

In such a modified example shown in FIGS. 21A through 21C, unlike the seventh preferred embodiment, the land portions 9a and 9b are not inclined so as to extend forwards in the disk rotating direction A while extending toward the side portions of the slider. Also with this construction, since the side portions of the land portions 9a and 9b can be apart from the rear end portion of the slider, it is possible to effectively prevent the side edge portions of the land portions 9a and 9b from colliding with the disk even if the rolling of the slider 203a occurs under the influence of the installation error of the suspension (not shown), the irregularities on the surface of the disk, the vibrations from the outside of the apparatus and so forth. Therefore, the construction shown in FIGS. 21A through 21C may be used.

Eighth Preferred Embodiment

Figure 22A:
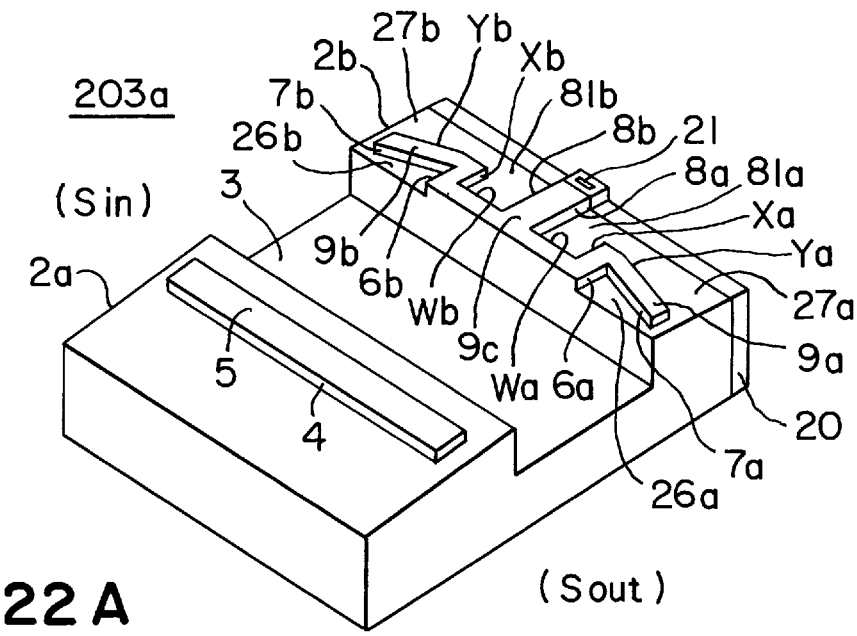
FIG. 22A is a perspective view of the eighth preferred embodiment of a head slider according to the present invention.
Figure 22B:
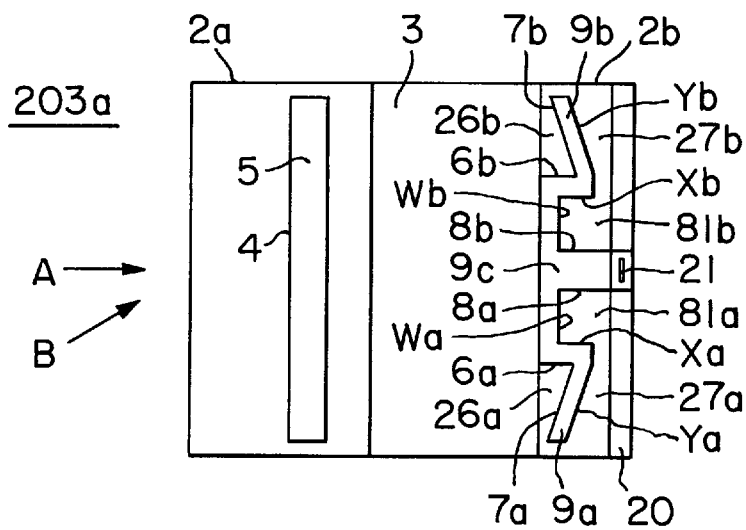
FIG. 22B is a plan view of the head slider of FIG. 22A.
Figure 22C:
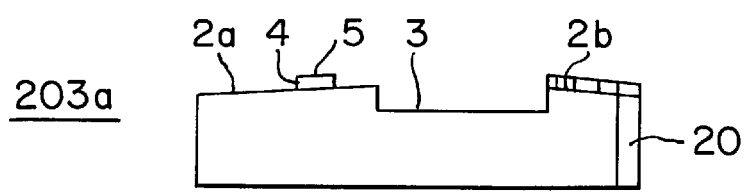
FIG. 22C is a side view of the head slider of FIG. 22A.

Referring to FIGS. 22A through 22C, the eighth preferred embodiment of the present invention will be described below.

FIG. 22A is a perspective view of the eighth preferred embodiment of a head slider according to the present invention, FIG. 22B is a plan view thereof, and FIG. 22C is a side view thereof.

In this preferred embodiment, a crown is provided on the slider in the seventh preferred embodiment shown in FIGS. 17A through 17C.

In this preferred embodiment, the whole surface of the slider facing a disk is formed to be convex so that the surfaces of a front dynamic-pressure generating part 2a and a rear dynamic-pressure generating part 2b are not arranged on the same plane. That is, the surface of the slider 203a facing the disk is curved so as to correspond to, e.g., an elliptically cylindrical locus or a cylindrical locus, to form a crown.

Methods for forming such a structure include a method utilized for usual sliders, i.e., a method for selecting the conditions for mounting a suspension and for releasing the surface tension by providing a scratch on the intrados of the slider.

The surface of the slider facing the disk may be formed to be convex by laminating films on the front dynamic-pressure generating part 2a and the rear dynamic-pressure generating part 2b, although this structure is not shown.

Moreover, the front dynamic-pressure generating part 2a may be inclined so as to approach the disk while extending from the front end to the back end, and the rear dynamic-pressure generating part 2b may be inclined so as to go away from the disk while extending from the front end to the back end, so that the whole upper surface may be convex toward the disk.

With this construction, the front dynamic-pressure generating part 2a has an attack angle to increase the dynamic-pressure bearing effect and to increase pitching. When the pitching is large, even if a contaminant enters a gap between the slider 203a and the disk during rotating of the disk, it is difficult to adhere to the front dynamic-pressure generating part 2a, and even if the contaminant adheres to the rear dynamic-pressure generating part 2b, there is little possibility that the slider 203a leans forward, so that it is possible to achieve stable flying or contact.

In addition, with this construction, there is an advantage in that stiction is difficult to occur since the rear end of the front dynamic-pressure generating part 2a and the front end of the rear dynamic-pressure generating part 2b serve as the contact portions of the slider 203a with the disk while the disk is stopped.

Moreover, with this construction, it is possible to suppress the variation in flying height due to the variations in load and atmosphere. In either case where the load for pushing the slider 203a toward the disk is greater than a predetermined value or where atmosphere decreases, the flying height of the front dynamic-pressure generating part decreases, and the pitching thereof also decreases. Accordingly, the flying height of the rear dynamic-pressure generating part 2b decreases under the influence of the pitching dependence. However, if there is an attack angle under the influence of a crown, since the rate of the decrease of the pitching decreases, the decrease of the flying height of the rear dynamic-pressure generating part 2b is difficult to occur, so that it is possible to stabilize the flying height.

Ninth Preferred Embodiment

Figure 23A:
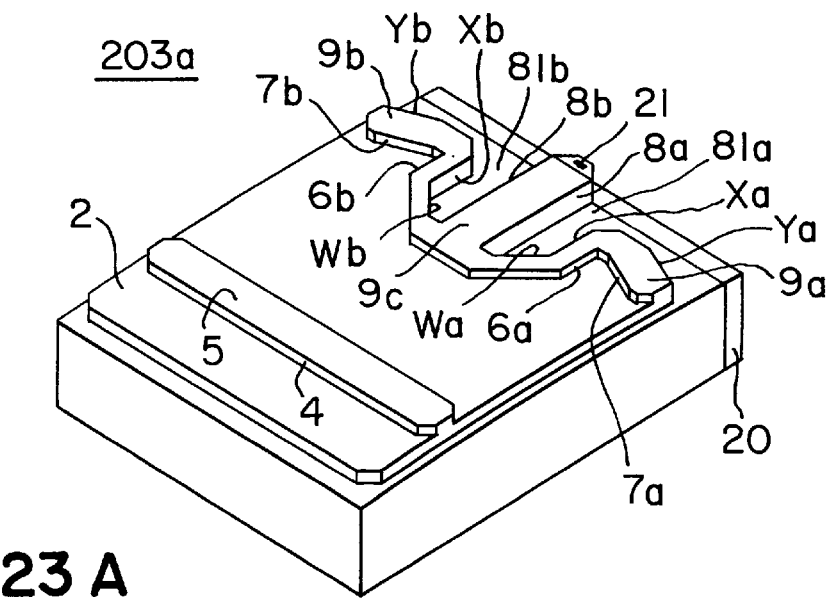
FIG. 23A is a perspective view of the ninth preferred embodiment of a head slider according to the present invention.
Figure 23B:
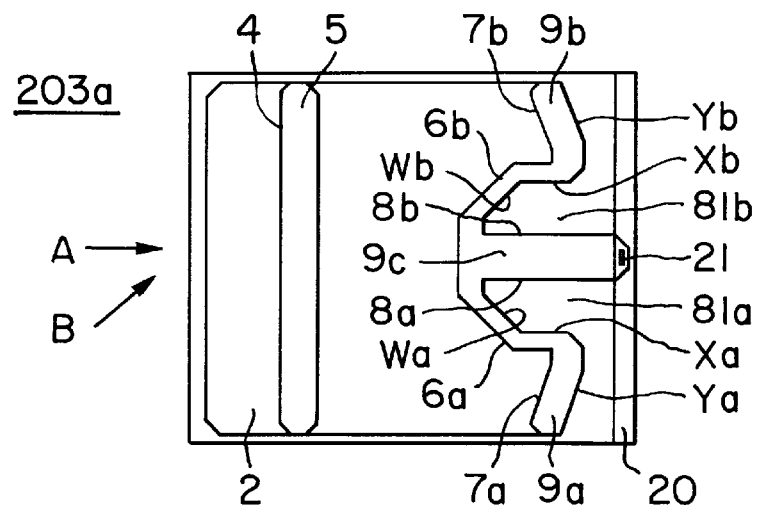
FIG. 23B is a plan view of the head slider of FIG. 23A.
Figure 23C:
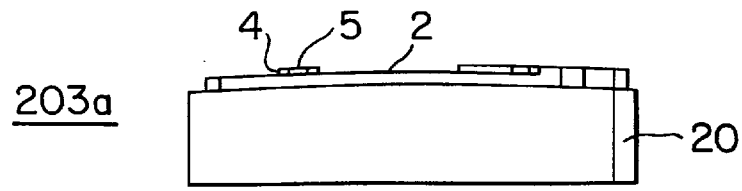
FIG. 23C is a side view of the head slider of FIG. 23A.

Referring to FIGS. 23A through 23C, the ninth preferred embodiment of the present invention will be described below.

FIG. 23A is a perspective view of the ninth preferred embodiment of a head slider according to the present invention, FIG. 23B is a plan view thereof, and FIG. 23C is a side view thereof.

This preferred embodiment is a modified embodiment of the eighth preferred embodiment. The main feature of this preferred embodiment is that the deep slot 3 in the preceding preferred embodiments is not formed. That is, the dynamic-pressure generating part divided into the front dynamic-pressure generating part 2a and the rear dynamic-pressure generating part 2b by the deep slot 3 in the preceding preferred embodiments is formed as a dynamic-pressure generating part 2 continuously extending from the front side to the rear side. In addition, the shapes of the steps 6a and 6b are modified so that the land portion 9c projects toward the front side of the slider. Accordingly, the cut-outs 81a and 81b forming a negative-pressure generating part extend toward the front side of the slider to provide a wider area of the negative-pressure generating part than those in the preceding preferred embodiments.

The regions of the cut-outs 81a and 81b are factors for determining the value of a negative pressure generated near steps Wa and Wb. Therefore, it is effective at the following points that the shape of the front edge of the rear dynamic-pressure generating part 2b can be suitably adjusted. That is, if the shape of the land portion 9c provided on the front edge of the rear dynamic-pressure generating part 2b is adjusted, the regions of the cut-outs 81a and 81b can be set independent of the lengths of the steps 6a and 6b in the disk rotating direction and the regions of the steps 7a and 7b. That is, the negative-pressure generating function can be adjusted independent of the rolling preventing function obtained by the steps 6a and 6b and the positive-pressure generating function obtained by the steps 7a and 7b, so that it is possible to greatly improve the degree of freedom of design.

If the regions of the cut-outs 81a and 81b can be extended as this preferred embodiment, it is possible to generate a higher negative pressure. Therefore, it is possible to generate a higher positive pressure near the steps 7a and 7b by adjusting the regions formed by the steps 6a, 6b, 7a and 7b and/or by increasing the widths of the land portions 9a and 9b, so that it is possible to improve the rolling and spring rigidities in the rear dynamic-pressure generating part 2b.

Furthermore, in this preferred embodiment, a land portion 5 serving as a positive-pressure generating part is provided by forming a step 4 on the front side of the dynamic-pressure generating part 2, similar to the preceding preferred embodiments.

Thus, according to the present invention, even if the head slider is formed so as to generate a negative pressure on the rear side thereof without the need of the deep slot 3, the same functions and advantages in the preceding preferred embodiments, which have been described as the first through fifth features, can be obtained.

Tenth Preferred Embodiment

Figure 24A:
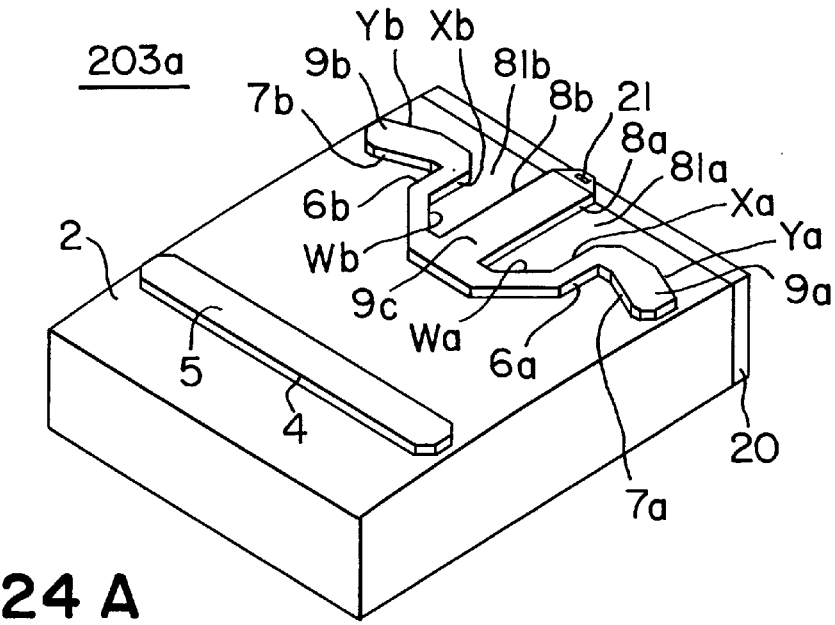
FIG. 24A is a perspective view of the tenth preferred embodiment of a head slider according to the present invention.
Figure 24B:
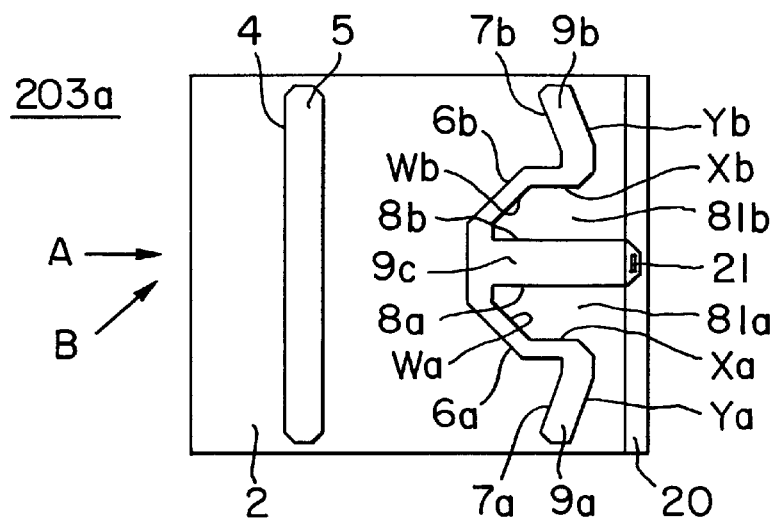
FIG. 24B is a plan view of the head slider of FIG. 24A.
Figure 24C:
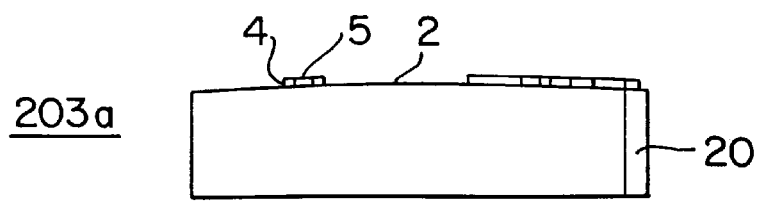
FIG. 24C is a side view of the head slider of FIG. 24A.

Referring to FIGS. 24A through 24C, the tenth preferred embodiment of the present invention will be described below.

FIG. 24A is a perspective view of the tenth preferred embodiment of a head slider according to the present invention, FIG. 24B is a plan view thereof, and FIG. 24C is a side view thereof.

This preferred embodiment is a modified embodiment of the ninth preferred embodiment. In this preferred embodiment, the dynamic-pressure generating part 2 shown in FIGS. 23A through 23C is formed by a single etching the slider, so that a land portion 5 is provided by forming a step 4 in front of the dynamic-pressure generating part 2 formed on the slider, and land portions 9a, 9b and 9c are provided by forming cut-outs 81a and 81b in the rear of the dynamic-pressure generating part 2 for generating a negative pressure.

Thus, if the land portions 5 and 9a through 9c are formed by a single etching so as to have the same height of the slider, it is possible to remarkably improve the manufacturing efficiency.

Eleventh Preferred Embodiment

Figure 25A:
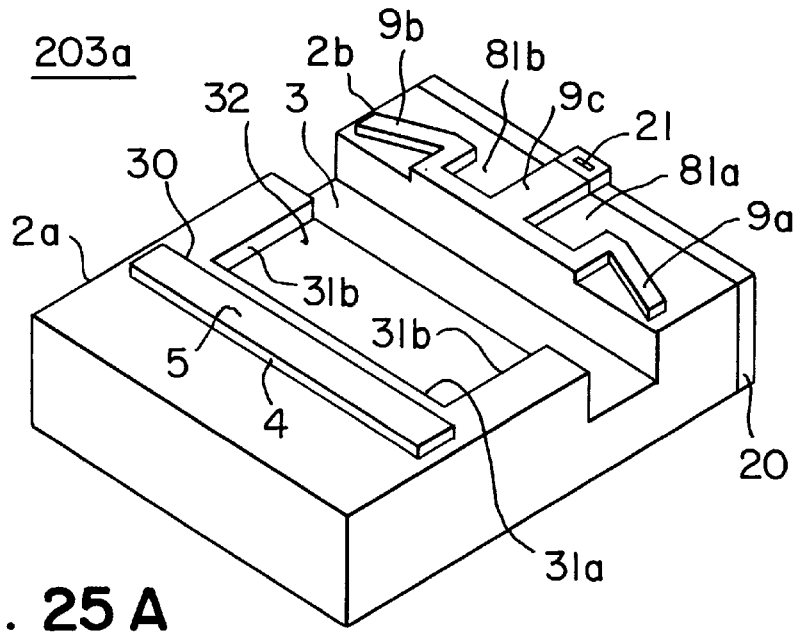
FIG. 25A is a perspective view of the eleventh preferred embodiment of a head slider according to the present invention.
Figure 25B:
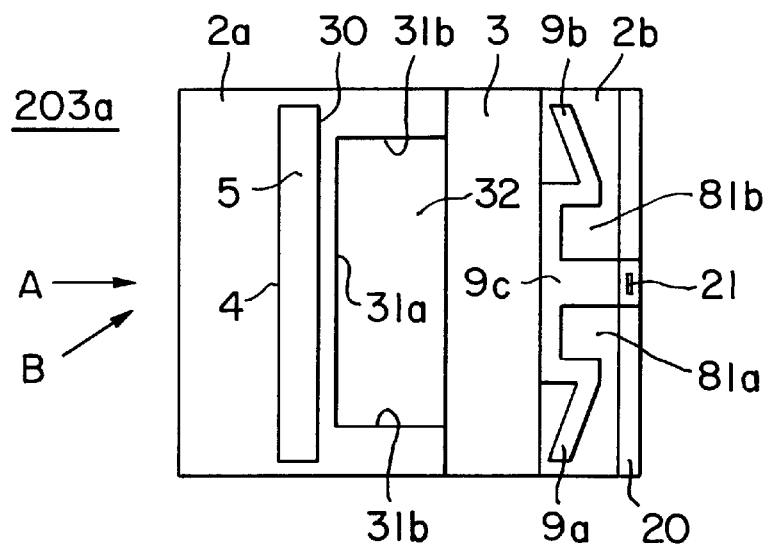
FIG. 25B is a plan view of the head slider of FIG. 25A.
Figure 25C:
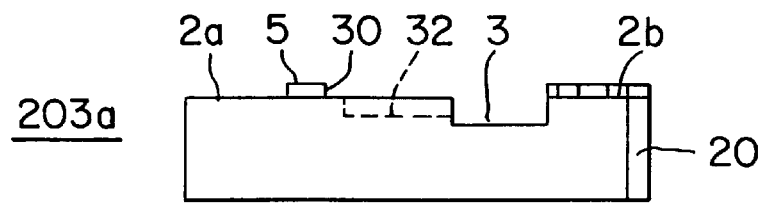
FIG. 25C is a side view of the head slider of FIG. 25A.

Referring to FIGS. 25A through 25C, the eleventh preferred embodiment of the present invention will be described below. FIG. 25A is a perspective view of the eleventh preferred embodiment of a head slider according to the present invention, FIG. 25B is a plan view thereof, and FIG. 25C is a side view thereof.

In this preferred embodiment, a step 30 of a first depth is provided in the rear of a land portion 5 of a front dynamic-pressure generating part 2a, and the front dynamic-pressure generating part 2a extends in the rear of the land portion 5. In addition, a cut-out 32 is provided so as to form steps 31a and 31b of a second depth in the extending front dynamic-pressure generating part 2a. This cut-out 32 is open to a deep slot 3.

If the first depth (the depth of the step 30) is the same as that of a step 4 in front of the land portion 5, the step 30 can be formed at the same time that the land portion 5 is formed.

The second depth (the depth of the step 31) has an order of micrometers, and the step 31 is formed in the disk rotating direction A so as to be deeper than the step 30 of the first depth. Therefore, the slider 203a generates a negative pressure in the boundary region of the cut-out 32 originating from the step 31a by the air flow generated in the slider 203a during rotating of the disk.

In addition, since the cut-out 32 is formed so that both end portions are surrounded by the extending portion of the dynamic-pressure generating part 2a, no negative pressure is released into atmosphere from the side portions of the slider, so that it is possible to effectively generate a negative pressure. In addition, since the side portions formed by the extending portion of the dynamic-pressure generating part 2a can effectively generate a negative pressure without increasing the ground contact area of the slider 203 to the disk, it is possible to very advantageously prevent the stiction although usual negative-pressure sliders are difficult to prevent the stiction.

Moreover, with this construction, it is possible to decrease the suspension load which is the sum of the positive and negative pressures.

Twelfth Preferred Embodiment

Figure 26A:
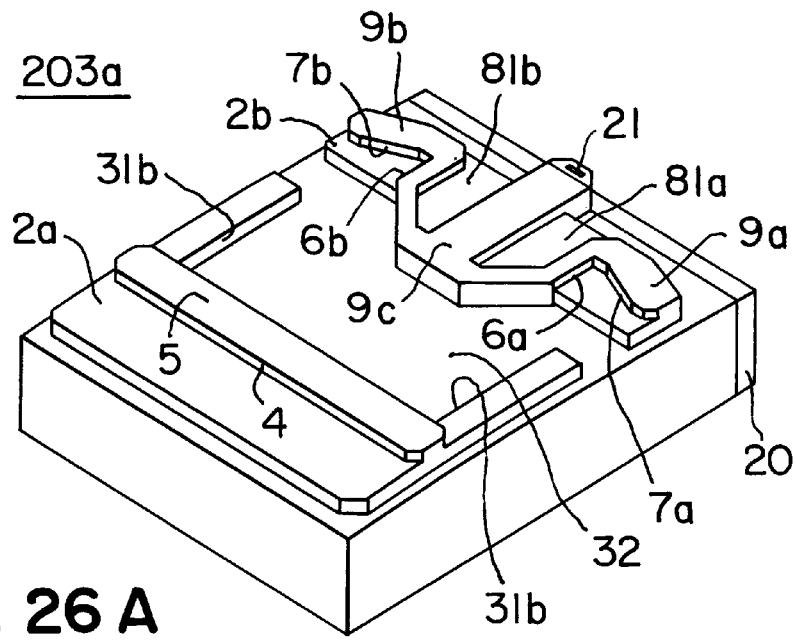
FIG. 26A is a perspective view of the twelfth preferred embodiment of a head slider according to the present invention.
Figure 26B:
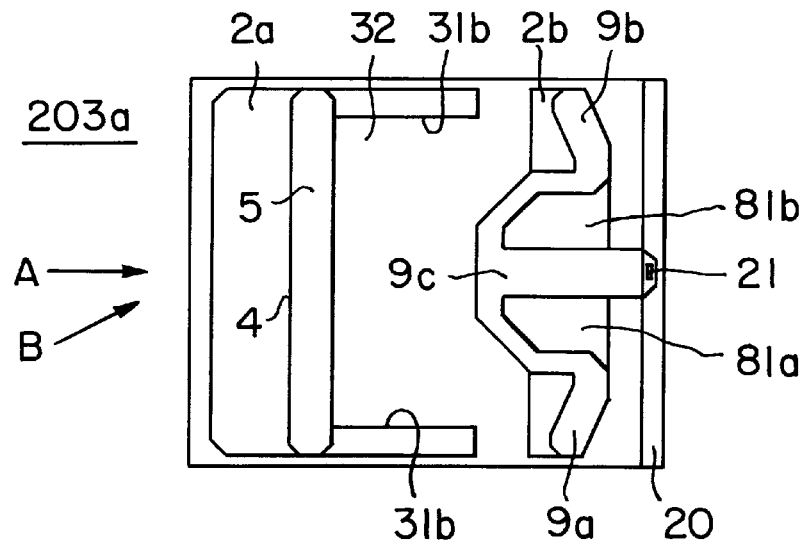
FIG. 26B is a plan view of the head slider of FIG. 26A.
Figure 26C:
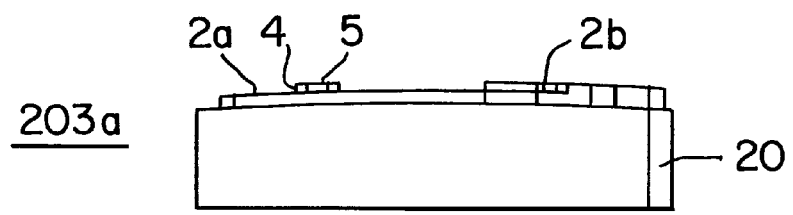
FIG. 26C is a side view of the head slider of FIG. 26A.

Referring to FIGS. 26A through 26C, the twelfth preferred embodiment of the present invention will be described below.

FIG. 26A is a perspective view of the twelfth preferred embodiment of a head slider according to the present invention, FIG. 26B is a plan view thereof, and FIG. 26C is a side view thereof.

The slider in this preferred embodiment is a modified embodiment of the slider in the eleventh preferred embodiment shown in FIG. 25. The feature of this preferred embodiment is that the deep slot 3 is not provided. That is, the dynamic-pressure generating part, which has divided by the deep slot 3 into the front dynamic-pressure generating part 2a and the rear dynamic-pressure generating part 2b in the preferred embodiment described above, is divided by a cut-out 32 surrounded by a step 31b and a land portion 5. The shapes of land portions 9a, 9b and 9c are substantially the same as those in the preferred embodiments shown in FIGS. 23A through 23C and 24A through 24C.

The depth of the cut-out 32 has an order of micrometers, and the cut-out 32 is deeper than the dynamic-pressure generating part 2a projecting toward the disk, so as to go away from the disk. Therefore, the slider 203a generates a negative pressure in the boundary region of the cut-out 32 originating from the rear edge of the land portion 5 by the air flow generated in the slider 203a during rotating of the disk. The state of this pressure distribution is shown in FIG. 27.

Figure 27:
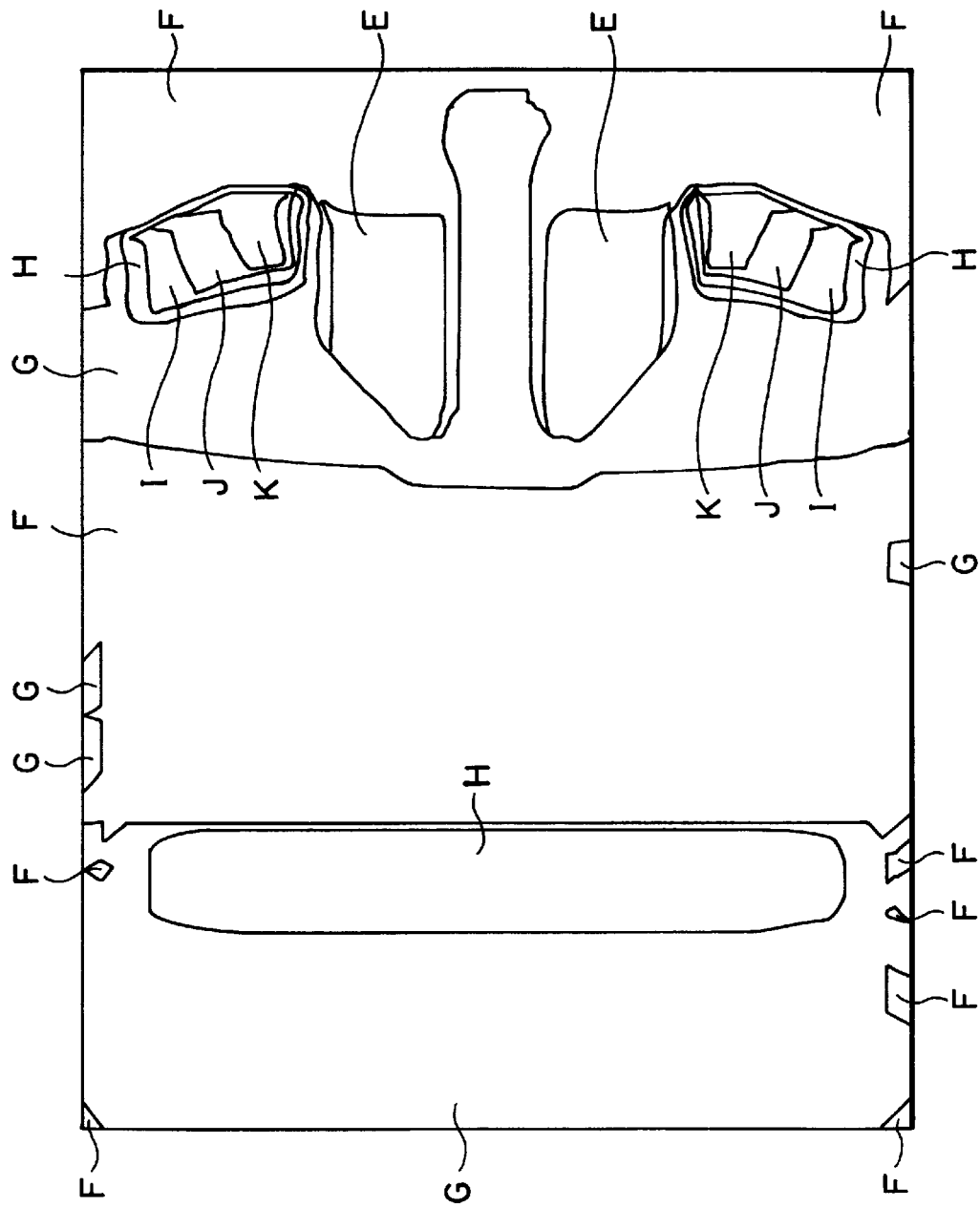
FIG. 27 is a schematic view illustrating pressure distribution characteristics in the twelfth preferred embodiment of a head slider according to the present invention.

As shown in the pressure distribution characteristic of FIG. 27, since the cut-out 32 is formed so that both end portions are surrounded by the steps 31b formed on the extending portion of the dynamic-pressure generating part 2a, no negative pressure is released into atmosphere from the side portions of the slider, so that it is possible to effectively generate a negative pressure. In addition, since the step 31b formed by the extending portion of the dynamic-pressure generating part 2a can effectively generate a negative pressure without increasing the ground contact area of the slider 203a to the disk, it is possible to very advantageously prevent the stiction although usual negative-pressure sliders are difficult to prevent the stiction, similar to the eleventh preferred embodiment shown in FIGS. 25A through 25C.

That is, in this preferred embodiment, two negative-pressure generating parts are separately provided in front and in the rear of the slider, so that the optimum negative pressure can be independently applied. Therefore, it is possible to achieve a desired behavior to the variation in atmosphere and the dispersion in load as shown in FIGS. 18A and 18B, so that it is possible to further improve the flying safety of the whole slider.

Furthermore, the construction, functions and effects of the rear dynamic-pressure generating part 2b are substantially the same as those in the ninth and tenth preferred embodiments shown in FIGS. 23A through 23C and 24A through 24C.

Thirteenth Preferred Embodiment

Figure 28A:
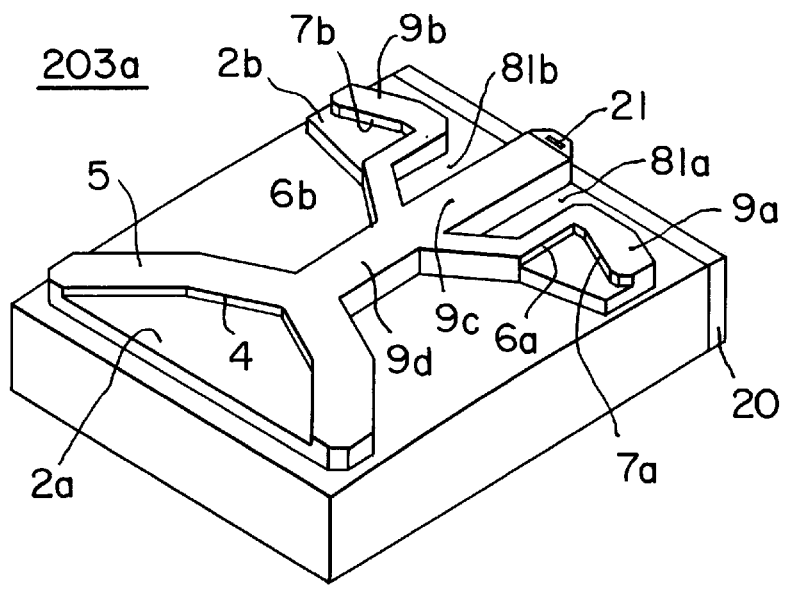
FIG. 28A is a perspective view of the thirteenth preferred embodiment of a head slider according to the present invention.
Figure 28B:
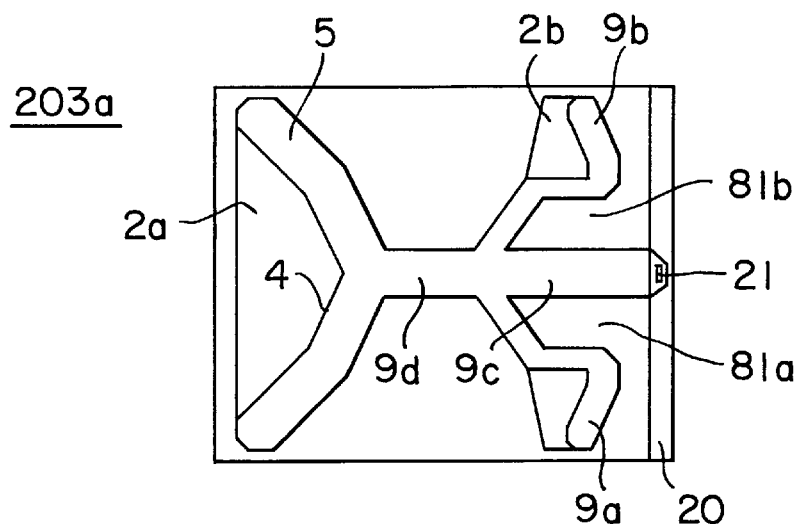
FIG. 28B is a plan view of the head slider of FIG. 28A.
Figure 28C:
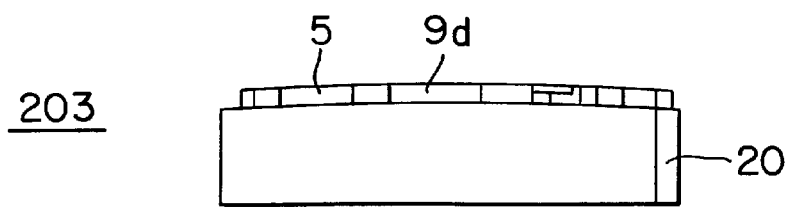
FIG. 28C is a side view of the head slider of FIG. 28A.

Referring to FIGS. 28A through 28C, the thirteenth preferred embodiment of the present invention will be described below.

FIG. 28A is a perspective view of the thirteenth preferred embodiment of a head slider according to the present invention, FIG. 28B is a plan view thereof, and FIG. 28C is a side view thereof.

In this preferred embodiment, a slider generally comprises a front dynamic-pressure generating part 2a, a rear dynamic-pressure generating part 2b, a land portion 5 formed by a step 4 provided on the front dynamic-pressure generating part 2a, land portions 9a, 9b and 9c formed on the rear dynamic-pressure generating part 2b, and a land portion 9d extending forwards from the land portion 9c to be connected to the land portion 5.

The land portion 5 formed on the front dynamic-pressure generating part 2a has a substantially V-shape so as to be convex toward the rear side of the slider, so that a positive pressure is generated along the land portion 5. Similar to the preceding preferred embodiments, a negative pressure is generated in pockets of cut-outs 81a and 81b around the rear land portions 9a through 9c, and a positive pressure is generated near the land portions 9a and 9b. Thus, if the front land portion 5 is connected to the rear land portion 9c via the land portion 9d, the same functions and advantages as those in the preceding preferred embodiments can be obtained.

Fourteenth Preferred Embodiment

Referring to FIGS. 29A through 29D, the fourteenth preferred embodiment of the present invention will be described below.

Figure 29A:
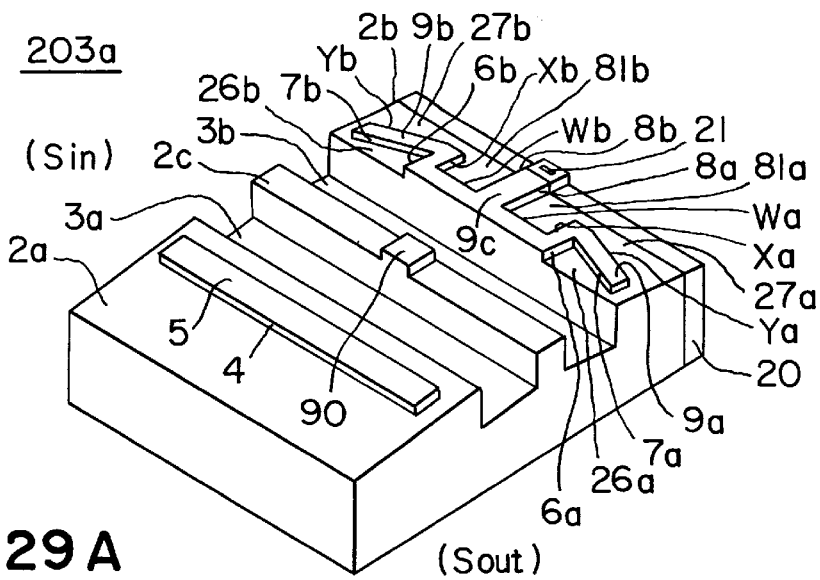
FIG. 29A is a perspective view of the fourteenth preferred embodiment of a head slider according to the present invention.
Figure 29B:
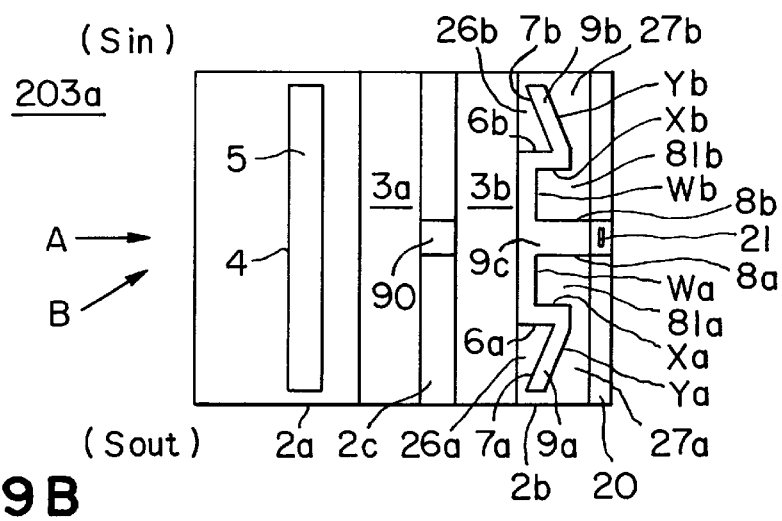
FIG. 29B is a plan view of the head slider of FIG. 29A.
Figure 29C:
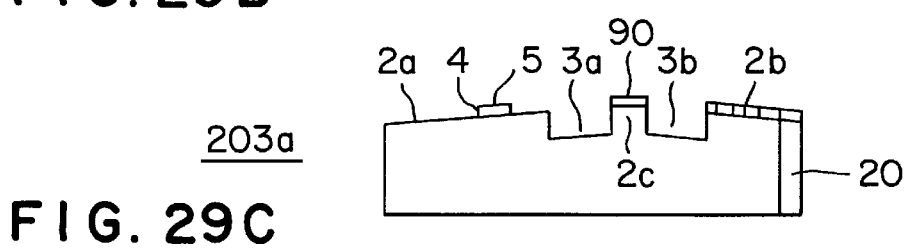
FIG. 29C is a side view of the head slider of FIG. 29A.
Figure 29D:
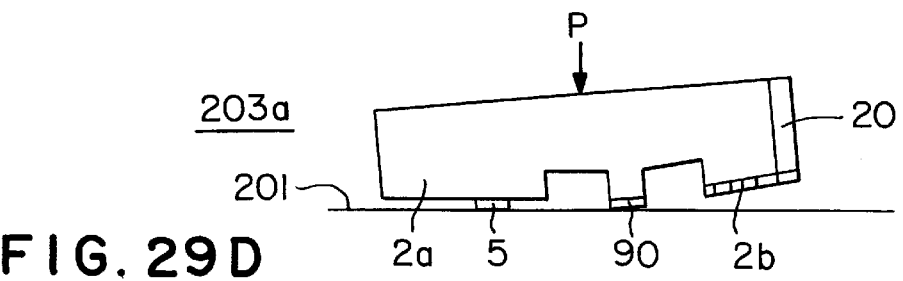
FIG. 29D is a side view of the head slider of FIG. 29A when the slider is grounded.

FIG. 29A is a perspective view of the fourteenth preferred embodiment of a head slider according to the present invention, FIG. 29B is a plan view thereof, FIG. 29C is a side view thereof, and FIG. 29D is a side view thereof when the slider is grounded.

In this preferred embodiment, a projecting portion 2c is provided between a front dynamic-pressure generating part 2a and a rear dynamic-pressure generating part 2b. Both side portions of the surface of the projecting portion 2c facing the disk are recessed so that a ground pad 90 is formed substantially at the center in a direction substantially perpendicular to the disk rotating direction A. The projecting portion 2c is provided by forming deep slots 3a and 3b by machining or etching. The ground pad 90 is formed by masking the corresponding portion and removing both side portions by etching.

In this preferred embodiment, among land portions 5, 9a, 9b and 9c provided on the front and rear dynamic-pressure generating parts 2a and 2b and the ground pad 90 provided on the projecting portion 2c arranged between the front and rear dynamic-pressure generating parts 2a and 2b, the ground pad 90 projects so as to be closest to the disk. In order to obtain such construction, the surface other than the ground pad 90 may be removed by etching, a crown (a convex portion formed on the slider facing the disk so as to project toward the disk) may be provided so that the ground pad 90 is positioned near the top, or a thick protective film is formed only at a location corresponding to the ground pad 90.

As shown in FIG. 29D, if a load P is applied between the front dynamic-pressure generating part 2a and the projecting portion 2c by means of a suspension (not shown), only the land portion 5 provided on the front dynamic-pressure generating part 2a and the contact pad 90 provided on the projecting portion 2c are grounded on the disk 201 while the disk is stopped. Therefore, it is possible to maintain the rear dynamic-pressure generating part 2b formed with a magnetic pole 21 so as not to contact the disk 201, and it is possible to decrease the ground contact area of the slider 203a to the disk 201, so that it is possible to prevent the stiction of the slider 203a onto the disk 201. In addition, if the rear dynamic-pressure generating part 2b can be maintained so as not to contact the disk 201, it is possible to prevent contaminants, such as worn powders generated during starting of the disk, from adhering to a location near the magnetic pole 21.

The position, at which the load P is applied, should not be limited to the aforementioned position. For example, if the load P is applied between the rear dynamic-pressure generating part 2b and the projecting portion 2c, the front dynamic-pressure generating part 2a can be maintained so as not to contact the disk 201. Therefore, it is possible to decrease the ground contact area of the slider 203a to the disk 201, so that it is possible to prevent the stiction of the slider 203a onto the disk 201. In addition, if the position, at which the load P is applied, is suitably selected, only the ground pad 90 can be grounded.

Furthermore, if the depths of the step 4 provided on the front dynamic-pressure generating part 2a and the projecting portion 2c for providing the ground pad 90 are the same to form the step 4 and the projecting portion 2c in a single etching process, it is possible to improve the manufacturing efficiency.

This preferred embodiment should not be limited to the embodiment shown in FIG. 29, but it may be suitably combined with any one of the sliders in the preceding preferred embodiments.

Fifteenth Preferred Embodiment

Figure 30A:
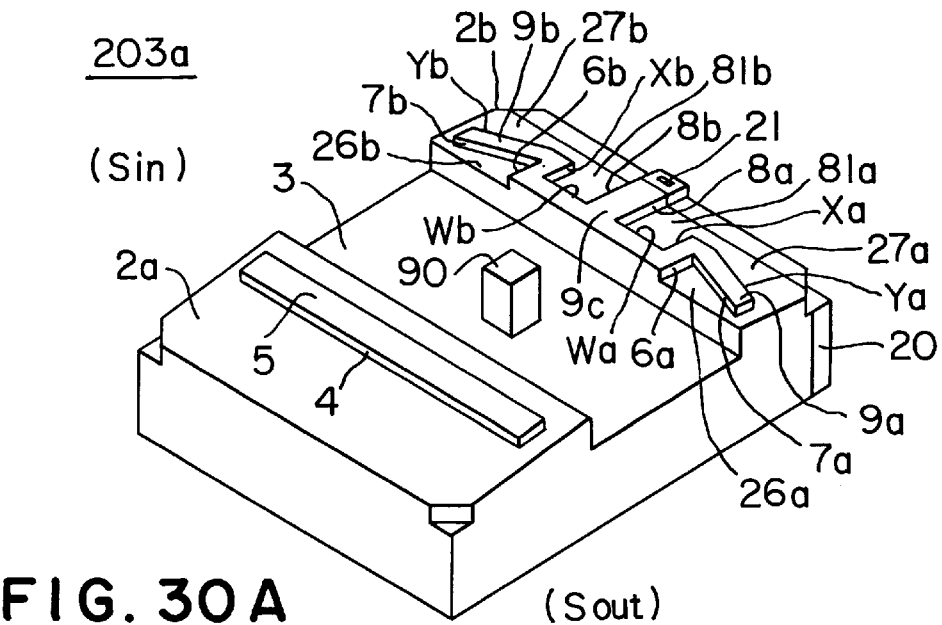
FIG. 30A is a perspective view of the fifteenth preferred embodiment of a head slider according to the present invention.
Figure 30B:
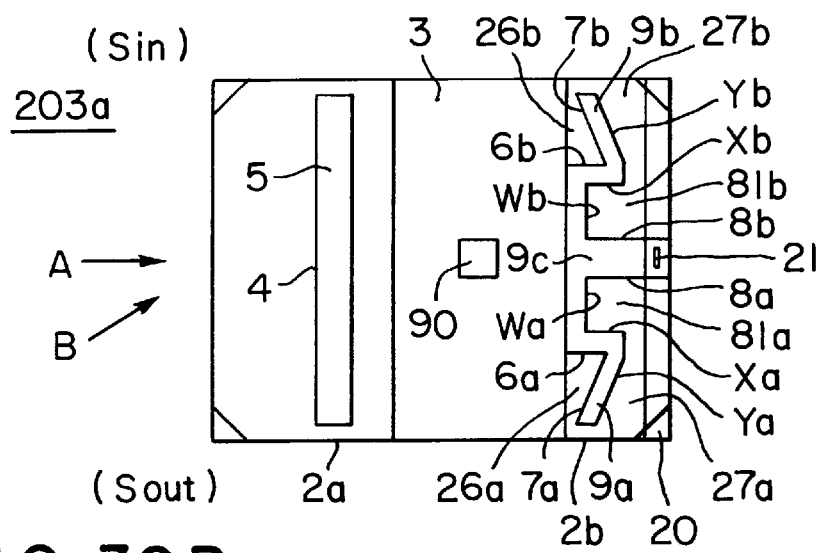
FIG. 30B is a plan view of the head slider of FIG. 30A.
Figure 30C:
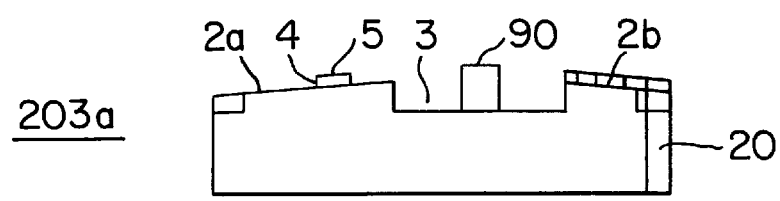
FIG. 30C is a side view of the head slider of FIG. 30A.

Referring to FIGS. 30A through 30C, the fifteenth preferred embodiment of the present invention will be described below.

FIG. 30A is a perspective view of the fifteenth preferred embodiment of a head slider according to the present invention, FIG. 30B is a plan view thereof, and FIG. 30C is a side view thereof.

Figure 31A:
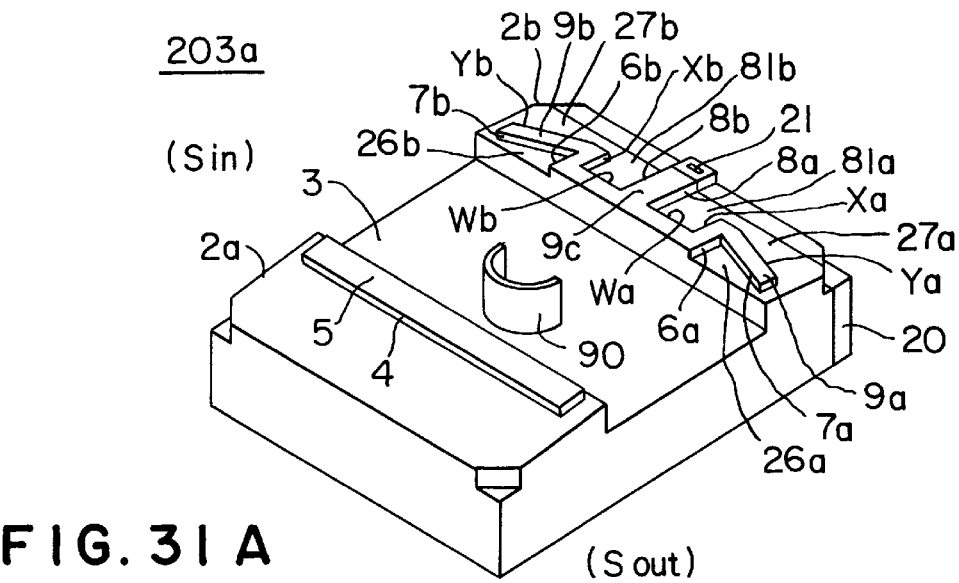
FIG. 31A is a perspective view of a modified example of the fifteenth preferred embodiment of a head slider according to the present invention.
Figure 31B:
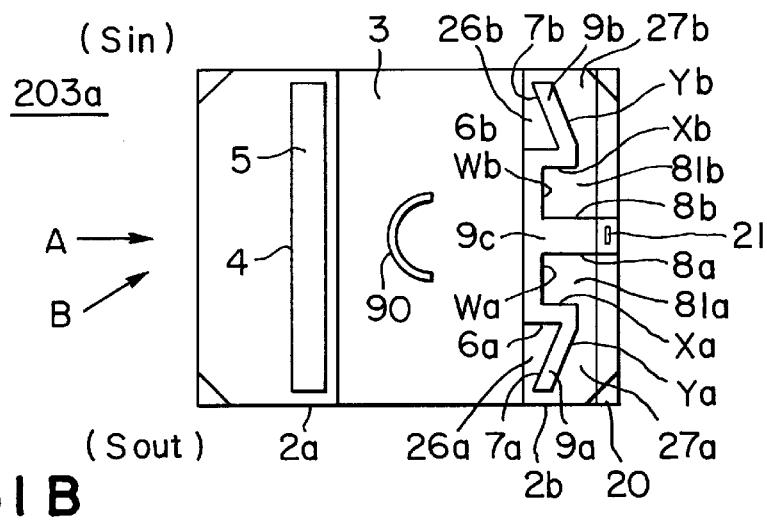
FIG. 31B is a plan view of the head slider of FIG. 31A.
Figure 31C:
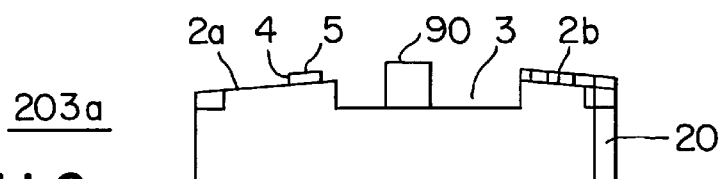
FIG. 31C is a side view of the head slider of FIG. 31A.
Figure 31D:
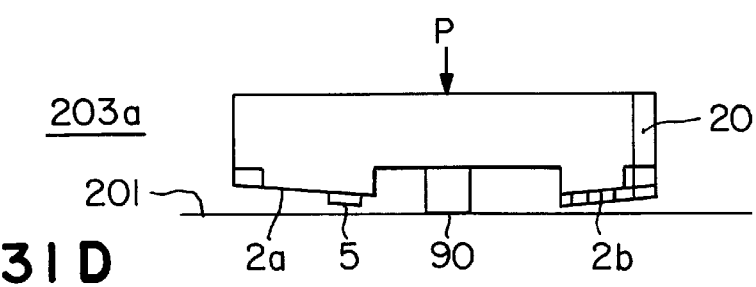
FIG. 31D is a side view of the head slider of FIG. 31A when the slider is grounded.

In this preferred embodiment, a ground pad 90 is directly provided on a slider 203a without the need of the projecting portion 2c in the fourteenth preferred embodiment described above. The ground pad 90 is formed by masking the corresponding portion while a deep slot 3 is formed by etching. The position, at which the ground pad 90 is provided, should not be limited to the position shown in FIGS. 30A through 30C, but it may be suitably changed. The shape of the ground pad 90 may also be changed. For example, as shown by reference number 90 in FIGS. 31A through 31D, the ground pad 90 may have a hollow cylindrical shape. With this construction, as shown in FIG. 31D, the ground contact region can be increased without increasing the ground contact area to ensure a stable grounding, and only the ground pad 90 can be easily grounded. Therefore, with this construction, it is possible to further improve the stiction preventing effect.

On the other hand, in this preferred embodiment, since all the processings of the slider 203a are carried out by etching, the four corners of the slider 203a can be easily chamfered, so that it is possible to prevent the slider 203a from colliding with the disk even if the variations in rolling, pitching and flying height occur due to various factors. In addition, if shock is applied to the apparatus, the slider 203a may damage the disk when it is grounded again after it leaves the disk once. In particular, if the slider 203a is not parallel to the disk when it is grounded, any one of the four corners of the slider causes to form a sharp flaw. Therefore, if the four corners of the slider 203a are chamfered, it is possible to prevent the slider 203a from damaging the disk.

Sixteenth Preferred Embodiment

Figure 32A:
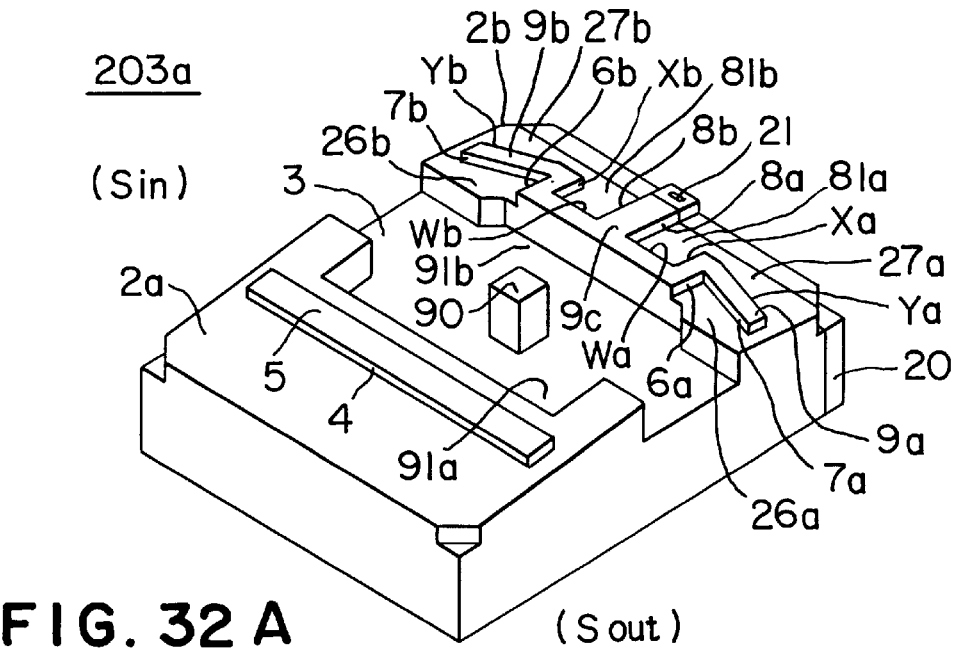
FIG. 32A is a perspective view of the sixteenth preferred embodiment of a head slider according to the present invention.
Figure 32B:
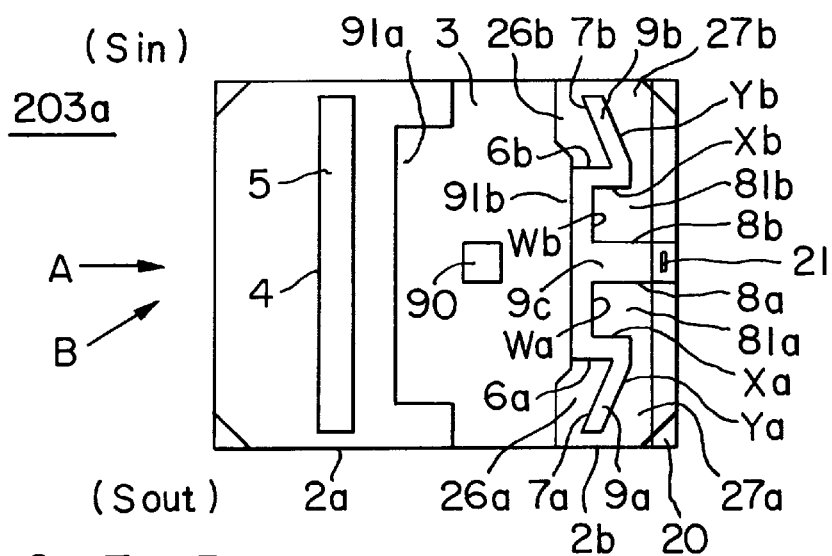
FIG. 32B is a plan view of the head slider of FIG. 32A.
Figure 32C:
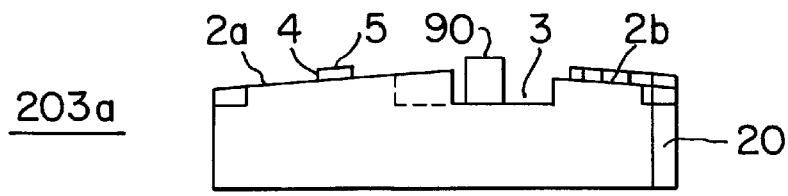
FIG. 32C is a side view of the head slider of FIG. 32A.

Referring to FIGS. 32A through 32C, the sixteenth preferred embodiment of the present invention will be described below.

FIG. 32A is a perspective view of the sixteenth preferred embodiment of a head slider according to the present invention, FIG. 32B is a plan view thereof, and FIG. 32C is a side view thereof.

The feature of this preferred embodiment is that the rear edge of a front dynamic-pressure generating part 2a and the front edge of a rear dynamic-pressure generating part 2b can be worked so as to have an optional shape since a deep slot 3 is formed by etching. In this preferred embodiment, a recessed portion 91a is provided in the rear edge of the front dynamic-pressure generating part 2a to effectively generate a negative pressure, and a recessed portion 91b is also provided in the front edge of the rear dynamic-pressure generating part 2b to extend the regions of cut-outs 26a and 26b provided for forming steps 7a and 7b.

The regions of cut-outs 26a and 26b are factors for determining the values of positive pressures generated near the steps 7a and 7b or the behavior of the positive pressures due to the variation in the peripheral velocity of the disk or the variation in the pitching of the slider. Therefore, if the shape of the front edge of the rear dynamic-pressure generating part 2b can be suitably adjusted, the following advantages can be obtained. That is, if the shape of the recessed portion 91b provided on the front edge of the rear dynamic-pressure generating part 2b is adjusted, the lengths of the steps 6a and 6b in the disk rotating direction and the regions of the cut-outs 26a and 26b provided for forming the steps 7a and 7b can be independently set. That is, the rolling preventing function obtained by the steps 6a and 6b and the positive-pressure generating function obtained by the steps 7a and 7b can be independently adjusted, so that it is possible to greatly improve the degree of freedom of the design.

In addition, if the shape of the recessed portion 91b is adjusted, the lengths of the steps 6a, 6b, Xa and Xb in the disk rotating direction can be suitably changed. In this case, since these lengths can be determined independent of the positive-pressure generating function caused by the steps 7a and 7b, it is possible to easily adjust the rolling preventing function described in the sixth preferred embodiment.

Seventeenth Preferred Embodiment

Figure 33A:
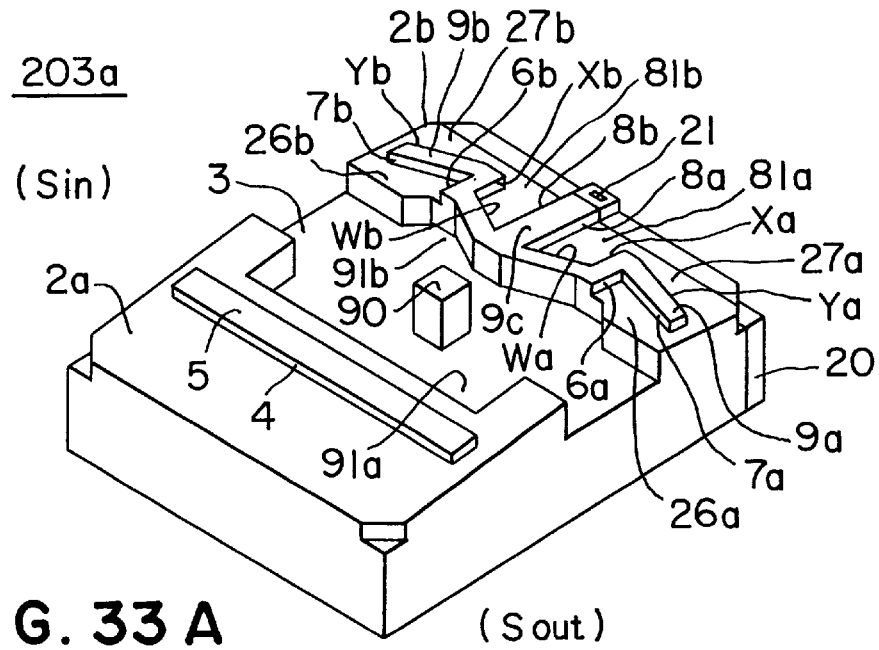
FIG. 33A is a perspective view of the seventeenth preferred embodiment of a head slider according to the present invention.
Figure 33B:
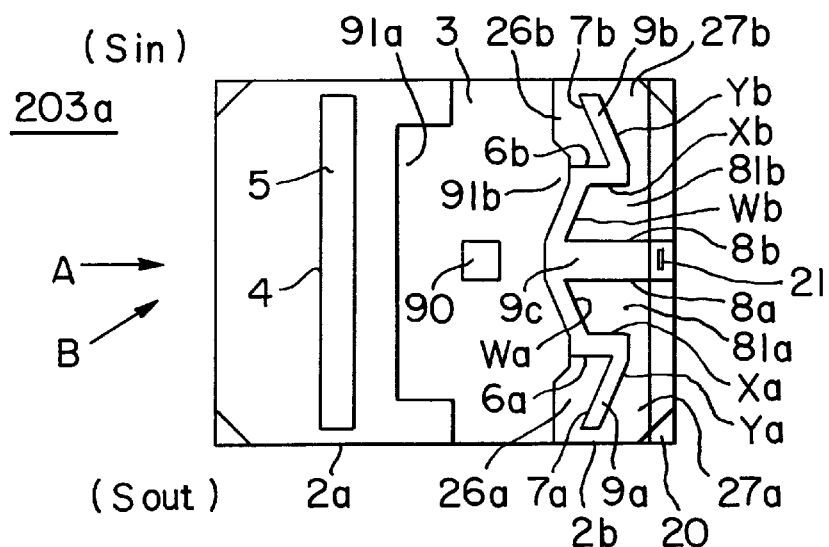
FIG. 33B is a plan view of the head slider of FIG. 33A.
Figure 33C:
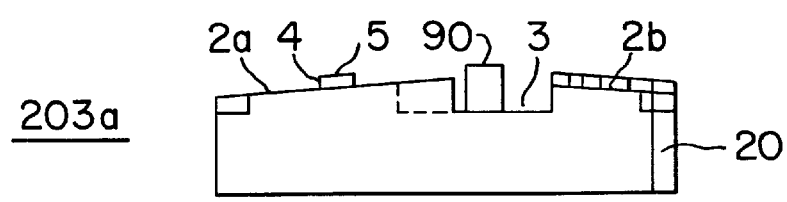
FIG. 33C is a side view of the head slider of FIG. 33A.
Figure 34:
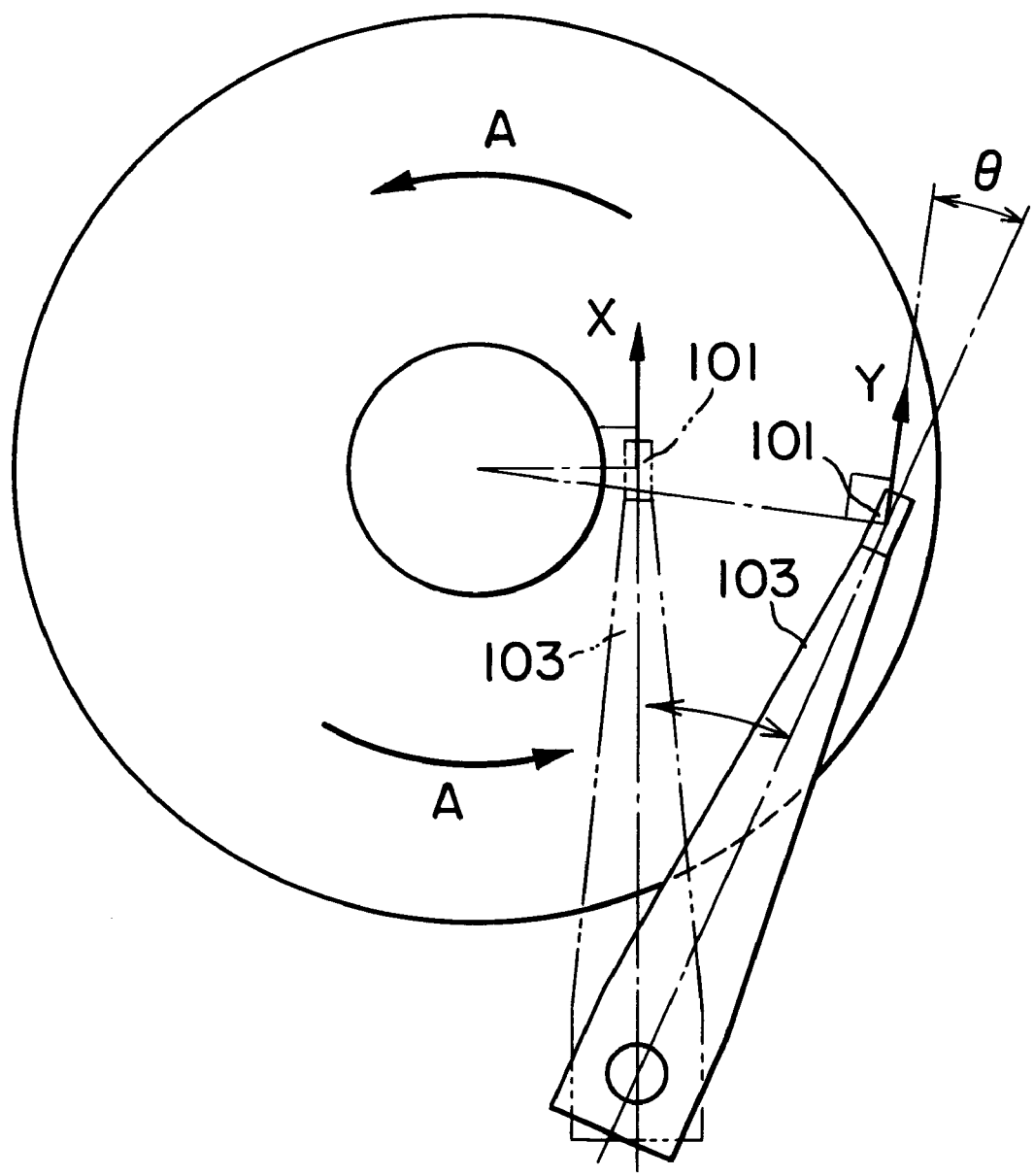
FIG. 34 is a schematic view illustrating a magnetic disk drive using a conventional head slider.

Referring to FIGS. 33A through 33C, the seventeenth preferred embodiment of the present invention will be described below.

FIG. 33A is a perspective view of the seventeenth preferred embodiment of a head slider according to the present invention, FIG. 33B is a plan view thereof, and FIG. 33C is a side view thereof.

In this preferred embodiment, a recessed portion 91a is provided in the rear edge of a front dynamic-pressure generating part 2a to generate a negative pressure, and a recessed portion 91b is also provided in the front edge of a rear dynamic-pressure generating part 2b to extend the regions of cut-outs 81a and 81b provided for forming steps Wa and Wb for generating a negative pressure.

The regions of cut-outs 81a and 81b are factors for determining the values of negative pressures generated near the steps Wa and Wb. Therefore, if the shape of the front edge of the rear dynamic-pressure generating part 2b can be suitably adjusted, the following advantages can be obtained. That is, if the shape of the recessed portion 91b provided in the front edge of the rear dynamic-pressure generating part 2b is adjusted, the regions of the cut-outs 81a and 81b can be set independent of the lengths of the steps 6a and 6b in the disk rotating direction and the regions of the cut-outs 26a and 26b provided for forming the steps 7a and 7b. That is, the negative-pressure generating function can be adjusted independent of the rolling preventing function obtained by the steps 6a and 6b and the positive-pressure generating function caused by the steps 7a and 7b, so that it is possible to greatly improve the degree of freedom of the design.

If the regions of the cut-outs 81a and 81b can be extended as this preferred embodiment, it is possible to generate a high negative pressure. Therefore, if the regions of the cut-outs 26a and 26b are adjusted or if the widths of the land portions 9a and 9b are increased, it is possible to generate a higher positive pressure near the steps 7a and 7b, so that it is possible to improve the rolling and spring rigidities of the rear dynamic-pressure generating part 2b.

While the land portion 9 formed on the rear dynamic-pressure generating part 2b of the slider 203a has been symmetric about the longitudinal central axis of the slider in the preferred embodiments described above, it may be asymmetric if necessary.

In the preferred embodiments described above, the slider can maintain a constant fly height or contact force in the inner and outer peripheral portions regardless of the yaw angle dependence. Therefore, this shape of slider is very suitable even if a MR head is used to carry out a seek operation so as not to vary the yaw angle in order to prevent the track shift in the inner and outer peripheral portions of the disk.

As described above, according to the present invention, it is possible to provide a head slider, which can suppress the transient variation in flying height by decreasing the yaw angle dependence and which can achieve a constant flying height above the inner and outer peripheral portions of the disk or a constant contact force between the head and the disk.

In addition, if the head slider of the present invention is used, it is possible to decrease the flying height of the head slider or to achieve a low load and a stable contact between the head and the disk, so that it is possible to provide a read/write apparatus which can improve the recording density.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A head slider, on which a read/write head for reading and/or writing information on a disk being a rotatable recording medium is mounted, said head slider comprising:

a head slider body;

a dynamic-pressure generating part for generating a dynamic pressure, said dynamic-pressure generating part being formed on a surface of said head slider body facing said disk;

a negative-pressure generating part for generating a negative-pressure, said negative-pressure generating part being provided on a plane of said head slider body facing said disk and in the rear of a central portion of said head slider body in a rotating direction of said disk; and a land portion provided by forming a step, which extends in a direction substantially perpendicular to said rotating direction of said disk, in a foremost one of said dynamic-pressure generating parts, in said rotating direction of said disk;

wherein said head slider body is formed with at least two dynamic-pressure generating parts, arranged in said rotating direction of said disk, each of said dynamic-pressure generating parts being the same as said dynamic-pressure generating part, and said negative-pressure generating part is provided in a rearmost one of said dynamic-pressure generating parts in said rotating direction of said disk.

2. The head slider according to claim 1, wherein said land portion has a ground contact area, which is smaller than a ground contact area of a dynamic-pressure generating part arranged in the rear of said foremost one of said dynamic-pressure generating parts, in which said land portion is provided, in said rotating direction of said disk.

3. A head slider, on which a read/write head for reading and/or writing information on a disk being a rotatable recording medium is mounted, said head slider comprising:

a head slider body;

a dynamic-pressure generating part for generating a dynamic pressure, said dynamic-pressure generating part being formed on a surface of said head slider body facing said disk;

a negative-pressure generating part for generating a negative pressure, said negative-pressure generating part being provided on a plane of said head slider body facing said disk and in the rear of a central portion of said head slider body in a rotating direction of said disk; and a land portion provided by forming a step, which extends in a direction substantially perpendicular to said rotating direction of said disk, in a foremost one of said dynamic-pressure generating parts in said rotating direction of said disk, the length of said land portion in said rotating direction being greater than 10% of the whole length of said foremost one of said dynamic-pressure generating parts in said rotating direction and smaller than 50% of the whole length thereof;

wherein said head slider body is formed with at least two dynamic-pressure generating parts, arranged in said rotating direction of said disk, each of said dynamic-pressure generating parts being the same as said dynamic-pressure generating part, and said negative-pressure generating part is provided in a rearmost one of said dynamic-pressure generating parts in said rotating direction of said disk.

4. The head slider according to claim 3, wherein said length of said land portion in said rotating direction is about 30% of the whole length of said foremost one of said dynamic-pressure generating parts in said rotating direction.

5. A head slider, on which a read/write head for reading and/or writing information on a disk being a rotatable recording medium is mounted, said head slider comprising:

a head slider body;

a dynamic-pressure generating part for generating a dynamic pressure, said dynamic-pressure generating part being formed on a surface of said head slider body facing said disk;

a negative-pressure generating part for generating a negative-pressure, said negative-pressure generating part being provided on a plane of said head slider body facing said disk and in the rear of a central portion of said head slider body in a rotating direction of said disk; and a land portion provided by forming a step which extends in a direction substantially perpendicular to said rotating direction of said disk, in a foremost one of said dynamic-pressure generating parts in said rotating direction, and a negative-pressure generating step arranged in the rear of said land portion in said rotating direction;

wherein said head slider body is formed with at least two dynamic-pressure generating parts, arranged in said rotating direction of said disk, each of said dynamic-pressure generating parts being the same as said dynamic-pressure generating part, and said negative-pressure generating part is provided in a rearmost one of said dynamic-pressure generating parts in said rotating direction of said disk.

6. A head slider, on which a read/write head for reading and/or writing information on a disk being a rotatable recording medium is mounted, said head slider comprising:

a head slider body;

a dynamic-pressure generating part for generating a dynamic pressure, said dynamic-pressure generating part being formed on a surface of said head slider body facing said disk; and a negative-pressure generating part for generating a negative pressure, said negative-pressure generating part being provided on a plane of said head slider body facing said disk and in the rear of a central portion of said head slider body in a rotating direction of said disk, wherein said dynamic-pressure generating part includes a positive-pressure generating region and a negative-pressure generating region, wherein said negative-pressure generating part has a first cut-out, which forms a first step extending substantially in said rotating direction of said disk and a second step extending in a direction substantially perpendicular to said rotating direction, and a second cut-out, which forms a third step facing said first step.

7. The head slider according to claim 6, wherein said negative-pressure generating part has a pair of first cut-outs near both side portions of said head slider body, and a pair of second cut-outs between said a pair of first cut-outs, each of said pair of first cut-outs being the same as said first cut-out, and each of said pair of second cut-outs being the same as said second cut-out.

8. A head slider, on which a read/write head for reading and/or writing information on a disk being a rotatable recording medium is mounted, said head slider comprising:

a head slider body;

a dynamic-pressure generating part for generating a dynamic pressure, said dynamic-pressure generating part being formed on a surface of said head slider body facing said disk; and a negative-pressure generating part for generating a negative pressure, said negative-pressure generating part being provided on a plane of said head slider body facing said disk and in the rear of a central portion of said head slider body in a rotating direction of said disk, wherein said dynamic-pressure generating part includes a positive-pressure generating region and a negative-pressure generating region, wherein said negative-pressure generating part has a first cut-out, which forms a first step extending substantially in said rotating direction of said disk and a second step extending in a direction substantially perpendicular to said rotating direction, and a second cut-out, which forms a third step facing said first step and a fourth step extending in a direction substantially opposite to the direction of said second step.

9. The head slider according to claim 8, wherein said negative-pressure generating part has a pair of first cut-outs near both side portions of said head slider body, and a pair of second cut-outs between said pair of first cut-outs, each of said pair of first cut-outs being the same as said first cut-out, and each of said pair of second cut-outs being the same as said second cut-out.

10. A head slider, on which a read/write head for reading and/or writing information on a disk being a rotatable recording medium is mounted, said head slider comprising:
   a head slider body;
   a dynamic-pressure generating part for generating a dynamic pressure, said dynamic-pressure generating part being formed on a surface of said head slider body facing said disk; and
   a negative-pressure generating part for generating a negative pressure, said negative-pressure generating part being provided on a plane of said head slider body facing said disk and in the rear of a central portion of said head slider body in a rotating direction of said disk,
   wherein said negative-pressure generating part has first and second land portions extending in a direction substantially perpendicular to said rotating direction of said disk, and a third land portion arranged between said first and second land portions to extend substantially in said rotating direction of said disk, so that a region surrounded by said first, second and third land portions generates a negative pressure.

11. The head slider according to claim 10, wherein said third land portion projects toward the upstream of said first and second land portions in said rotating direction of said disk, by a projecting amount determined in accordance with the magnitude of a required negative pressure.

12. A head slider, on which a read/write head for reading and/or writing information on a disk being a rotatable recording medium is mounted, said head slider comprising:
   a head slider body;
   at least two dynamic-pressure generating parts for generating a dynamic pressure, said dynamic-pressure generating parts being provided on a surface of said head slider body facing said disk so as to be arranged in a rotating direction of said disk; and
   a ground pad provided on a plane of said head slider body facing said disk and between a foremost one of said dynamic-pressure generating parts and a rearmost one of said dynamic-pressure generating parts in said rotating direction of said disk, said ground pad projecting so as to be closest to said disk,
   wherein said rearmost one of said dynamic-pressure generating part, is provided with a first cut-out, which forms a first step extending substantially in said rotating direction and a second step extending in a direction substantially perpendicular to said rotating direction.

13. A head slider on which a read/write head for reading and/or writing information on a disk being a rotatable recording medium is mounted, said head slider comprising:
   a head slider body;
   at least two dynamic-pressure generating parts for generating a dynamic pressure, said dynamic-pressure generating parts being provided on a surface of said head slider body facing said disk so as to be arranged in a rotating direction of said disk;
   a ground pad provided on a plane of said head slider body facing said disk and between a foremost one of said dynamic-pressure generating parts and a rearmost one of said dynamic-pressure generating parts in said rotating direction of said disk; ground pad projecting so as to be closest to said disk; and
   a land portion provided by forming a step, which extends in a direction substantially perpendicular to said rotating direction of said disk, in said foremost one of said dynamic-pressure generating parts.

14. A head slider, on which a read/write head for reading and/or writing information on a disk being a rotatable recording medium is mounted, said head slider comprising:
   a head slider body;
   at least two dynamic-pressure generating parts for generating a dynamic pressure, said dynamic-pressure generating parts being provided on a surface of said head slider body facing said disk so as to be arranged in a rotating direction of said disk;
   a ground pad provided on a plane of said head slider body facing said disk and between a foremost one of said dynamic-pressure generating parts and a rearmost one of said dynamic-pressure generating parts in said rotating direction of said disk, said ground pad projecting so as to be closest to said disk; and
   a land portion provided by forming a step, which extends in a direction substantially perpendicular to said rotating direction of said disk, in said foremost one of said dynamic-pressure generating parts, the length of said land portion in said rotating direction being greater than 10% of the whole length of said foremost one of said dynamic-pressure generating parts in said rotating direction and smaller than 50% of the whole length thereof.

15. The head slider according to claim 14, wherein said length of said land portion in said rotating direction is about 30% of the whole length of said foremost one of said dynamic-pressure generating parts in said rotating direction.

16. The head slider according to claim 14, wherein said land portion has a ground contact area, which is smaller than a ground contact area of one of said dynamic-pressure generating parts arranged in the rear of said foremost one of said dynamic-pressure generating parts, in which said land portion is provided, in said rotating direction of said disk.

17. A head slider, on which a read/write head for reading and/or writing information on a disk being a rotatable recording medium is mounted, said head slider comprising:
   a head slider body;
   at least two dynamic-pressure generating parts for generating a dynamic pressure, said dynamic-pressure generating parts being provided on a surface of said head slider body facing said disk so as to be arranged in a rotating direction of said disk;
   a ground pad provided on a plane of said head slider body facing said disk and between a foremost one of said dynamic-pressure generating parts and a rearmost one of said dynamic-pressure generating parts in said rotating direction of said disk, said ground pad projecting so as to be closest to said disk; and
   a land portion provided by forming a step, which extends in a direction substantially perpendicular to said rotating direction of said disk, in said foremost one of said dynamic-pressure generating parts, and a negative-pressure generating step arranged in the rear of said land portion in said rotating direction.

18. A head slider, on which a read/write head for reading and/or writing information on a disk being a rotatable recording medium is mounted, said head slider comprising:
   a head slider body;
   at least two dynamic-pressure generating parts for generating a dynamic-pressure, said dynamic-pressure generating parts being provided on a surface of said head slider body facing said disk so as to be arranged on both sides of a slot in said rotating direction of said disk; and
   a recessed portion formed in a front edge of a rearmost one of said dynamic-pressure generating parts in said rotating direction of said disk, said front edge facing said slot,
   wherein said rearmost one of said dynamic-pressure generating parts in provided with a first cut-cut, which forms a first step extending substantially in said rotating direction and a second step extending in a direction substantially perpendicular to said rotating direction.

19. A read/write apparatus comprising:
   a read/write head for reading and/or writing information on a disk being a rotatable recording medium;
   a head slider for mounting thereon said read/write head;
   an actuator for supporting said head slider to move said head slider above said disk;
   a dynamic-pressure generating part for generating a dynamic pressure, said dynamic-pressure generating part being formed on a surface of said head slider body facing said disk; and
   a negative-pressure generating part for generating a negative pressure, said negative-pressure generating part being provided on a plane of said head slider body facing said disk and in the rear of a central portion of said head slider body in a rotating direction of said disk,
   wherein said dynamic-pressure generating part includes a positive-pressure generating region and a negative-pressure generating region,
   wherein said negative-pressure generating part has a first cut-out, which forms a first step extending substantially in said rotating direction of said disk and a second step extending in a direction substantially perpendicular to said rotating direction, and a second cut-out, which forms a third step facing said first step.

20. The read/write apparatus according to claim 19, wherein said negative-pressure generating part has a first cut-out, which forms a first step extending substantially in said rotating direction of said disk and a second step extending in a direction substantially perpendicular to said rotating direction, and a second cut-out, which forms a third step facing said first step and a fourth step extending in a direction substantially opposite to the direction of said second step.

21. A read/write apparatus comprising:
   a read/write head for reading and/or writing information on a disk being a rotatable recording medium;
   a head slider for mounting thereon said read/write head;
   an actuator for supporting said head slider to move said head slider above said disk;
   a dynamic-pressure generating part for generating a dynamic pressure, said dynamic-pressure generating part being formed on a surface of said head slider body facing said disk; and
   a negative-pressure generating part for generating a negative pressure, said negative-pressure generating part being provided on a plane of said head slider body facing said disk and in the rear of a central portion of said head slider body in a rotating direction of said disk,
   wherein said negative-pressure generating part has first and second land portions extending in a direction substantially perpendicular to said rotating direction of said disk, and a third land portion arranged between said first and second land portions to extend substantially in said rotating direction of said disk, so that a region surrounded by said first, second and third land portions generates a negative-pressure.

22. The read/write apparatus according to claim 21, wherein said third land portion projects toward the upstream of said first and second land portions in said rotating direction of said disk, by a projecting amount determined in accordance with the magnitude of a required negative-pressure.

23. A read/write apparatus comprising:
   a read/write head for reading and/or writing information on a disk being a rotatable recording medium;
   a head slider for mounting thereon said read/write head;
   an actuator for supporting said head slider to move said head slider on said disk;
   at least two dynamic-pressure generating parts for generating a dynamic pressure, said dynamic-pressure generating parts being provided on a surface of said head slider body facing said disk so as to be arranged in said rotating direction of said disk; and
   a ground pad provided on a plane of said head slider body facing said disk and between a foremost one of said dynamic-pressure generating parts and a rearmost one of said dynamic-pressure generating parts in said rotating direction of said disk, said ground pad projecting so as to be closest to said disk,
   further comprises a negative-pressure generating part for generating a negative pressure, said negative-pressure generating part being provided in said rearmost one of said dynamic-pressure generating parts,
   wherein said negative-pressure generating part has first and second land portions extending in a direction substantially perpendicular to said rotating direction of said disk, and a third land portion arranged between said first and second land portions to extend substantially in said rotating direction of said disk, so that a region surrounded by said first, second and third land portions generates a negative pressure.

24. A read/write apparatus comprising:
   a read/write head for reading and/or writing information on a disk being a rotatable recording medium;
   a head slider for mounting thereon said read/write head;
   an actuator for supporting said head slider to move said head slider on said disk;
   at least two dynamic-pressure generating parts for generating a dynamic pressure, said dynamic-pressure generating parts being provided on a surface of said head slider body facing said disk so as to be arranged in said rotating direction of said disk; and
   a ground pad provided on a plane of said head slider body facing said disk and between a foremost one of said dynamic-pressure generating parts and a rearmost one of said dynamic-pressure generating parts in said rotating direction of said disk, said ground pad projecting so as to be closest to said disk, wherein said rearmost one of said dynamic-pressure generating parts is provided with a first cut-out, which forms a first step extending substantially in said rotating direction and a second step extending in a direction substantially perpendicular to said rotating direction.

25. A read/write comprising:

a read/write head for reading and/or writing information on a disk being a rotatable recording medium;

a head slider for mounting thereon said read/write head;

an actuator for supporting said head slider to move said head slider above said disk;

a dynamic-pressure generating part for generating a dynamic pressure, said dynamic-pressure generating part being formed on a surface of said head slider body facing said disk; and a negative-pressure generating part for generating a negative pressure, said negative-pressure generating part being provided on a plane of said head slider body facing said disk and in the rear of a central portion of said head slider body in a rotating direction of said disk;

wherein said head slider is formed with at least two dynamic-pressure generating parts arranged in said rotating direction of said disk, each of said dynamic-pressure generating parts being the same as said dynamic-pressure generating part, and said negative-pressure generating part is provided in a rearmost one of said dynamic-pressure generating parts in said rotating direction of said disk; and wherein a side end portion of said rearmost one of said dynamic-pressure generating parts in chamfered.

26. A read/write apparatus comprising:

a read/write head for reading and/or writing information on a disk being a rotatable recording medium;

a head slider for mounting thereon said read/write head;

an actuator for supporting said head slider to move said head slider above said disk;

a dynamic-pressure generating part for generating a dynamic pressure, said dynamic-pressure generating part being formed on a surface of said head slider body facing said disk; and a negative-pressure generating part for generating a negative pressure, said negative-pressure generating part being provided on a plane of said head slider body facing said disk and in the rear of a central portion of said head slider body in a rotating direction of said disk;

wherein said head slider is formed with at least two dynamic-pressure generating parts arranged in said rotating direction of said disk, each of said dynamic-pressure generating parts being the same as said dynamic-pressure generating part, and said negative-pressure generating part is provided in a rearmost one of said dynamic-pressure generating parts in said rotating direction of said disk; and wherein said rearmost one of said dynamic-pressure generating parts is provided with a positive-pressure generating step and a negative-pressure generating step, which is arranged inside said positive-pressure generating step in a direction substantially perpendicular to said rotating direction of said disk.

27. A read/write apparatus comprising:

a read/write head for reading and/or writing information on a disk being a rotatable recording medium;

a head slider for mounting thereon said read/write head;

an actuator for supporting said head slider to move said head slider above said disk;

a dynamic-pressure generating part for generating a dynamic pressure, said dynamic-pressure generating part being formed on a surface of said head slider body facing said disk; and a negative-pressure generating part for generating a negative pressure, said negative-pressure generating part being provided on a plane of said head slider body facing said disk and in the rear of a central portion of said head slider body in a rotating direction of said disk;

wherein said head slider is formed with at least two dynamic-pressure generating parts arranged in said rotating direction of said disk, each of said dynamic-pressure generating parts being the same as said dynamic-pressure generating part, and said negative-pressure generating part is provided in a rearmost one of said dynamic-pressure generating parts in said rotating direction of said disk; and a land portion provided by forming a step, which extends in a direction substantially perpendicular to said rotating direction of said disk, in a foremost one of said dynamic-pressure generating parts in said rotating direction of said disk.

28. The read/write apparatus according to claim 27, wherein said land portion has a ground contact area, which is smaller than a ground contact area of a dynamic-pressure generating part arranged in the rear of said foremost one of said dynamic-pressure generating part, in which said land portion is provided, in said rotating direction of said disk.

29. A read/write apparatus comprising:

a read/write head for reading and/or writing information on a disk being a rotatable recording medium;

a head slider for mounting thereon said read/write head;

an actuator for supporting said head slider to move said head slider above said disk;

a dynamic-pressure generating part for generating a dynamic pressure, said dynamic-pressure generating part being formed on a surface of said head slider body facing said disk; and a negative-pressure generating part for generating a negative pressure, said negative-pressure generating part being provided on a plane of said head slider body facing said disk and in the rear of a central portion of said head slider body in a rotating direction of said disk;

wherein said head slider is formed with at least two dynamic-pressure generating parts arranged in said rotating direction of said disk, each of said dynamic-pressure generating parts being the same as said dynamic-pressure generating part, and said negative-pressure generating part is provided in a rearmost one of said dynamic-pressure generating parts in said rotating direction of said disk; and a land portion provided by forming a step, which extends in a direction substantially perpendicular to said rotating direction of said disk, in a foremost one of said dynamic-pressure generating parts in said rotating direction of said disk, the length of said land portion in said rotating direction being greater than 10% of the whole length of said foremost one of said dynamic-pressure generating parts in said rotating direction and smaller than 50% of the whole length thereof.

30. The read/write apparatus according to claim 29, wherein said length of said land portion in said rotating direction is about 30% of the whole length of said foremost one of said dynamic-pressure generating parts in said rotating direction.

31. A read/write apparatus comprising:

a read/write head for reading and/or writing information on a disk being a rotatable recording medium;

a head slider for mounting thereon said read/write head;

an actuator for supporting said head slider to move said head slider above said disk;

a dynamic-pressure generating part for generating a dynamic pressure, said dynamic-pressure generating part being formed on a surface of said head slider body facing said disk; and a negative-pressure generating part for generating a negative pressure, said negative-pressure generating part being provided on a plane of said head slider body facing said disk and in the rear of a central portion of said head slider body in a rotating direction of said disk;

wherein said head slider is formed with at least two dynamic-pressure generating parts arranged in said rotating direction of said disk, each of said dynamic-pressure generating parts being the same as said dynamic-pressure generating part, and said negative-pressure generating part is provided in a rearmost one of said dynamic-pressure generating parts in said rotating direction of said disk; and a land portion provided by forming a step, which extends in a direction substantially perpendicular to said rotating direction of said disk, in a foremost one of said dynamic-pressure generating parts in said rotating direction, and a negative-pressure generating step arranged in the rear of said land portion in said rotating direction.

32. A read/write apparatus comprising:

a read/write head for reading and/or writing information on a disk being a rotatable recording medium;

a head slider for mounting thereon said read/write head;

an actuator for supporting said head slider to move said head slider on said disk;

at least two dynamic-pressure generating parts for generating a dynamic pressure, said dynamic-pressure generating parts being provided on a surface of said head slider body facing said disk so as to be arranged on both sides of a slot in said rotating direction of said disk; and a recessed portion formed in a front edge of a rearmost one of said dynamic-pressure generating parts in said rotating direction of said disk, said front edge facing said slot; and wherein said rearmost one of said dynamic-pressure generating parts is provided with a first cut-out, which forms a first step extending substantially in said rotating direction and a second step extending in a direction substantially perpendicular to said rotating direction.

\* \* \* \* \*